(12) United States Patent
Mori et al.

(10) Patent No.: US 9,297,951 B2
(45) Date of Patent: Mar. 29, 2016

(54) OPTICAL WAVEGUIDE, OPTICAL WIRING COMPONENT, OPTICAL WAVEGUIDE MODULE AND ELECTRONIC DEVICE

(75) Inventors: Tetsuya Mori, Tokyo (JP); Kimio Moriya, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 14/381,115

(22) PCT Filed: Sep. 13, 2012

(86) PCT No.: PCT/JP2012/073444
§ 371 (c)(1),
(2), (4) Date: Sep. 11, 2014

(87) PCT Pub. No.: WO2013/128691
PCT Pub. Date: Sep. 6, 2013

(65) Prior Publication Data
US 2015/0016794 A1    Jan. 15, 2015

(30) Foreign Application Priority Data

Feb. 27, 2012    (JP) .............................. P2012-040798

(51) Int. Cl.
*G02B 6/028* (2006.01)
*G02B 6/122* (2006.01)
(Continued)

(52) U.S. Cl.
CPC ................ *G02B 6/028* (2013.01); *G02B 6/036* (2013.01); *G02B 6/125* (2013.01); *G02B 6/1221* (2013.01)

(58) Field of Classification Search
CPC . G02B 6/0288; G02B 6/0281; G02B 6/03644
USPC .......................................... 385/124, 128–132
See application file for complete search history.

(56) References Cited

U.S. PATENT DOCUMENTS 5,818,982 A    10/1998  Voss et al.
6,724,968 B2 *  4/2004  Lackritz et al. ............... 385/131
(Continued)

FOREIGN PATENT DOCUMENTS

DE    101 03 273 A1    8/2002
EP    1 237 019 A2    9/2002
(Continued)

OTHER PUBLICATIONS

International Search Report Issued Oct. 16, 2012 in PCT/JP12/073444 Filed Sep. 13, 2012.
(Continued)

*Primary Examiner* — Ellen Kim
(74) *Attorney, Agent, or Firm* — Oblon, McClelland, Maier & Neustadt, L.L.P.

(57) ABSTRACT

A core layer (13) of an optical waveguide (1) includes a plurality of core groups (140) disposed so as to mutually intersect on the same plane, each core group (140) being an assembly of a plurality of core portions (14), at least some of which are arranged in parallel, and side cladding portions (15) provided so as to adjoin the side surfaces of each core portion (14). A transverse cross-section of the optical waveguide (1) includes a high refractive index region (WH) in a position corresponding with each core portion (14) and having a relatively high refractive index, and a low refractive index region (WL) in a position corresponding with each side cladding portion (15) and having a lower refractive index than the high refractive index region (WH), and a refractive index distribution is formed in which the refractive index varies continuously across the entire distribution.

19 Claims, 21 Drawing Sheets

(51) Int. Cl.
*G02B 6/036* (2006.01)
*G02B 6/125* (2006.01)

(56) References Cited

U.S. PATENT DOCUMENTS

| | | | |
|---|---|---|---|
| 7,924,500 | B1* | 4/2011 | Minelly .................. 359/341.1 |
| 8,120,595 | B2* | 2/2012 | Kukulj et al. ............... 345/176 |
| 2001/0031122 | A1 | 10/2001 | Lackritz et al. |
| 2007/0285406 | A1 | 12/2007 | Kukulj et al. |
| 2013/0101256 | A1* | 4/2013 | Heroux et al. .............. 385/50 |
| 2014/0270669 | A1* | 9/2014 | Sohma et al. ............... 385/123 |

FOREIGN PATENT DOCUMENTS

| | | |
|---|---|---|
| JP | 1 102403 | 4/1989 |
| JP | 5 332880 | 12/1993 |
| JP | 6 18739 | 1/1994 |
| JP | 2004 126310 | 4/2004 |
| JP | 2004 149579 | 5/2004 |
| JP | 2004 151160 | 5/2004 |
| JP | 2004 295128 | 10/2004 |
| JP | 2006 18121 | 1/2006 |
| JP | 2006 323242 | 11/2006 |
| JP | 2008-206908 A | 9/2008 |
| JP | 2010 90328 | 4/2010 |
| JP | 2011 90223 | 5/2011 |
| JP | 2011 221194 | 11/2011 |
| TW | 201217844 A1 | 5/2012 |
| WO | WO 2009/073404 A1 | 6/2009 |
| WO | WO 2011/016778 A1 | 2/2011 |
| WO | 2012 023430 | 2/2012 |

OTHER PUBLICATIONS

Takeyoshi, Y., et al., "Multichannel Parallel Polymer Waveguide With Circular W-Shaped Index Profile Cores", IEEE Photonics Technology Letters, vol. 19, No. 22, pp. 1795-1797, (Nov. 15, 2007).

Ishigure, T., et al., "Polymer waveguide with 4-channel graded-index circular cores for parallel optical interconnects", Optics Express, vol. 15, No. 9, pp. 5843-5850, (Apr. 30, 2007).

Hirobe, Y., et al., "Four-channel polymer optical waveguide with W-shaped index profile cores and its low inter-channel crosstalk property", IEEE Lasers and Electro-Optics Society, pp. 443-444, (Nov. 2008).

Ishigure, T., et al., "Accurate Refractive Index Profiling in a Graded-Index Plastic Optical Fiber Exceeding Gigabit Transmission Rates", Journal of Lightwave Technology, vol. 20, No. 8, pp. 1449-1456, (Aug. 2002).

Sakamoto, T., et al., "Optical Interconnection Using VCSELs and Polymeric Waveguide Circuits", Journal of Lightwave Technology, vol. 18, No. 11, pp. 1487-1492, (Nov. 2000).

Extended European Search Report issued Aug. 28, 2015 in Patent Application No. 12870277.6.

Taiwanese Office Action dated Nov. 19, 2015, in Taiwanese Patent Application No. 101133654 with English Translation (22 pages).

* cited by examiner

OPTICAL WAVEGUIDE, OPTICAL WIRING COMPONENT, OPTICAL WAVEGUIDE MODULE AND ELECTRONIC DEVICE

TECHNICAL FIELD

The present invention relates to an optical waveguide, an optical wiring component, an optical waveguide module and an electronic device.

Priority is claimed on Japanese Patent Application No. 2012-040798, filed Feb. 27, 2012, the content of which is incorporated herein by reference.

BACKGROUND ART

Optical communication technology which uses optical carrier waves to transport data is now being developed, and in recent years, optical waveguides are becoming increasingly widespread as a means of guiding these optical carrier waves from one point to another. These optical waveguides have a linear core portion and a cladding portion provided so as to cover the periphery of the core portion. The core portion is composed of a material that is essentially transparent to the light of the optical carrier waves, and the cladding portion is composed of a material having a lower refractive index than that of the core portion.

In an optical waveguide, light introduced from one end of the core portion is transported to the other end while reflecting off the boundaries with the cladding portion. A light emitting element such as a semiconductor laser is disposed at the input side of the optical waveguide, and a light receiving element such as a photodiode is disposed at the output side. The light input from the light emitting element is transmitted through the optical waveguide and is received by the light receiving element, and communication is conducted on the basis of a blinking pattern or intensity pattern of the received light.

The use of these types of optical waveguides in supercomputers and large-scale servers and the like is being investigated. Conventional supercomputers are constructed by installing a plurality of electrical circuit boards mounted with semiconductor elements and electronic components and the like in racks, and then electrically connecting these electrical circuit boards to one another. Investigations are being conducted for such structures, for example, into substituting electrical connections within individual electrical circuit boards, electrical connections between electrical circuit boards and electrical connections between racks with optical connections using optical fibers. It is anticipated that these substitutions will enable greater volumes of information transmission, increased speed, and reduced energy consumption and the like, resulting in improved supercomputer performance.

In order to achieve these optical connections, optical fiber sheets are being investigated in which a plurality of optical fibers are bundled together in an intersecting state, with connectors provided at the ends of the fibers (for example, see Patent Document 1).

In order to replace electrical wiring with this type of optical fiber sheet, light receiving and emitting elements and connectors are installed on the electrical circuit board. Then, by linking the electrical circuit board side connectors with the optical fiber ribbon side connectors, optical connections are achieved. Further, devices in which light receiving and emitting elements are installed on the side of the optical fiber sheet are also being investigated.

However, these optical fiber sheets are formed by sandwiching the intersecting portions of the optical fibers between film substrates. Accordingly, the optical fibers overlap at the optical fiber intersecting portions, meaning an increase in the sheet thickness at these portions is unavoidable. Consequently, the sheets are difficult to bend during optical connection operations, and there is a possibility that the optical fibers may break when bent with excessive strength. As a result, there are various restrictions associated with the wiring space and the wiring operations.

Further, in consideration of resistance to transverse rupture and the like, making the optical fibers finer is problematic. Accordingly, the spacing between the core portions of adjacent optical fibers cannot be narrowed more than conventional structures, meaning there is a limit to possible improvements in the wiring density.

BACKGROUND ART DOCUMENTS

Patent Documents

Patent Document 1: Japanese Unexamined Patent Application, First Publication No. 2004-126310

SUMMARY OF THE INVENTION

Problems to be Solved by the Invention

An object of the present invention is to provide an optical waveguide in which core portions can be intersected without an accompanying increase in thickness and the core portions can be formed at high density, an optical wiring component and an optical waveguide module which include the optical waveguide and can simplify optical wiring and contribute to space saving, and an electronic device which can be readily miniaturized.

Means to Solve the Problems

The above object is achieved by the following aspects (1) to (16) of the present invention.

(1) An optical waveguide having a plurality of core groups disposed so as to mutually intersect on the same plane, each core group being an assembly of a plurality of core portions, wherein the core portions are at least arranged partly paralleled, and side cladding portions provided on both side surfaces of each core portion so as to adjoin the core portion, wherein a transverse cross-section of the optical waveguide includes a high refractive index region in a position corresponding with each of the core portions and having a relatively high refractive index, and a low refractive index region in a position corresponding with each of the side cladding portions and having a lower refractive index than the high refractive index region, and a refractive index distribution in which the refractive index varies continuously, within at least a portion of the distribution or across the entire distribution, is formed by the regions.

(2) The optical waveguide according to (1) above, wherein the refractive index distribution is formed in correspondence with the concentration of a refractive index modifier, which is dispersed in a polymer layer and has a different refractive index from the polymer.

(3) The optical waveguide according to (2) above, wherein the refractive index distribution is formed by irradiating light partially onto the polymer layer, which is composed of a material containing a polymer and a photopolymerizable monomer having a different refractive index from the polymer dispersed within the polymer, thereby causing migration and uneven distribution of the photopolymerizable monomer, and generating variation in the refractive index within the layer.

(4) The optical waveguide according to any one of (1) to (3) above, wherein when two of the core portions mutually intersect and the angle of intersection of the optical axes of the core portions is 90°, the transmission loss in the intersection portion between the two core portions is not more than 0.02 dB.

(5) The optical waveguide according to any one of (1) to (4) above, wherein the width of the core portions is from 10 to 200 μm.

(6) An optical wiring component, having the optical waveguide according to any one of (1) to (5) above, and connectors provided at the ends of the core groups of the optical waveguide.

(7) The optical wiring component according to (6) above, wherein the optical waveguide has an optical path conversion portion, which is formed partway along the core portions or on an extended line thereof, and converts the optical paths of the core portions.

(8) An optical waveguide module, having the optical waveguide according to any one of (1) to (5) above, and light receiving and emitting elements which are provided on one surface of the optical waveguide and are optically connected to the core portions.

(9) An electronic device containing the optical waveguide according to any one of (1) to (5) above.

(10) The optical waveguide according to (1) above, wherein a refractive index distribution W in a width direction of a transverse cross-section of the optical waveguide has a region having at least two local minimum values, at least one first local maximum value, and at least two second local maximum values smaller than the first local maximum value, these values being arranged in a sequence composed of second local maximum value, local minimum value, first local maximum value, local minimum value and second local maximum value, and within this region, a region sandwiched by the two local minimum values so as to include the first local maximum value corresponds with the core portion, and regions from each local minimum value to the second local maximum value correspond with the cladding portions, each local minimum value has a value less than the average refractive index in the cladding portions, and the refractive index varies continuously across the entire refractive index distribution W.

(11) The optical waveguide according to (1) above, wherein the core portions and the side cladding portions form a core layer, cladding layers are laminated to both surfaces of the core layer, a refractive index distribution W in a width direction of a transverse cross-section of the core layer has a region having at least two local minimum values, at least one first local maximum value, and at least two second local maximum values smaller than the first local maximum value, these values being arranged in a sequence composed of second local maximum value, local minimum value, first local maximum value, local minimum value and second local maximum value, within this region, a region sandwiched by the two local minimum values so as to include the first local maximum value corresponds with the core portion, and regions from each local minimum value to the second local maximum value correspond with the side cladding portions, each local minimum value is less than the average refractive index in the cladding portions, the refractive index varies continuously across the entire refractive index distribution, and in a refractive index distribution T in a thickness direction of a transverse cross-section of the optical waveguide, the refractive index is substantially constant in a region corresponding with the core portion and regions corresponding with the cladding layers, and the refractive index varies discontinuously at the interfaces between the core portion and the cladding layers.

(12) The optical waveguide according to (1) or (10) above, wherein the core portions and the side cladding portions form a core layer, cladding layers are laminated to both surfaces of the core layer, in a refractive index distribution W in a width direction of a transverse cross-section of the optical waveguide, the refractive index is substantially constant in the low refractive index regions, and in a refractive index distribution T in a thickness direction of a transverse cross-section of the optical waveguide, the refractive index is substantially constant in a region corresponding with the core layer and regions corresponding with the cladding layers, and the refractive index varies discontinuously at the interfaces between the core portion and the cladding layers.

(13) The optical waveguide according to (1) or (10) above, wherein the core portions and the side cladding portions form a core layer, cladding layers are laminated to both surfaces of the core layer, in a refractive index distribution W in a width direction of a transverse cross-section of the optical waveguide, the refractive index is substantially constant in the low refractive index regions, and a refractive index distribution T in a thickness direction of a transverse cross-section of the optical waveguide includes a region corresponding with the core portion of the core layer, and regions corresponding with the cladding layers, the refractive index varies continuously in the region corresponding with the core portion of the core layer, the refractive index is substantially constant in the regions corresponding with the cladding layers, and the refractive index varies discontinuously at the interfaces between the core portion and the cladding layers.

(14) The optical waveguide according to (1) or (10) above, wherein the core portions and the side cladding portions form a core layer, cladding layers are laminated to both surfaces of the core layer, a refractive index distribution T in a thickness direction of a transverse cross-section of the optical waveguide has a local maximum value, first portions in which the refractive index decreases continuously from the position of the local maximum value toward the cladding layers, and second portions, positioned on the optical waveguide upper and lower surface sides of the first portions, in which the refractive index is substantially constant, and a region corresponding with the local maximum value and the first portions represents the core portion, and regions corresponding with the second portions represent the cladding layers.

(15) The optical waveguide according to (1) above, wherein the core portions and the side cladding portions form a core layer, cladding layers are laminated to both surfaces of the core layer, a refractive index distribution T in a thickness direction of a transverse cross-section of the optical waveguide has a region having at least two local minimum values, at least one first local maximum value, and at least two second local maximum values smaller than the first local maximum value, these values being arranged in a sequence composed of second local maximum value, local minimum value, first local maximum value, local minimum value and second local maximum value, within this region, a region sandwiched by the two local minimum values so as to include the first local maximum value corresponds with the core layer, and regions from each local minimum value to the second local maximum value correspond with the cladding layers, each local minimum value has a value less than the average refractive index in the cladding layers, and the refractive index varies continuously across the entire refractive index distribution T.

(16) The optical waveguide according to any one of (1) to (18) above, satisfying at least one of features (i) to (v) described below:

(i) the thickness of the core layer is about 1 to 200 μm, preferably 5 to 100 μm, and more preferably 10 to 50 μm, (ii) the average width of the side cladding portions is within a range from 5 to 250 μm, (iii) a ratio between the average width of the core portions and the average width of the side cladding portions is within a range from 0.1 to 10, (iv) the average thickness of the cladding layers is from 0.01 to 7 times the average thickness of the core layer, and (v) in a transverse cross-section of the core layer, if the width of a portion of the core layer in which the refractive index is continuously equal to or greater than the average refractive index of the side cladding portions is denoted a, and the width of a portion of the core layer in which the refractive index is continuously less than the average refractive index of the side cladding portions is denoted b, then b is within a range from 0.01a to 1.2a.

(17) The optical waveguide according to any one of (10) to (15) above, satisfying at least one of features (i) to (vi) described below:

(i) in the refractive index distribution in the transverse direction of a transverse cross-section, a difference between the average refractive index of the local minimum values and the average refractive index of the side cladding portions is from 3 to 80% of the difference between the average refractive index of the local minimum values and the average refractive index of the first local maximum value, (ii) in the refractive index distribution in the transverse direction of a transverse cross-section, a difference between the average refractive index of the local minimum values and the average refractive index of the second local maximum values is from 6 to 90% of the difference between the average refractive index of the local minimum values and the average refractive index of the first local maximum value, (iii) in the refractive index distribution in the width direction of a transverse cross-section, a refractive index difference between the average refractive index of the local minimum values and the average refractive index of the first local maximum value is from 0.005 to 0.07, (iv) in the refractive index distribution in a thickness direction of a transverse cross-section, if the width of a portion in which the refractive index is equal to or greater than the average refractive index of the cladding layers is denoted a, and the width of a portion in which the refractive index is less than the average refractive index of the cladding layers is denoted b, then b is within a range from 0.01a to 1.2a, (v) in the refractive index distribution in a thickness direction of a transverse cross-section, a difference between the average refractive index of the local minimum values and the average refractive index of the cladding layers is from 3 to 80% of the difference between the average refractive index of the local minimum values and the first local maximum value within the core portion, and (vi) in the refractive index distribution in a thickness direction of a transverse cross-section, the difference between the average refractive index of the local minimum values and the average refractive index of the first local maximum value within the core portion is from 0.005 to 0.07.

The high refractive index region is preferably composed of a peak portion indicated by the local maximum value, and two tailing portions in which the refractive index decreases continuously from the local maximum value toward both sides, and the difference between the local maximum value and the average refractive index of the low refractive index regions is preferably from 0.005 to 0.07.

The above refractive index distribution preferably includes local minimum values, which are positioned at the interface portions between the low refractive index regions and the high refractive index region, and have a lower refractive index than the average refractive index of the low refractive index regions.

If necessary, the refractive index of the low refractive index regions may be substantially constant.

Effects of the Invention

The present invention enables an optical waveguide to be obtained in which core portions can be intersected without an accompanying increase in thickness, and the core portions can be formed at high density.

Further, the present invention also enables an optical wiring component and an optical waveguide module to be obtained which include the above optical waveguide, and can simplify optical wiring and contribute to space saving.

Moreover, the present invention also enables an electronic device to be obtained which includes the above optical waveguide and can be readily miniaturized.

BEST MODE FOR CARRYING OUT THE INVENTION

The optical waveguide, optical wiring component, optical waveguide module and electronic device of the present invention are described below in further detail, based on preferred embodiments illustrated in the appended drawings.

The present invention is not limited solely to these examples. Various modifications, omissions and/or additions can be made as desired within the scope of the present invention. The number, position and size of devices may also be modified as required.

<Optical Wiring Component>

First the optical wiring component of the present invention and the optical waveguide of the present invention included therein are described.

Figure 1:
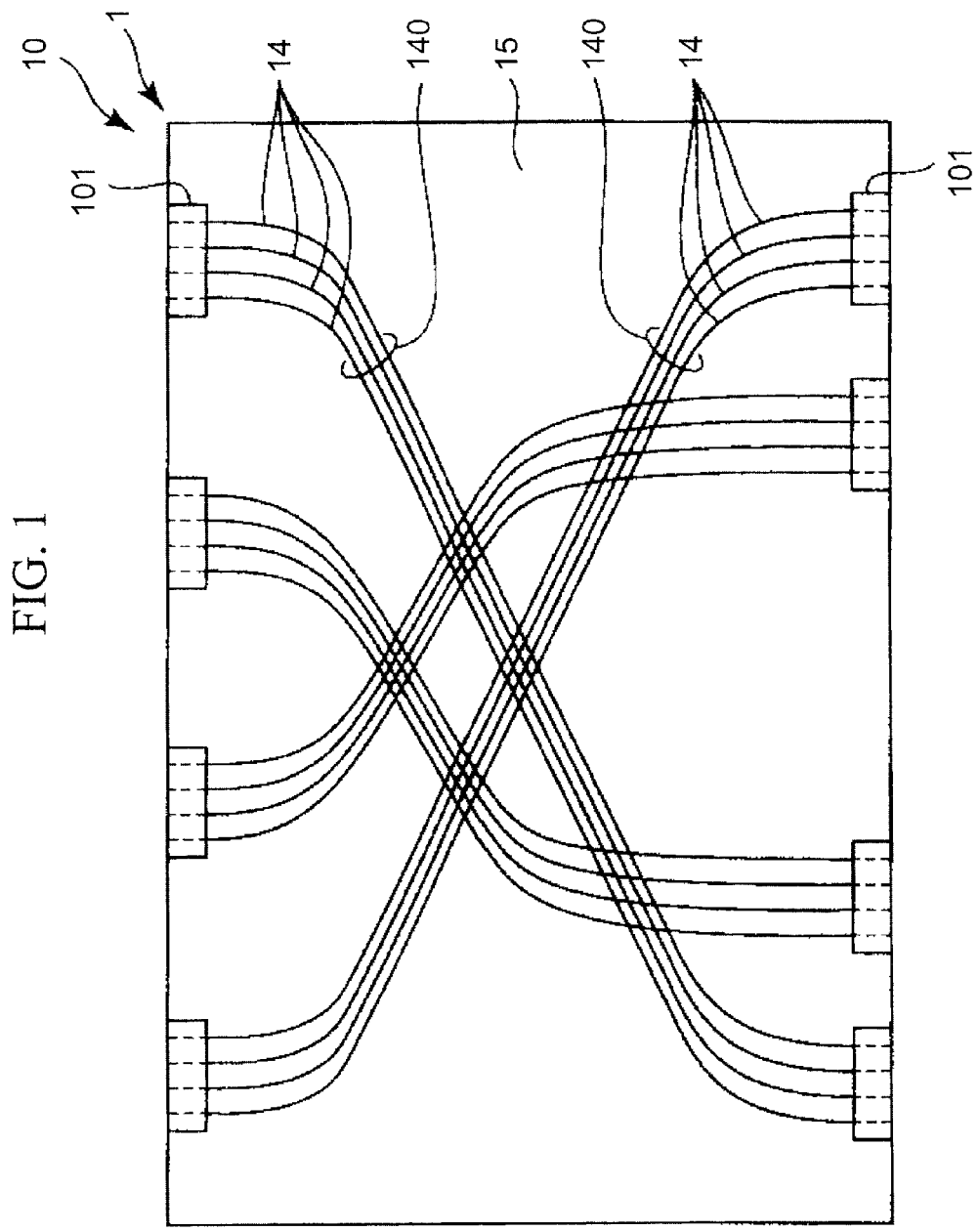
FIG. 1 is a plan view illustrating an example of an optical wiring component of the present invention.

FIG. 1 is a plan view (shown through the cladding layer) illustrating an embodiment of the optical wiring component of the present invention.

The optical wiring component 10 illustrated in FIG. 1 has an optical waveguide 1 and connectors 101 provided at the ends thereof.

The optical waveguide 1 has a rectangular shape in plan view, and a plurality of core groups 140, each core group being an assembly of a plurality of core portions 14 (in FIG. 1, a single core group includes four core portions 14 aligned in parallel), is arranged inside the optical waveguide in a desired pattern (FIG. 1 includes four core groups 140). This plurality of core groups 140 is disposed so as to mutually intersect within the same plane, and the two ends of the core groups are exposed at two opposing edges among the four edges of the optical waveguide 1. According to this type of optical waveguide 1, mutually intersecting complex and high-density signal paths can be constructed without an accompanying increase in the thickness of the waveguide. As a result, an optical wiring component 10 can be obtained which can be easily bent, and which enables wiring operations to be performed with relative ease, even in confined wiring spaces. The core portions 14 illustrated in FIG. 1 are each formed so as to trace a smooth curve when viewed in plan view. By using this type of configuration, attenuation of the transmitted light can be suppressed, and any deterioration in the transmission efficiency can be suppressed.

Further, the optical wiring component 10 also has the connectors 101 provided at the ends of the core portions 14. The optical waveguide 10 is formed so that the core portions of the optical waveguide 1 and other optical components can be optically connected via these connectors 101. In FIG. 1, the connectors 101 are provided on two opposing edges of the optical waveguide 1, but the positioning of the connectors 101 is not limited to this particular configuration.

Each of the portions of the optical wiring component 10 is described below in further detail.

(Optical Waveguide)

<<First Embodiment>>

First is a description of a first embodiment of the optical waveguide of the present invention.

The optical waveguide 1 of the present invention is a sheet-like member having core portions 14 and cladding portions 15, and functions as a series of optical wires which transmit optical signals from one end to the other. There are no particular limitations on the plan view shape of the optical waveguide 1, and a triangular shape, square shape, polygonal shape having 5 or more sides, or a circular shape or the like are also possible.

Figure 2:
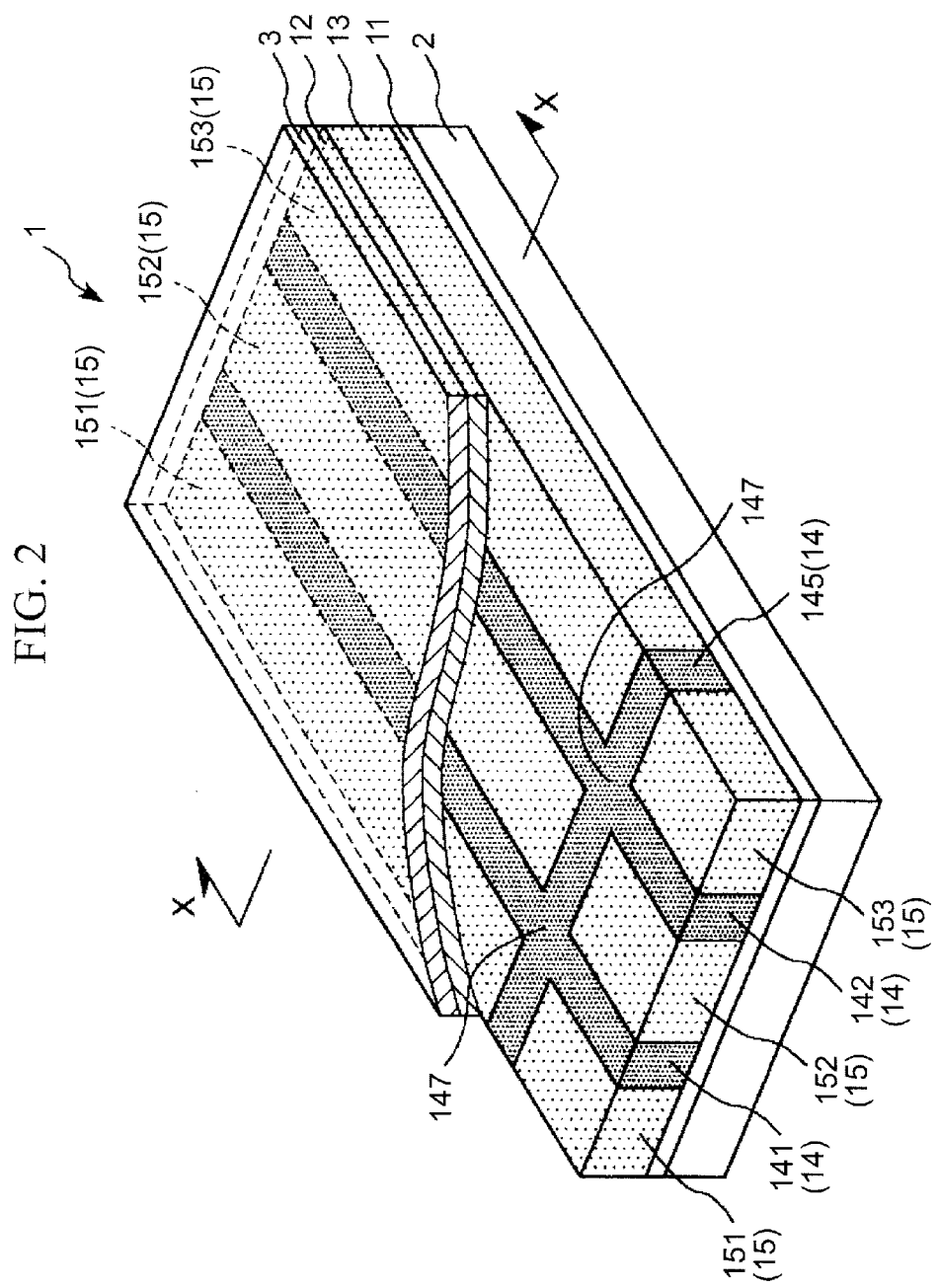
FIG. 2 is a perspective view illustrating a first embodiment of an optical waveguide of the present invention.

FIG. 2 is a perspective view illustrating the first embodiment of the optical waveguide of the present invention (with a portion cut away, and illustrated as partially transparent).

The optical waveguide 1 illustrated in FIG. 2 has a support film 2, and three layers including a cladding layer 11, a core layer 13 and a cladding layer 12 laminated in that order on the support film 2. Further, the optical waveguide 1 illustrated in FIG. 2 is sandwiched between the support film 2 from below and a cover film 3 from above.

Further, the core layer 13 is formed from two parallel core portions 14 (a first core portion 141 and a third core portion 142), a single core portion 14 (a second core portion 145) which intersects each of the two parallel core portions 14 at right angles, and side cladding portions 15 (a first side cladding portion 151, a second side cladding portion 152 and a third side cladding portion 153) which are adjacent to and adjoin these core portions 14.

The core layer 13 of the optical waveguide 1 illustrated in FIG. 2 has a refractive index distribution W which exhibits variation in the refractive index in the width direction. The refractive index distribution W includes high refractive index regions each including a local maximum value, and low refractive index regions having a lower refractive index than that of the high refractive index regions, and the refractive index varies continuously within at least a portion of the distribution or across the entire distribution. With this type of refractive index distribution W, the core portions 14 are positioned corresponding with the high refractive index regions, and the side cladding portions 15 are positioned corresponding with the low refractive index regions. The aforementioned expression "within at least a portion" describes a distribution (GI type) in which a region having a constant refractive index exists within the low refractive index regions. Further, the expression "across the entire distribution" describes a distribution (W type) in which the refractive index varies continuously even in the low refractive index regions.

This refractive index distribution W is formed by partially irradiating light onto a layer composed of a material containing a polymer and a photopolymerizable monomer having a different refractive index from the polymer, the photopolymerizable monomer being dispersed within the polymer, thereby causing migration and uneven distribution of the photopolymerizable monomer and generating variation in the refractive index within the layer. Because the distribution is formed on these principles, the refractive index in the refractive index distribution W varies continuously.

The optical waveguide 1 having the types of features described above can transmit incident light while confining the light to the regions of high refractive index. Particularly in the case of the optical waveguide 1 having the refractive index distribution W, because the change in the refractive index is continuous, the incident light is transmitted concentrated in the vicinity of the local maximum value for the refractive index in the refractive index distribution W. As a result, transmission loss and rounding of the pulse signal can be suppressed, and even if a large volume of optical signals are input, highly reliable optical communication can be achieved. Further, even when the plurality of core portions 14 mutually intersect within the same plane, optical signal interference is suppressed. Furthermore, the optical waveguide 1 can be formed by a step of simply selecting and irradiating a light irradiation region. Accordingly, even if a plurality of core portions 14 is formed to generate multiple channels, the spacing between core portions 14 is reduced to increase the density, or a plurality of core portions 14 intersect at a single point, the shape can be produced in accordance with the design, and high-quality optical communication can be performed.

Furthermore, the refractive index distribution W is a distribution in which, as described above, the refractive index varies continuously due to the migration and uneven distribution of the photopolymerizable monomer. As a result, the core layer 13 has no clear structural interfaces between the core portions 14 and the side cladding portions 15 formed within the core layer 13. Accordingly, peeling or cracking between the core portions 14 and the side cladding portions 15 is unlikely, making the optical waveguide 1a highly reliable product.

Preferred examples of each of the portions of the optical waveguide 1 are described below in detail.

(Core Layer)

In the core layer 13, if each core portion 14 is cut in a plane orthogonal to the longitudinal direction, then as described above, a refractive index distribution W in which the refractive index varies in the width direction can be formed within the cut cross-section (the first transverse cross-section).

In the present invention, when the expression "transverse cross-section of the optical waveguide" is used, this expression may be thought of as describing a cross-section orthogonal to the longitudinal direction of the core portion.

FIG. 3(a) illustrates a cross-sectional view along the line X-X of the optical waveguide illustrated in FIG. 2. FIG. 3(b) is a diagram schematically illustrating one example of the refractive index distribution W (GI type) along a centerline C1 which penetrates along the center in the thickness direction of the core layer 13 in the cross-sectional view, with the distance in the width direction shown along the horizontal axis, and the refractive index shown along the vertical axis.

As illustrated in FIG. 3(b), the refractive index distribution W is provided with a distribution which corresponds with the position of each core portion 14 and the position of each side cladding portion 15 (a width direction distribution, hereafter referred to as the refractive index distribution W). The refractive index distribution W has high refractive index regions WH of relatively high refractive index, which include a local maximum value Wm provided corresponding with the position of each core portion 14, and two tailing portions in which the refractive index decreases continuously toward both sides from this local maximum value Wm. Further, the refractive index distribution W also has low refractive index regions WL of relatively low refractive index provided corresponding with the position of each of the side cladding portions 15. In the high refractive index regions WH, on both sides of the local maximum value Wm, the refractive index traces a curve which continuously decreases toward the respective adjacent low refractive index region WL. In other words, in the high refractive index regions WH, the refractive index is distributed with the peak at the local maximum value Wm, and the refractive index then decreasing in smooth tails toward both sides. On the other hand, in the low refractive index regions WL, the refractive index is lower than the refractive index of the high refractive index regions WH, and is a substantially constant value.

Furthermore, the plurality of local maximum values Wm which exist within the refractive index distribution W preferably have the same value, but may vary slightly. In such cases, the variation is preferably not more than 10% of the average value of the plurality of local maximum values Wm.

Each of the two parallel core portions 14 (the first core portion 141 and the third core portion 142) has an elongated linear shape. In the type of refractive index distribution W described above, substantially the same distribution is maintained along the entire longitudinal direction of these core portions 14.

On the other hand, the type of refractive index distribution W described above is also formed in the core portion 14 (the second core portion 145) which intersects the above core portions (the first core portion 141 and the third core portion 142). In other words, substantially the same distribution is maintained along the entire longitudinal direction of this core portion (the second core portion 145).

With the type of refractive index distribution W described above, the two elongated core portions 14, the core portion 14 which intersects these core portions 14, and the side cladding portions 15 which adjoin the side surfaces of these core portions 14 are formed within the core layer 13 illustrated in FIG. 2.

More specifically, within the core layer 13 illustrated in FIG. 2 are provided the two parallel core portions 141 and 142 (the first core portion and the third core portion), the core portion 145 (the second core portion) that intersects these core portions, and the first side cladding portion 151, the second side cladding portion 152 and the third side cladding portion 153 which are provided in the regions outside these core portions. Each of the core portions 141, 142 and 145 exists in a state surrounded by the side cladding portions 151, 152 and 153, and the upper and lower cladding layers 11 and 12. The refractive indices of the core portions 141, 142 and 145 are higher than the refractive indices of the side cladding portions 151, 152 and 153. Accordingly, light can be confined in the width direction of each of the core portions 141, 142 and 145. Each core portion 14 illustrated in FIG. 1 is represented by a region of dense dots, and each side cladding portion 15 is represented by a region of sparse dots.

Further, in the optical waveguide 1, light incident at one end of a core portion 14 is transmitted to the other end while also being confined within the thickness direction of the core portion 14, and can be extracted from the other end of the core portion 14.

In the core portions illustrated in FIG. 1, the transverse cross-sectional shape of the portions has a quadrangular (rectangular) shape such as a square or a rectangle. However, there are no particular limitations on the shape of the transverse cross-section, and a circular shape such as a perfect circle, ellipse or oval, or a polygonal shape such as a triangle, pentagon or hexagon may also be used. When the transverse cross-sectional shape of the core portions 14 is rectangular, core portions of stable quality can be produced with good efficiency. On the other hand, when the transverse cross-sectional shape of the core portions 14 is circular, the transmission efficiency of the core portions 14 improves, the convergence of the transmitted light improves, and the optical coupling efficiency with other optical components is enhanced.

There are no particular limitations on the width of the core portions 14 and the height of the core portions (the thickness of the core layer 13), but each is preferably about 1 to 200 µm, more preferably about 5 to 100 µm, and still more preferably about 10 to 70 µm. This enables crosstalk in the optical waveguide 1 to be better suppressed. There are also no particular limitations on the thickness of the core layer, but the thickness is preferably about 1 to 200 µm, more preferably about 5 to 100 µm, and still more preferably about 10 to 70 µm.

In the refractive index distribution W, in at least a portion of the distribution or across the entire distribution, the refractive index varies continuously and traces out a curve. As a result of this feature, the light confinement effect within the core portions 14 is enhanced compared with an optical waveguide having a so-called step index type (SI type) refractive index distribution in which the refractive index changes in a stepwise manner, and therefore further reductions in transmission loss can be achieved.

Moreover, in the refractive index distribution W described above, the refractive index varies continuously in the region mentioned above, and includes a local maximum value. Accordingly, because the speed of the light is inversely proportional to the refractive index, the speed of the light increases with increasing distance from the center, and transmission time differences between optical paths are unlikely. As a result, the transmitted waveform is less likely to deteriorate. For example, even if the transmitted light contains a pulse signal, rounding of the pulse signal (broadening of the pulse signal) can be suppressed. In addition, interference between transmitted light signals at the intersection portions is also inhibited. As a result, an optical waveguide 1 which can improve the quality of optical communication can be obtained.

In the present invention, the expression that the refractive index varies continuously within the refractive index distribution W describes a state in which the curve of the refractive index distribution W is rounded at each portion of the distribution, with this curve being differentiable.

Figure 3:
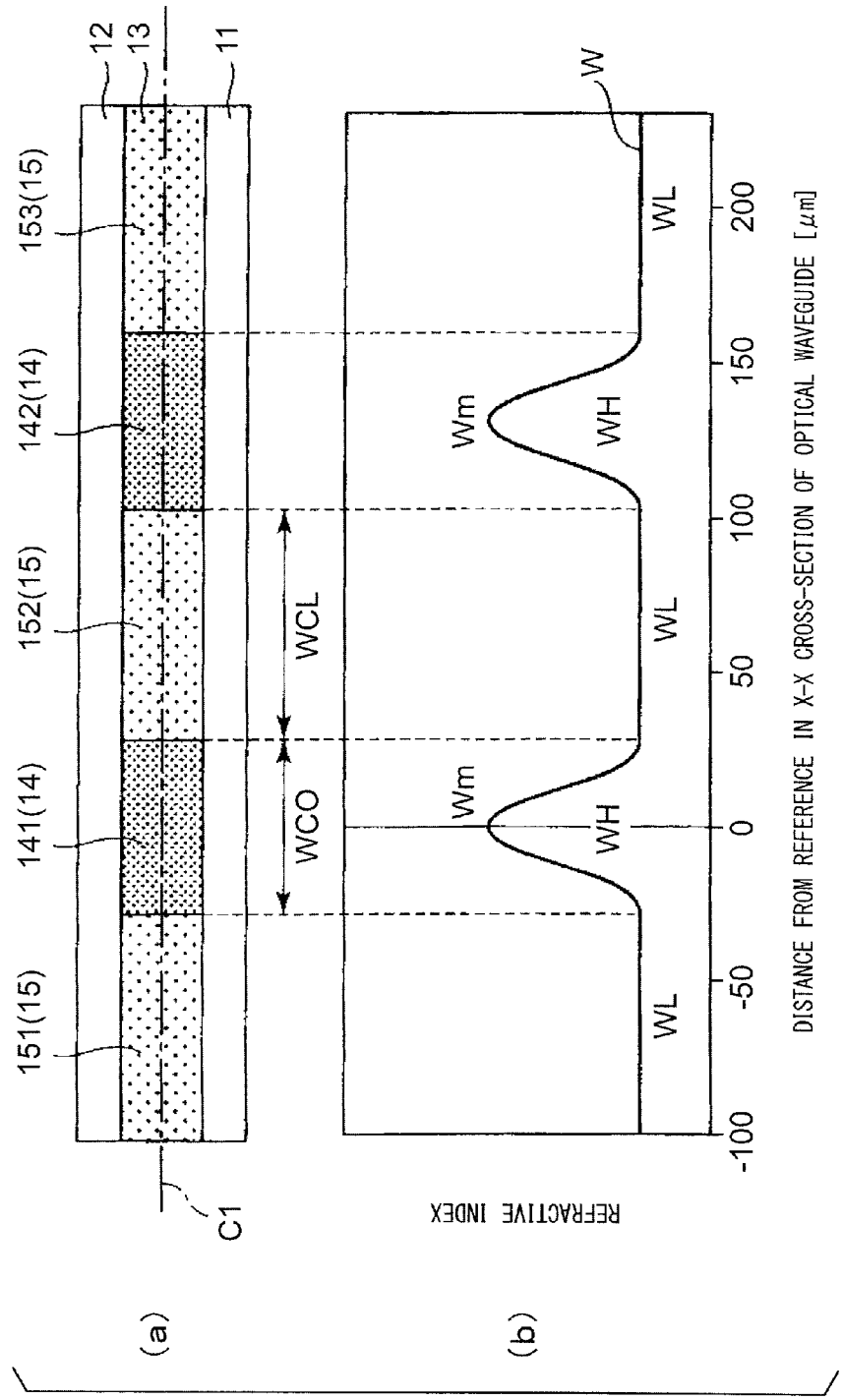
FIG. 3 is a diagram schematically illustrating one example of a refractive index distribution W (GI type) for the cross-section along the line X-X of the optical waveguide illustrated in FIG. 2.

Further, within the refractive index distribution W, as illustrated in FIG. 3, the local maximum values Wm are positioned within the core portions 141 and 142. Within these core portions 141 and 142, the local maximum values Wm are preferably positioned in the central portion of the width of each core portion. This feature increases the probability that, within each core portion 141 and 142, the transmitted light will be concentrated in the central portion of the width of the core portion, resulting in a relative reduction in the probability that light will leak into the side cladding portions 151, 152 and 153. As a result, transmission loss in the core portions 141 and 142 can be further reduced.

The central portion of the width of the core portion 141 describes the region from the center of the refractive index distribution WH to a distance 30%, and preferably 15%, of the width of the refractive index distribution WH on both sides of the center.

Further, the difference between the local maximum value Wm and the average refractive index in the low refractive index region WL is preferably as large as possible. The difference can be selected as required, but for example, is preferably from about 0.005 to 0.07, more preferably from about 0.007 to 0.05, and still more preferably from about 0.01 to 0.03. As a result of this feature, light can be reliably confined within the core portions 141 and 142. In other words, if the refractive index difference is lower than the above lower limit, then there is a possibility that light may leak from the core portions 141 and 142. On the other hand, if the refractive index difference exceeds the above upper limit, then not only can no further improvement in the light confinement effect be expected, but the production of the optical waveguide 1 may sometimes become more difficult.

Furthermore, as illustrated in FIG. 3(b), when the position (distance) across the transverse cross-section of the core layer 13 is shown along the horizontal axis and the refractive index is shown along the vertical axis, the refractive index distribution W in each of the core portions 141 and 142 preferably has a substantially inverted U-shape, that is a convex form, in the vicinity of the local maximum value Wm. As a result of this shape, the light confinement effect in the core portions 141 and 142 becomes even more marked.

On the other hand, the deviation of the refractive index from the average refractive index in the low refractive index regions WL is preferably not more than 5% of the average refractive index. This enables the low refractive index regions WL to function reliably as the side cladding portions 15.

By using the refractive index distribution W described above, a variety of effects can be obtained, including a reduction in transmission loss, a reduction in rounding of pulse signals, suppression of crosstalk, and suppression of interference at the intersection portions. Further, the inventors of the present invention discovered that these effects are affected significantly by the average width WCL of the side cladding portions, and/or the ratio between the average width WCO of the core portions and the average width WCL of the side cladding portions. The inventors found that when these factors satisfied prescribed ranges, the effects mentioned above became more marked and reliable.

In the present invention, the ratio between the average width WCO of the core portions 14 and the average width WCL of the side cladding portions 15 (namely, WCO/WCL) is preferably within a range from 0.1 to 10. By optimizing the ratio between the widths of the core portions 14 and the side cladding portions 15, each of the effects described above can be enhanced. If WCO/WCL is less than the above lower limit, then there is a possibility that the average width of the core portions 14 may become too narrow, and therefore although a reduction in crosstalk can be achieved, transmission loss tends to increase, and miniaturization of the optical waveguide 1 may be hindered. Further, if WCO/WCL exceeds the above upper limit, then there is a possibility that the average width of the side cladding portions 15 may become too narrow, resulting in increased crosstalk, and the average width of the core portions 14 may become too wide, meaning there is a chance of increased rounding of pulse signals.

The value of WCO/WCL is more preferably about 0.1 to 5, and still more preferably about 0.2 to 4.

The average width WCO of the core portions 14 and the average width WCL of the side cladding portions 15 may each be selected as appropriate. In addition to the condition described above, preferred ranges for these widths have a lower limit which may be at least 0.1 μm, at least 1 μm, at least 5 μm, or at least 10 μm. Alternatively, the lower limit may be at least 30 μm, or at least 50 μm. The upper limit may be not more than 5 mm, not more than 1 mm, not more than 0.5 mm, or not more than 0.2 μm.

Further, the distance between the local maximum values Wm may be selected as required. A preferred range for this distance has a lower limit that is preferably at least 10 μm, more preferably at least 20 μm, and still more preferably 30 μm or greater. The lower limit may also be 50 μm or greater. Further, the upper limit is preferably not more than 800 μm, more preferably not more than 500 μm, still more preferably not more than 400 μm, and most preferably 300 μm or less. If required, the upper limit may be not more than 200 μm, or 100 μm or less.

The length of the core portions can be selected as required. For example, the length may be from 1 to 500 cm, from 2 to 200 cm, or from 10 to 100 cm.

Moreover, in the present invention, independently from the WCO/WCL ratio, or in addition to the ratio, the average width WCL of the side cladding portions 15 is preferably within a range from 5 to 250 μm. This feature enables each of the effects described above to be further enhanced. If WCL is less than the above lower limit, then the average width of the side cladding portions 15 may become too narrow, and therefore there are possibilities of increased rounding of pulse signals and increased crosstalk. Further, if WCL exceeds the above upper limit, then the shape of the refractive index distribution W cannot be optimized, and there is a possibility that transmission loss may increase. Moreover, there is a possibility that miniaturization of the optical waveguide 1 may become more difficult.

The aforementioned WCL is more preferably within a range from 10 to 200 μm, still more preferably within a range from 10 to 120 μm, and particularly preferably within a range from 10 to 60 μm.

The average width WCO of the core portions 14 is also more preferably within a range from 10 to 200 μm, still more preferably within a range from 10 to 120 μm, and particularly preferably within a range from 10 to 60 μm.

Furthermore, in the present invention, the refractive index distribution W may include a flat portion in which the refractive index undergoes essentially no change in the vicinity of each local maximum value Wm. Even in this case, the optical waveguide of the present invention exhibits the types of actions and effects described above. Here, the flat portion in which the refractive index undergoes essentially no change describes a region in which the fluctuation in the refractive index is less than 0.001, and the refractive index decreases in a continuous manner from both sides of the region.

There are no particular limitations on the length of this flat portion, but the length is preferably not more than 100 μm, more preferably 20 μm or less, and still more preferably 10 μm or less.

Furthermore, in the aforementioned tailing portions, the rate of change in the refractive index is preferably about 0.001 to 0.035 [/10 μm], and more preferably about 0.002 to 0.030 [/10 μm]. Provided the rate of change in the refractive index satisfies the above range, the effects such as the reduction in the transmission loss in each of the core portions 14, the reduction in the rounding of pulse signals, the suppression of crosstalk, and the suppression of interference at the intersection portions are further enhanced.

Furthermore, the present embodiment described a case in which the core layer 13 had three core portions 14. However, the number of core portions 14 is not particularly limited, and may be selected as desired. For example, either 2 core portions, or 4 or more core portions may also be used. In these cases, in a similar manner to above, the refractive index distribution W has a distribution having a high refractive index region WH corresponding with each core portion 14, with a low refractive index region WL existing between high refractive index regions WH.

The constituent material (main material) of the type of core layer 13 described above may be any material in which the refractive index difference described above occurs. Examples of materials that can be used include various resin materials, including acrylic-based resins, methacrylic-based resins, cyclic ether-based resins such as epoxy-based resins and oxetane-based resins, polyimides, polybenzoxazoles, polysilanes, polysilazanes, silicone-based resins, fluororesins and polyolefin-based resins such as norbornene-based resins, and glass materials. The resin material may be a composite material containing a combination of materials having different compositions.

Further, among these, the use of one or more material selected from the group consisting of (meth)acrylic-based resins, epoxy-based resins and polyolefin-based resins is preferable. These resin materials exhibit high light transmittance, and therefore yield an optical waveguide 1 having particularly low transmission loss.

The refractive index distribution W may also include a local minimum value between the high refractive index region WH and the low refractive index region WL (the interface portion). By using this type of configuration, the function of the waveguide in transmitting the light while confined within the high refractive index region is enhanced, and transmission loss and pulse signal rounding can be suppressed to particularly low levels.

Furthermore, the low refractive index region WL preferably includes a local maximum value (referred to as a "second local maximum value") which is smaller than the local maximum value (referred to as the "first local maximum value") included in the high refractive index region WH. By including this type of second local maximum value in the low refractive index region WL, crosstalk between adjacent core portions in the width direction is suppressed. As a result, even if a plurality of core portions is formed within the core layer 13 to generate multiple channels, and the spacing between core portions is reduced to increase the density, the optical waveguide 1 of the present invention can still maintain high quality optical communication. Moreover, even if a plurality of the core portions 14 mutually intersect within the same plane, interference of the optical signals is suppressed.

Figure 4:
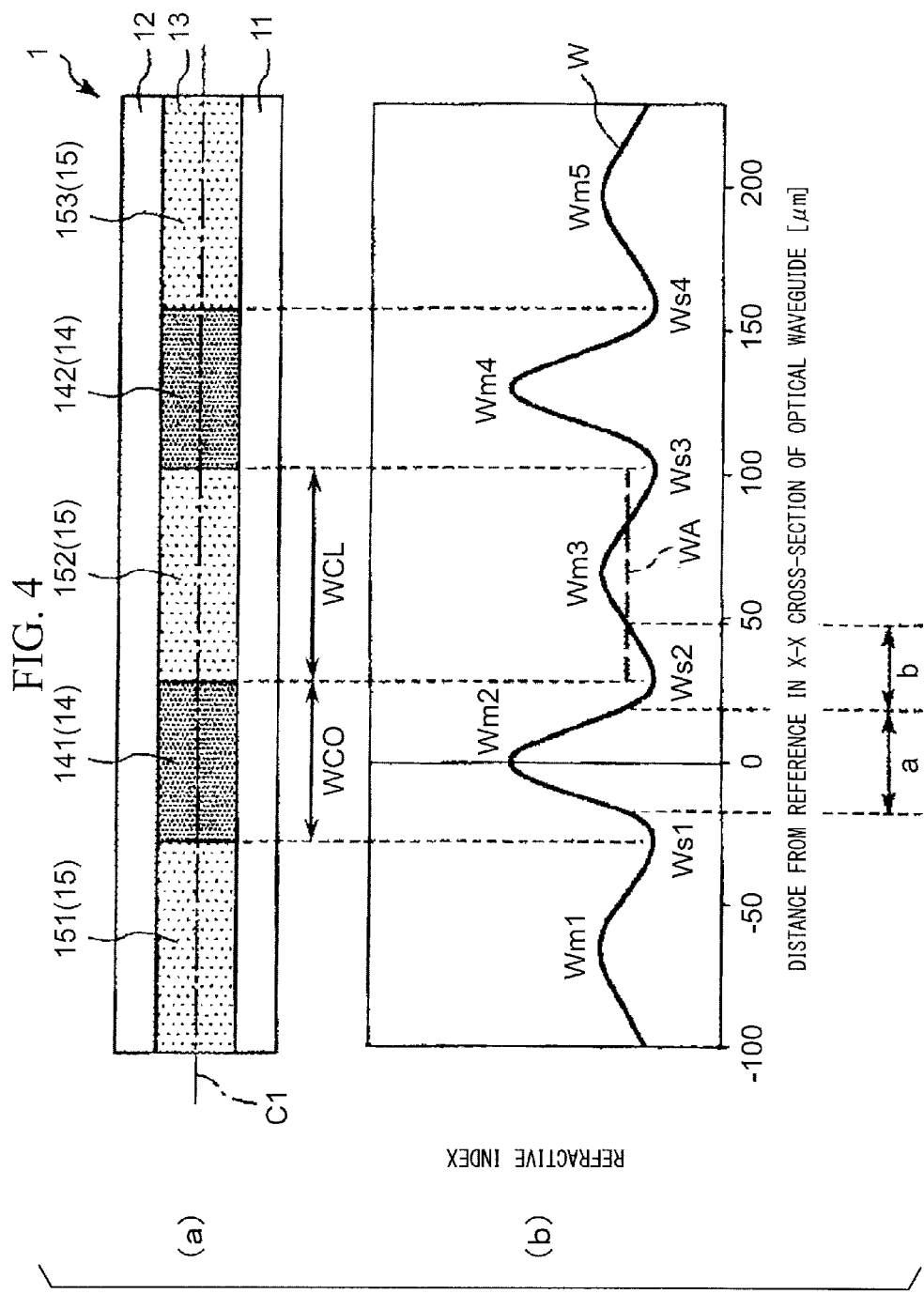
FIG. 4 is a diagram schematically illustrating another example of a refractive index distribution W (W type) for the cross-section along the line X-X of the optical waveguide illustrated in FIG. 2.

FIG. 4(*a*) is a cross-sectional view along the line X-X of FIG. 2. FIG. 4(*b*) is a diagram schematically illustrating another example of the refractive index distribution W along the centerline C1 which penetrates along the center in the thickness direction of the core layer 13. Unless specified otherwise, this example may have the same conditions as the example described above.

The refractive index distribution W illustrated in FIG. 4(*b*) has four local minimum values Ws1, Ws2, Ws3 and Ws4, and five local maximum values Wm1, Wm2, Wm3, Wm4 and Wm5. Further, within the five local maximum values there exist local maximum values (first local maximum values) Wm2 and Wm4 with relatively large refractive indices, and local maximum values (second local maximum values) Wm1, Wm3 and Wm5 with relatively small refractive indices.

Of these, the local maximum value Wm2 and the local maximum value Wm4 exist between the local minimum value Ws1 and the local minimum value Ws2, and the local minimum value Ws3 and the local minimum value Ws4 respectively.

In the optical waveguide 1 illustrated in FIG. 4, the local maximum value Wm2 having a relatively large refractive index is positioned between the local minimum value Ws1 and the local minimum value Ws2, and this region having a relatively large refractive index becomes a core portion 14. Similarly, the local maximum value Wm4 is positioned between the local minimum value Ws3 and the local minimum value Ws4, and this region having a relatively large refractive index also becomes a core portion 14. Here, the region between the local minimum value Ws1 and the local minimum value Ws2 functions as the core portion 141, and the region between the local minimum value Ws3 and the local minimum value Ws4 functions as the core portion 142.

In FIG. 4, the region on the left side of the local minimum value Ws1, the region between the local minimum value Ws2 and the local minimum value Ws3, and the region on the right side of the local minimum value Ws4 represent regions adjacent to both side surfaces of the core portions 14. These regions become the side cladding portions 15. Here, the region on the left side of the local minimum value Ws1 functions as the side cladding portion 151 (first side cladding portion), the region between the local minimum value Ws2 and the local minimum value Ws3 functions as the side cladding portion 152 (second side cladding portion), and the region on the right side of the local minimum value Ws4 functions as the side cladding portion 153 (third side cladding portion).

In other words, in this example, the refractive index distribution W has at least a region in which a second local maximum value included in a low refractive index region, a local minimum value, a first local maximum value included in a high refractive index region, a local minimum value, and a separate second local maximum value different from the above second local maximum are arranged in sequence. This region is provided repeatedly in accordance with the number of core portions. When there are two core portions 14, as in the present embodiment, the refractive index distribution W has a region in which local maximum values and local minimum values are arranged alternately, and among the local maximum values, the first local maximum values and second local maximum values are arranged alternately, such as a region in which a second local maximum value, a local minimum value, a first local maximum value, a local minimum value, a second local maximum value, a local minimum value, a first local maximum value, a local minimum value, and a second local maximum value are arranged in sequence.

Further, the plurality of local minimum values, the plurality of first local maximum values, and the plurality of second local maximum values each preferably have substantially the same value. However, provided the relationships wherein the local minimum values are smaller than the first local maximum values and the second local maximum values, and the second local maximum values are smaller than the first local maximum values are maintained, slight differences in the values within each plurality are acceptable. In this case, the difference is preferably kept within 10% of the average value of the plurality of local minimum values.

The four local minimum values Ws1, Ws2, Ws3 and Ws4 shown in FIG. 4 each has a value less than the value of the average refractive index WA in the adjoining side cladding portions 15. As a result of this feature, a region having an even smaller refractive index than the average refractive index of the side cladding portions 15 exists at the boundary between each core portion 14 and each side cladding portion 15. Consequently, a more steeply sloped refractive index gradient is formed in the vicinity of each of the local minimum values Ws1, Ws2, Ws3 and Ws4. As a result, light leakage from each core portion 14 is better suppressed, and an optical waveguide 1 with less transmission loss can be obtained.

Furthermore, within the refractive index distribution W illustrated in FIG. 4(b), the local maximum values Wm1, Wm3 and Wm5 (the second local maximum values) are positioned within the side cladding portion 151, 152 and 153. These local maximum values are preferably positioned away from positions near the edges of the side cladding portions 151, 152 and 153 (positions near the interfaces between the core portions 141 and 142 and the side cladding portions). As a result of this feature, the local maximum values Wm2 and Wm4 (the first local maximum values) within the core portions 141 and 142, and the local maximum values Wm1, Wm3 and Wm5 (the second local maximum values) within the side cladding portions 151, 152 and 153 can be satisfactorily separated from each other. Consequently, the probability that transmitted light within the core portions 141 and 142 will leak into the side cladding portion 151, 152 and 153 can be satisfactorily reduced. As a result, transmission loss within the core portions 141 and 142 can be reduced.

The expression "near the edges of the side cladding portions 151, 152 and 153" describes regions that extend inward into each side cladding portion a distance of 5% of the width of each side cladding portion 151, 152 and 153 from the aforementioned edge.

Furthermore, the local maximum values Wm1, Wm3 and Wm5 (the second local maximum values) are preferably positioned in the central regions of the widths of the side cladding portions 151, 152 and 153 respectively, and the refractive index preferably decreases continuously from these local maximum values Wm1, Wm3 and Wm5 (the second local maximum values) toward the adjacent local minimum values Ws1, Ws2, Ws3 and Ws4. As a result of this feature, the separation distances between the local maximum values Wm2 and Wm4 (the first local maximum values) within the core portions 141 and 142, and the local maximum values Wm1, Wm3 and Wm5 (the second local maximum values) within the side cladding portions 151, 152 and 153 are maximized, and light can be reliably confined in the vicinity of the local maximum values Wm1, Wm3 and Wm5 (the second local maximum values). Consequently, leakage of transmitted light from the core portions 141 and 142 can be more reliably suppressed.

Moreover, the local maximum values Wm1, Wm3 and Wm5 (the second local maximum values) have a smaller refractive index than that of the local maximum values Wm2 and Wm4 (the first local maximum values) positioned in the core portions 141 and 142. Accordingly, despite not having the superior light transmission properties of the core portions 141 and 142, because the refractive index is higher than that of the surrounding regions, some slight light transmission properties still exist. As a result, the side cladding portion 151, 152 and 153 can confine any transmitted light that leaks from the core portions 141 and 142, thereby preventing propagation of the light into other core portions. In other words, the existence of the local maximum values Wm1, Wm3 and Wm5 (the second local maximum values) can suppress crosstalk.

As mentioned above, each of the local minimum values Ws1, Ws2, Ws3 and Ws4 has a refractive index that is less than the average refractive index WA of the adjoining side cladding portions 15. The difference preferably falls within a prescribed range. Specifically, the difference between the local minimum values Ws1, Ws2, Ws3 and Ws4, and the average refractive index WA of the side cladding portions 15 is preferably about 3 to 80%, more preferably about 5 to 50%, and still more preferably about 7 to 20%, of the difference between one of the local minimum values Ws1, Ws2, Ws3 and Ws4 or the average thereof, and one of the local maximum values Wm2 and Wm4 in the core portions 141 and 142 or the average thereof. As a result of this feature, the side cladding portions 15 have the necessary light transmission properties for satisfactorily suppressing crosstalk. Moreover, if the difference between the local minimum values Ws1, Ws2, Ws3 and Ws4, and the average refractive index WA of the side cladding portions 15 is less than the lower limit of the above range, then there is a possibility that the light transmission properties in the side cladding portions 15 may become too low, making it difficult to satisfactorily suppress crosstalk. If the difference exceeds the upper limit of the above range, there is a possibility that the light transmission properties in the side cladding portions 15 may become too great, which can have an adverse effect on the light transmission properties of the core portions 141 and 142.

Further, the difference between the local minimum values Ws1, Ws2, Ws3 and Ws4, and the local maximum values Wm1, Wm3 and Wm5 (the second local maximum values) is preferably about 6 to 90%, more preferably about 10 to 70%, and still more preferably about 14 to 40% of the difference between the local minimum values Ws1, Ws2, Ws3 and Ws4, and the local maximum values Wm2 and Wm4 (the first local maximum values). As a result, an optimal balance is achieved between the height of the refractive index in the side cladding portions 15 and the height of the refractive index in the core portions 14, and therefore the optical waveguide 1 has particularly superior light transmission properties and can more reliably suppress crosstalk.

The difference between the local minimum values Ws1, Ws2, Ws3 and Ws4, and the local maximum values Wm2 and Wm4 (the first local maximum values) within the core portions 141 and 142 is preferably as large as possible, and is preferably from about 0.005 to 0.07, more preferably from about 0.007 to 0.05, and still more preferably from about 0.01 to 0.03. As a result, the refractive index difference is sufficient to satisfactorily confine the light within the core portions 141 and 142.

The distance between the local maximum values Wm2 and Wm4 (the first local maximum values) can be selected as required. For example, the lower limit of a preferred range is preferably at least 10 μm, more preferably at least 20 μm, and still more preferably 30 μm or greater. Further, the upper limit is preferably not more than 800 μm, more preferably not more than 500 μm, still more preferably not more than 400 μm, and particularly preferably 300 μm or less. If necessary, the distance may also be 200 μm or less, or even 100 μm or less.

Figure 5:
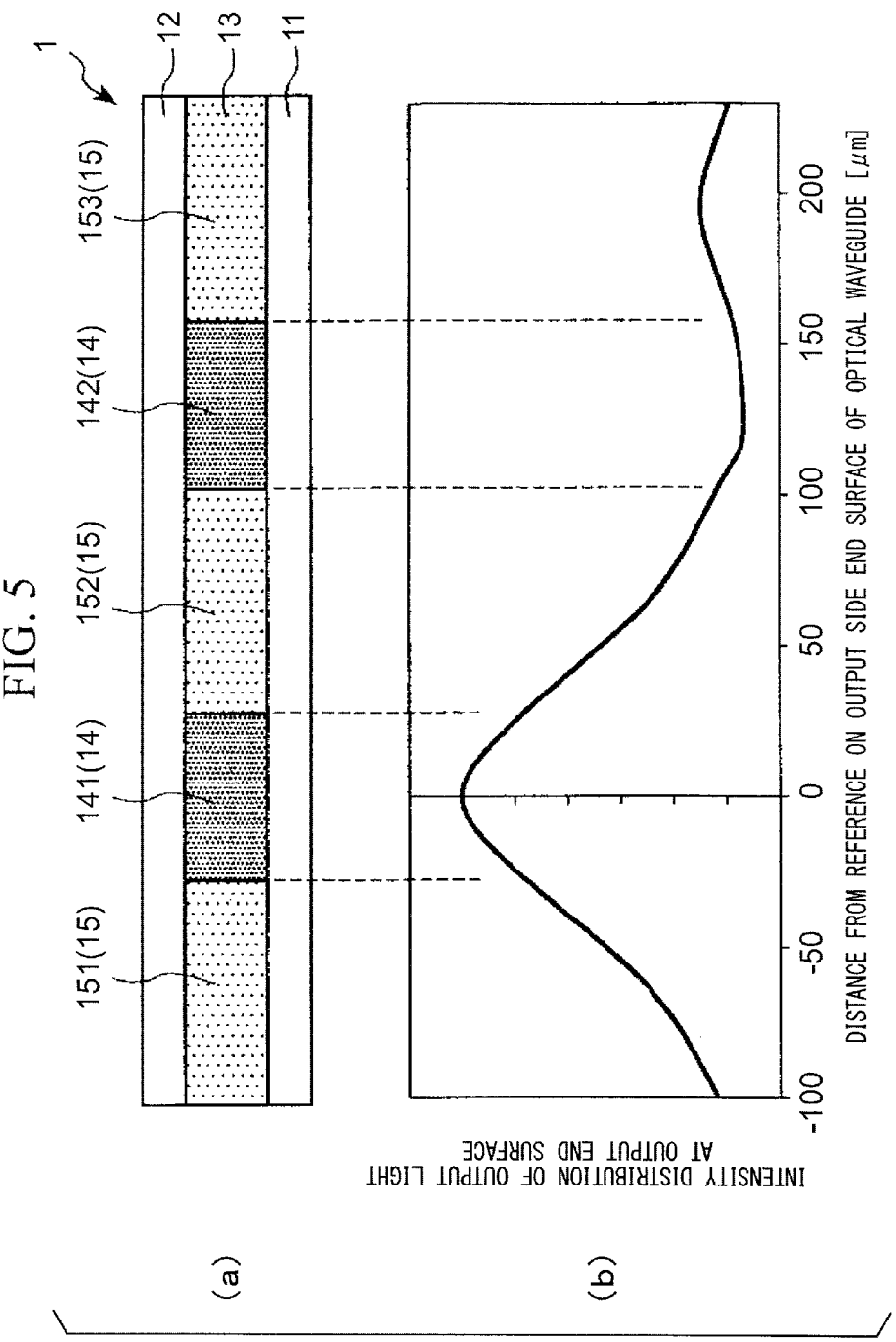
FIG. 5 is a diagram illustrating one example of the intensity distribution of the output light when light is incident upon one of the two core portions of an optical waveguide having the refractive index distribution illustrated in FIG. 4.

FIG. 5 is a diagram illustrating the intensity distribution of the output light when light is incident upon only one core portion 141 of the optical waveguide 1 having the refractive index distribution illustrated in FIG. 4. This intensity distribution is the intensity distribution of the output light at the other end of the optical waveguide when light is incident on one end (the input end) of the core portion 141 among the two parallel core portions 141 and 142 formed in the optical waveguide 1.

When light is incident upon the core portion 141, the intensity of the output light is greatest in the central portion of the core portion 141 at the output end. The intensity of the output light decreases with increasing separation from the central portion of the core portion 141. In the optical waveguide 1, an intensity distribution can be obtained in which the intensity of the output light has a local minimum value within the core portion 142 adjacent to the core portion 141. Because the local minimum value of the intensity distribution of the output light coincides with the core portion 142 in this manner, crosstalk in the core portion 142 can be suppressed to an extremely low level. As a result, even in multichannel and high-density configurations, the optical waveguide 1 is capable of reliably preventing the occurrence of crosstalk.

In conventional optical waveguides, the intensity distribution of output light in a core portion adjacent to the core portion into which light is input does not adopt a local minimum value, but rather adopts a local maximum value. As a result, crosstalk problems tended to occur. In contrast, the type of intensity distribution of the output light in the optical waveguide of the present invention described above is extremely useful in suppressing crosstalk.

Although detailed reasons as to why this type of intensity distribution is obtained in the optical waveguide of the present invention remain unclear, one possible reason is described below. Specifically, the characteristic refractive index distribution W which has the local minimum values Ws1, Ws2, Ws3 and Ws4, and in which the refractive index varies continuously across the entire refractive index distribution W, shifts the local maximum value that appears at the core portion 142 in the output light intensity distribution in a conventional optical waveguide to a local maximum value that appears at the side cladding portion 153 or the like adjacent to the core portion 142. In other words, this shift in the intensity distribution enables more reliable suppression of crosstalk.

Even though the intensity distribution of the output light shifts toward the side cladding portions 15, the light receiving elements and the like are positioned in alignment with the positions of the core portions 14. As a result, there is almost no chance of crosstalk, and no degradation in the quality of the optical communication.

Further, the type of output light intensity distribution described above can be observed with high probability when at least two core portions are formed in parallel in the optical waveguide of the present invention, but is not necessarily always observed. Depending on factors such as the NA (numerical aperture) of the incident light, the transverse cross-sectional area of the core portion 141, and the pitch between the core portions 141 and 142, a clear local minimum value may not be observable, or the position of the local minimum value may not be included in the core portion 142. However, even in these cases, crosstalk is still satisfactorily suppressed.

Furthermore, in the refractive index distribution W illustrated in FIG. 4(*b*), when the average refractive index in the side cladding portions 15 is denoted WA, the width of the portions in the vicinity of the local maximum values Wm2 and Wm4 (the first local maximum values) where the refractive index is continuously equal to or greater than the average refractive index WA is denoted a [μm], and the width of the portions in the vicinity of the local minimum values Ws1, Ws2, Ws3 and Ws4 where the refractive index is continuously less than the average refractive index WA is denoted b [μm]. Then, b is preferably about 0.01a to 1.2a, more preferably about 0.03a to 1a, and still more preferably about 0.1a to 0.8a. As a result, the effective width of the local minimum values Ws1, Ws2, Ws3 and Ws4 is sufficient to achieve the actions and effects described above. In other words, if b is less than the above lower limit, then the effective width of the local minimum values Ws1, Ws2, Ws3 and Ws4 becomes too narrow, and there is a possibility that the action of the core portions 141 and 142 in confining the light may deteriorate. In contrast, if b exceeds the upper limit of the above range, then the effective width of the local minimum values Ws1, Ws2, Ws3 and Ws4 becomes too broad, resulting in corresponding limits on the width and pitch of the core portions 141 and 142, and there are possibilities that the transmission efficiency may deteriorate, and that multichannel and high-density configurations may become less feasible.

The average refractive index WA in the side cladding portions 15 can be approximated as the midpoint between the local maximum value Wm1 and the local minimum value Ws1.

(Cladding Layers)

The cladding layers 11 and 12 constitute the cladding portions positioned respectively below and above the core layer 13.

The average thickness of the cladding layers 11 and 12 is preferably about 0.05 to 1.5 times, and more preferably about 0.1 to 1.25 times, the average thickness of the core layer 13 (the average height of each core portion 14). Specifically, although there are no particular limitations on the average thickness of the cladding layers 11 and 12, each is typically about 1 to 200 μm, preferably about 3 to 100 μm, and more preferably about 5 to 60 μm. This enables the optical waveguide 1 to be prevented from becoming unnecessarily large (thick film), while ensuring favorable functionality as cladding portions.

Further, the constituent materials for the cladding layers 11 and 12 can be selected as appropriate, and for example, the same materials as those mentioned above for the constituent material for the core layer 13 can be used. A (meth)acrylic-based resin, epoxy-based resin or polyolefin-based resin is particularly preferable.

When selecting the constituent material for the core layer 13 and the constituent material for the cladding layers 11 and 12, the materials are preferably selected with due consideration of the difference in refractive index between the two materials. Specifically, in order to ensure reliable confinement of the light in the core portions 14, the materials are preferably selected so that the refractive index of the constituent material for the core portions 14 is appropriately greater. This ensures that a satisfactory refractive index difference is obtained in the thickness direction of the optical waveguide 1, and can suppress leakage of light from each core portion 14 into the cladding layers 11 and 12.

From the viewpoint of suppressing light attenuation, it is also important to ensure good adhesion (affinity) between the constituent material for the core layer 13 and the constituent material for the cladding layers 11 and 12.

On the other hand, there are no particular limitations on the shape of the refractive index distribution T in the thickness direction of the optical waveguide 1, provided that the refractive index of the core portion 14 is high and the refractive index of the cladding layers 11 and 12 is low (for example, a step index type (SI type) distribution, or a so-called graded index type (GI type) distribution or W type distribution in which the refractive index varies continuously may be used). However, the distribution preferably has a local maximum value at the core portion 14, and local minimum values in the vicinity of the boundaries between the core portion 14 and the cladding layers 11 and 12. The above expression that the "refractive index varies continuously" describes a state in which, in a similar manner to the refractive index distribution W described above, the curve of the refractive index distribution T is rounded at each portion of the distribution, with this curve being differentiable.

Figure 6A:
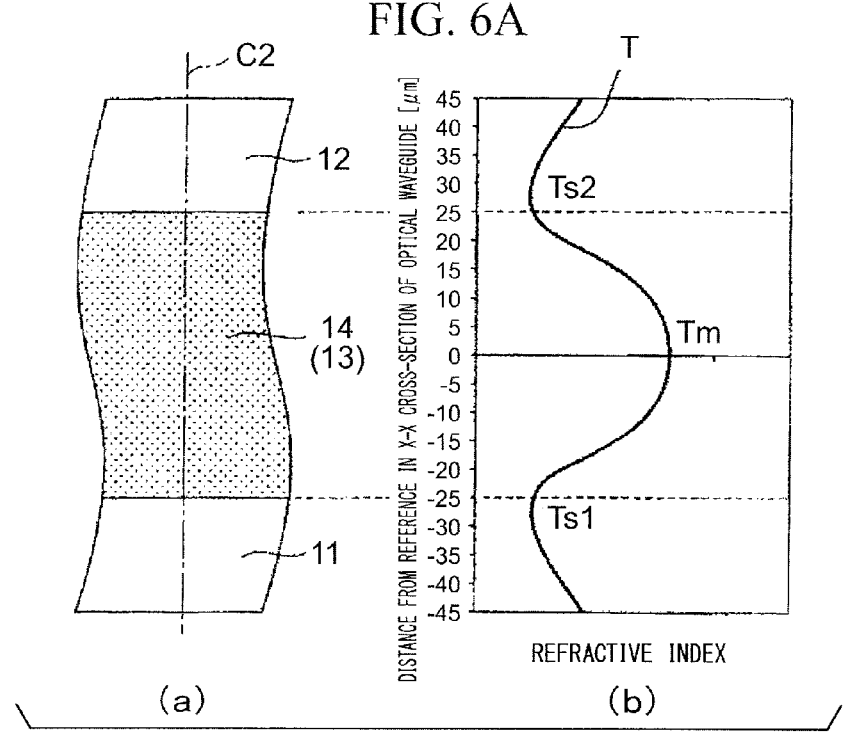
FIG. 6A is a diagram illustrating a portion of the cross-section along the line X-X of the optical waveguide illustrated in FIG. 2, and also schematically illustrating one example of a refractive index distribution T (W type) in the thickness direction of that portion.
Figure 6B:
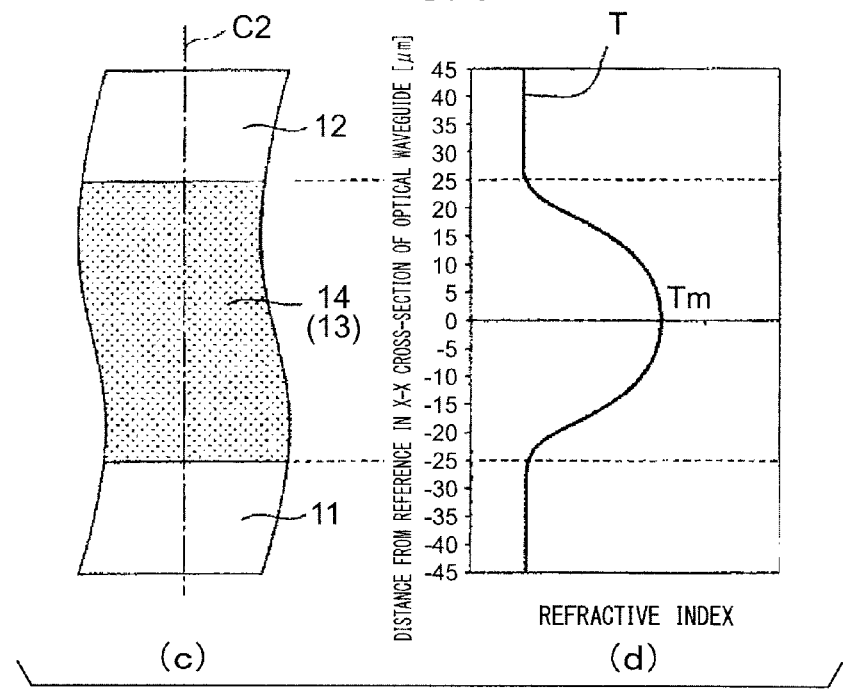
FIG. 6B is a diagram illustrating a portion of the cross-section along the line X-X of the optical waveguide illustrated in FIG. 2, and also schematically illustrating one example of a refractive index distribution T (GI type) in the thickness direction of that portion.

FIG. 6A(a) and FIG. 6B(c) are diagrams illustrating portions of the cross-sectional view along the line X-X shown in FIG. 2, and illustrate cuts centered around a core portion that is sandwiched from above and below by the cladding layers. FIG. 6A(b) and FIG. 6B(d) are diagrams schematically illustrating examples of the refractive index distribution T along a centerline C2 which penetrates perpendicularly along the center in the width direction of the core portion. FIG. 6A(b) and FIG. 6B(d) illustrate examples of the refractive index distribution T when the refractive index is shown along the horizontal axis, and the position on the centerline C2 (the distance, wherein the center in the thickness direction of the core portion is deemed to be zero) is shown along the vertical axis.

As described above, the optical waveguide 1 includes the cladding layer 11, the core layer 13 and the cladding layer 12. Within a transverse cross-section of the optical waveguide 1, the refractive index distribution T across the thickness direction of the core portion 14 illustrated in FIG. 6A(b) has a local maximum value Tm positioned in the central portion, and local minimum values Ts1 and Ts2 positioned on either side of the local maximum value Tm. The local minimum value positioned below the local maximum value Tm is denoted Ts1, and the local minimum value positioned above is denoted Ts2.

In the optical waveguide 1, as illustrated in FIG. 6A(b), the local maximum value Tm is included between the local minimum value Ts1 and the local minimum value Ts2, and this region becomes the core portion 14.

On the other hand, the region below the local minimum value Ts1 becomes the cladding layer 11, and the region above the local minimum value Ts2 becomes the cladding layer 12.

In other words, the refractive index distribution T has at least a region in which a local minimum value, a local maximum value and a local minimum value are arranged in sequence.

This region is provided repeatedly in accordance with the number of laminated core layers. For example, when two core layers 13 are provided with a cladding layer disposed therebetween, the refractive index distribution T contains local minimum values and local maximum values arrange alternately. In this case, the local maximum values preferably include alternately arranged first local maximum values having a relatively large refractive index and second local maximum values having a relatively small refractive index. In other words, the local maximum values are preferably arranged in a sequence composed of second local maximum value, local minimum value, first local maximum value, local minimum value, second local maximum value, local minimum value, first local maximum value . . . .

Further, the plurality of local minimum values, the plurality of first local maximum values, and the plurality of second local maximum values each preferably have substantially the same value. However, provided the relationships wherein the local minimum values are smaller than the first local maximum values and the second local maximum values, and the second local maximum values are smaller than the first local maximum values are maintained, slight differences in the values within each plurality are acceptable. In this case, the difference is preferably kept within 10% of the average value of the plurality of local minimum values.

The type of refractive index distribution T described above is maintained as substantially the same distribution along the entire longitudinal direction of the optical waveguide 1.

The local minimum value Ts1 is less than the average refractive index TA in the cladding layer 11. The local minimum value Ts2 is less than the average refractive index TA in the cladding layer 12. This ensures that a region having an even smaller refractive index than the average refractive index of each of the cladding layers 11 and 12 exists between the core portion 14 and each of the cladding layers 11 and 12. Consequently, a more steeply sloped refractive index gradient is formed in the vicinity of each of the local minimum values Ts1 and Ts2. As a result, light leakage from each core portion 14 into each of the cladding layers 11 and 12 is better suppressed, and an optical waveguide 1 with less transmission loss can be obtained.

Further, in these refractive index distributions T, the refractive index varies continuously across the entire distribution. As a result, the light confinement effect within the core portion 14 is enhanced compared with an optical waveguide having a step index type refractive index distribution. This enables further reductions in transmission loss to be achieved.

Moreover, in the refractive index distribution T, the distribution includes the types of local minimum values Ts1 and Ts2 described above, and the refractive index varies continuously. Accordingly, because the speed of the light is inversely proportional to the refractive index, the speed of the light increases with increasing distance from the center, and transmission time differences between optical paths are unlikely. As a result, the transmitted waveform is less likely to deteriorate. For example, even if the transmitted light contains a pulse signal, rounding of the pulse signal (broadening of the pulse signal) can be suppressed. As a result, an optical waveguide 1 which can improve the quality of optical communication can be obtained.

The expression that the refractive index varies continuously within the refractive index distribution T describes a state in which the curve of the refractive index distribution T is rounded at each portion of the distribution, with this curve being differentiable.

Further, within the refractive index distribution T, as illustrated in FIG. 6A(b), the local maximum value Tm is positioned within the core portion 14, and within this core portion 14, the local maximum value Tm is positioned in the central portion of the thickness. This increases the probability that, within the core portion 14, the transmitted light will be concentrated in the central portion of the thickness of the core portion 14, resulting in a relative reduction in the probability that light will leak into the cladding layers 11 and 12. As a result, transmission loss in the core portions 141 and 142 can be further reduced.

The central portion of the thickness of the core portion 14 describes the region from the midpoint between the local minimum value Ts1 and the local minimum value Ts2 to a distance 30% of the thickness of the core portion 14 on both sides of the midpoint.

Furthermore, the position of the local maximum value Tm need not necessarily be in the central portion, and may be positioned in any location away from positions near the edges of the core portion 14 (near the interfaces with each of the cladding layers 11 and 12). This enables transmission loss within the core portion 14 to be suppressed to some degree.

The expression "near the edges of the core portion 14" describes a region that extends inward into the core portion a distance of 5% of the thickness of the core portion 14 from the aforementioned edge.

On the other hand, in the refractive index distribution T, within each of the cladding layers 11 and 12, the refractive index varies in such a manner that it is highest at a position that is not near the interface with the core portion 14, and is lowest near the interface with the core portion 14. As a result, the local maximum value Tm within the core portion 14 and the regions of high refractive index within each of the cladding layers 11 and 12 are satisfactorily separated. Accordingly, the probability that transmitted light in the core portion 14 will leak into the cladding layers 11 and 12 can be satisfactorily reduced. As a result, transmission loss within the core portion 14 can be reduced.

In each of the cladding layers 11 and 12, the expression "near the interface with the core portion 14" describes a region that extends inward into the cladding layer 11 or 12a distance of 5% of the thickness of the cladding layer 11 or 12 from the interface.

The average refractive index TA in each of the cladding layers 11 and 12 can be approximated as the midpoint between the local minimum value Ts1 or Ts2 respectively and the maximum value in each of the cladding layers 11 and 12.

Further, as mentioned above, the local minimum values Ts1 and Ts2 are less than the average refractive index TA in each of the cladding layers 11 and 12. It is desirable that the difference between the two values falls within a prescribed range. Specifically, the difference between the local minimum values Ts1 and Ts2, and the average refractive index TA of the cladding layers 11 and 12 is preferably about 3 to 80%, more preferably about 5 to 50%, and still more preferably about 7 to 30%, of the difference between the local minimum values Ts1 and Ts2 and the local maximum value Tm in the core portion 14. As a result, the cladding layers 11 and 12 have the necessary light transmission properties for satisfactorily suppressing crosstalk. Moreover, if the difference between the local minimum values Ts1 and Ts2 and the average refractive index TA of the cladding layers 11 and 12 is less than the above lower limit, then there is a possibility that the light transmission properties in each of the cladding layers 11 and 12 may become too low, making it difficult to satisfactorily suppress crosstalk. On the other hand, if the difference exceeds the above upper limit, there is a possibility that the light transmission properties in each of the cladding layers 11 and 12 may become too great, which can have an adverse effect on the light transmission properties of the core portion 14.

Furthermore, the refractive index difference between the local minimum values Ts1 and Ts2 and the local maximum value Tm in the core portion 14 is preferably as large as possible. The difference can be selected as required, but is preferably from about 0.005 to 0.07, more preferably from about 0.007 to 0.05, and still more preferably from about 0.01 to 0.05. This ensures that the aforementioned refractive index difference is sufficient to achieve the necessary light confinement within the core portion 14.

As mentioned above, and as illustrated in FIG. 6B(d), the refractive index distribution T may also be a so-called graded index type distribution. The refractive index distribution T illustrated in FIG. 6B(d) has a local maximum value Tm in the core portion 14, and has a constant refractive index that is less than the local maximum value Tm in the cladding layers 11 and 12.

(Intersection Portions)

Figure 7A:
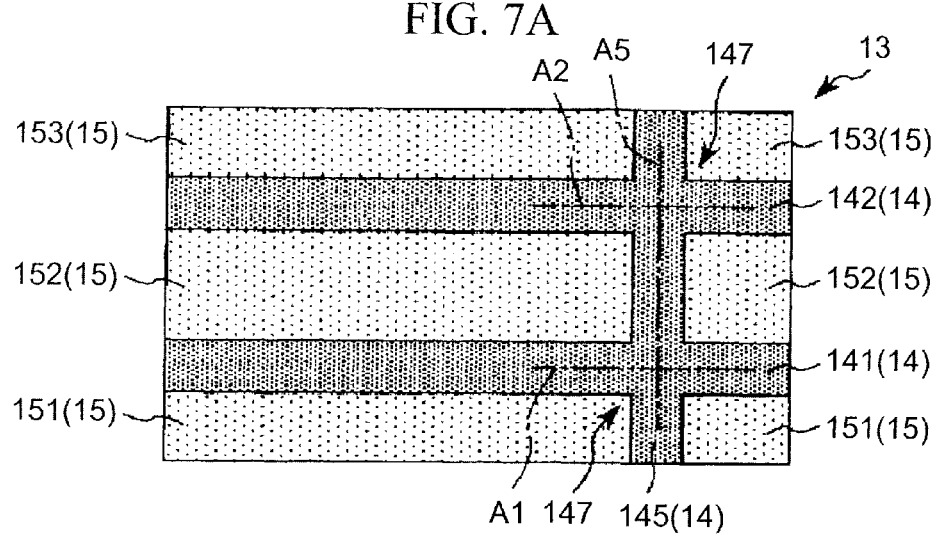
FIG. 7A is a top view of the optical waveguide illustrated in FIG. 2, with the cover film and the cladding layer omitted.
Figure 7B:
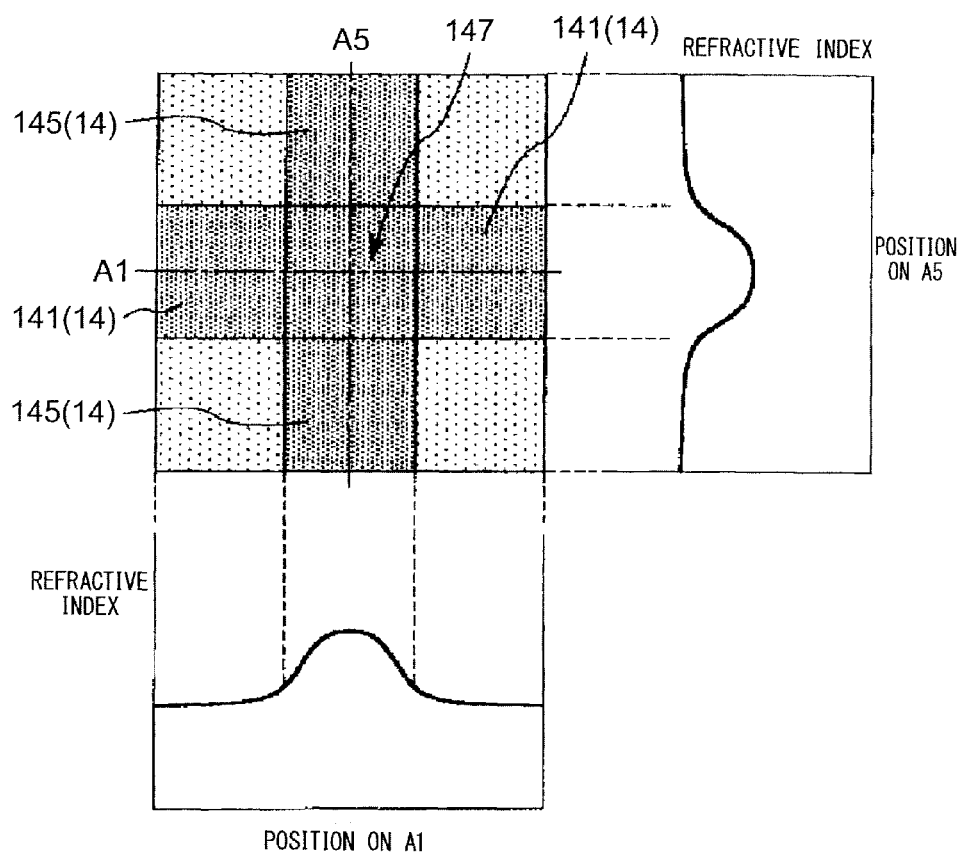
FIG. 7B is a diagram illustrating the vicinity of an intersection portion of the optical waveguide illustrated in FIG. 7A, and the refractive index distributions in the thickness and width directions.

FIG. 7A is a top view illustrating the optical waveguide 1 shown in FIG. 2 (with the upper layers 3 and 12 omitted). FIG. 7B is a diagram illustrating the refractive index distribution in the vicinity of an intersection portion.

The intersection portions 147 between the core portions 141 (first core portion) and 142 (third core portion), and the core portion 145 (second core portion) may have a refractive index distribution such as that illustrated in FIG. 7B, with a local maximum value in the central portion and two tailing portions in which the refractive index gradually decreases from the local maximum value toward the periphery, or alternatively, the refractive index distribution of the intersection portion 147 may be uniform. In the former case, signal light is more easily concentrated in the central portion of the intersection portion 147, making interference less likely. In the latter case, the signal light can proceed linearly through the intersection portion 147, thereby suppressing transmission in unintended directions.

The refractive index of each intersection portion 147 is preferably higher than that of the surrounding region. Based on this refractive index difference, signal light entering the intersection portion 147 is unlikely to enter the core portion which intersects the core portion through which the signal light has been transmitted. As a result, in the optical waveguide 1, core portions can intersect within the same plane without signal light interference at the intersection portions 147.

Furthermore, by intersecting a plurality of core portions within the same plane, signal intersection can be achieved without resorting to three dimensional intersections. Accordingly, by using this type of optical waveguide 1, miniaturization, reduced thickness and higher density can be achieved for devices in which the optical waveguide 1 is installed.

The maximum refractive index of the intersection portion 147 is preferably about 0.001 to 0.05 larger, and more preferably about 0.002 to 0.03 larger, than the local maximum value Wm of the refractive index distribution W.

The constituent material of the intersection portions 147 may be different from other regions which constitute the core layer 13. In such a case, following formation of the core layer 13, a portion of the layer can be removed and filled with another material, thereby forming intersection portions 147 having a uniform refractive index distribution. Examples of this other material include the polymers described below, which may be selected as appropriate in accordance with the magnitude relationship with the refractive index of the core portions 14.

Furthermore, a "uniform refractive index distribution" means that the fluctuation in the refractive index in the intersection portion 147 is not more than 5% of the average refractive index in the intersection portion 147.

If the optical axis of the core portion 141 (the first core portion) is denoted A1, the optical axis of the core portion 142 (the third core portion) is denoted A2, and the optical axis of the core portion 145 (the second core portion) is denoted A5, then the angle of intersection of the optical axis A1 and the optical axis A5, and the angle of intersection of the optical axis A2 and the optical axis A5, are each preferably from 10 to 90°, and more preferably from 20 to 90°. Provided the angle of intersection satisfies this range, interference can be satisfactorily suppressed.

Further, in the core portions 141, 142 and 145 of the refractive index distribution W described above, because signal light is transmitted concentrated near the local maximum value, interference at the intersection portions 147 is unlikely. However, by appropriate selection of the above conditions, attenuation in the intersection portions 147 can also be suppressed. Specifically, when the angle of intersection of the optical axis A1 and the optical axis A5 is 90°, the optical waveguide 1 of the present invention exhibits transmission loss of 0.02 dB or less in the intersection portion 147. With this type of optical waveguide 1, even if a plurality of intersection portions 147 are formed, transmission loss can still be suppressed to a low level, meaning complex optical wiring can be constructed.

Figure 8A:
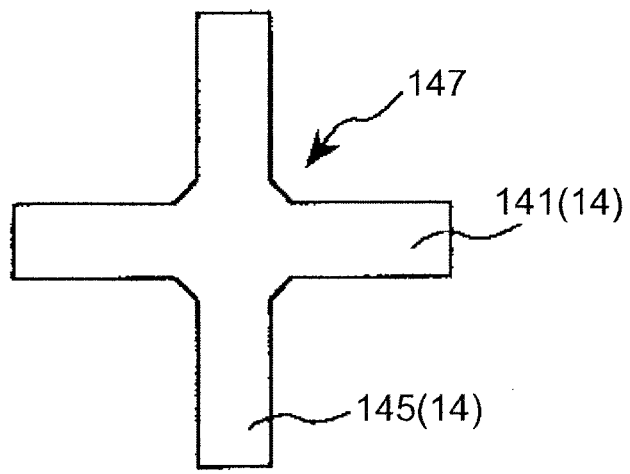
FIG. 8A is partial enlargement illustrating another example of an intersection portion and the vicinity thereof for the core layer illustrated in FIG. 7A.
Figure 8B:
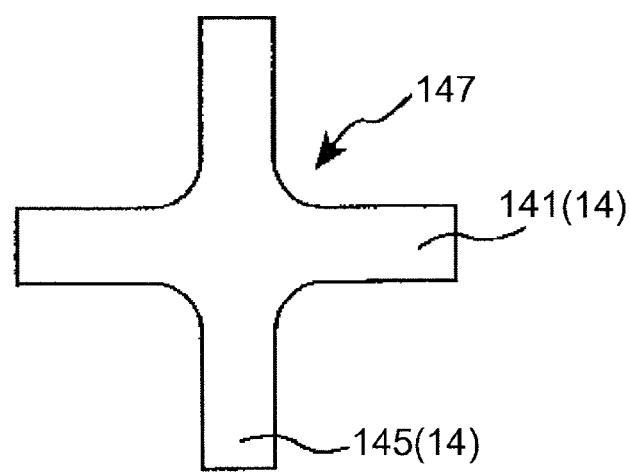
FIG. 8B is partial enlargement illustrating yet another example of an intersection portion and the vicinity thereof for the core layer illustrated in FIG. 7A.

FIG. 8A and FIG. 8B are partial enlargements illustrating other examples of the vicinity of the intersection portion.

The optical waveguides illustrated in FIG. 8A and FIG. 8B each have a configuration in which, in the vicinity of the intersection portion 147, the widths of the core portion 141 and the core portion 145 gradually increase as they approach the intersection portion 147. Of these configurations, in the optical waveguide illustrated in FIG. 8A, the widths of the core portion 141 and the core portion 145 increase gradually in a linear manner. On the other hand, in the optical waveguide illustrated in FIG. 8B, the widths of the core portion 141 and the core portion 145 increase gradually along a curve. With these types of configurations, interference in the intersection portion 147 is particularly well suppressed, and the transmission efficiency in the intersection portion 147 can be improved.

Figure 8C:
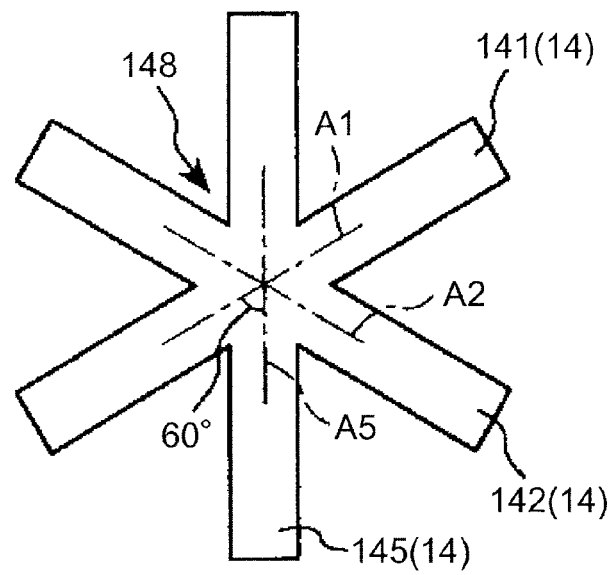
FIG. 8C is partial enlargement illustrating yet another example of an intersection portion and the vicinity thereof for the core layer illustrated in FIG. 7A.
Figure 8D:
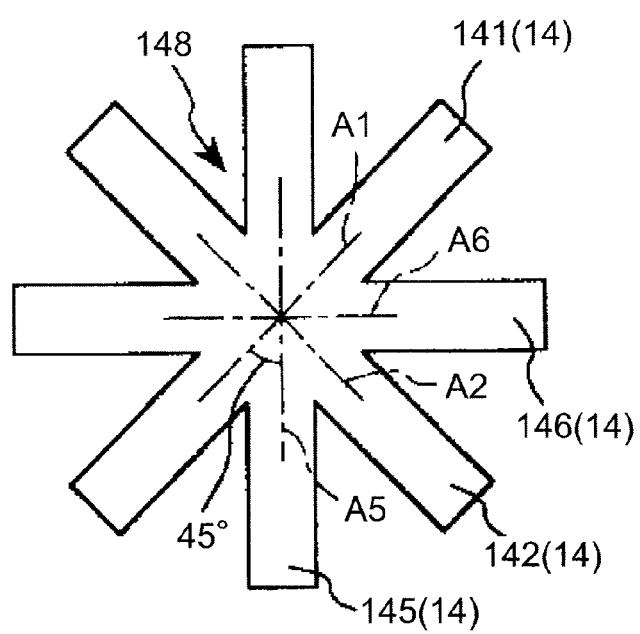
FIG. 8D is partial enlargement illustrating yet another example of an intersection portion and the vicinity thereof for the core layer illustrated in FIG. 7A.

Further, FIG. 7A illustrates an example in which the core portion 141 and the core portion 145, and the core portion 142 and the core portion 145 intersect at different intersection portions 147, but all three of the core portion 141, the core portion 142 and the core portion 145 may also intersect at the same intersection portion. Alternatively, an even greater number of core portions may intersect at the intersection portion. FIG. 8C and FIG. 8D are diagrams illustrating the latter case in which three or more core portions intersect.

In the intersection portion 148 illustrated in FIG. 8C, the optical axis A1 of the core portion 141, the optical axis A2 of the core portion 142 and the optical axis A5 of the core portion 145 intersect at a single point such that all of the internal angles formed are 60°.

Moreover, in the intersection portion 148 illustrated in FIG. 8D, four core portions composed of the core portion 141, the core portion 142, the core portion 145 and a core portion 146 all intersect at the same intersection portion. In the intersection portion 148 illustrated in FIG. 8D, the optical axis A1 of the core portion 141, the optical axis A2 of the core portion 142, the optical axis A5 of the core portion 145 and the optical axis A6 of the core portion 146 intersect at a single point such that all of the internal angles formed are 45°.

By including these types of intersection portions 148, the optical waveguide 1 can be constructed with a higher density and with more complex optical wiring. The number of core portions intersecting at the intersection portion 148 can be selected as required, and may even be 5 or more core portions. Further, in the intersection portion 148, the number of intersecting core portions is preferably adjusted appropriately so that the internal angles formed are within a range from 10 to 80°, more preferably from 20 to 70°, and still more preferably from 30 to 60°. Moreover, the plurality of internal angles formed may be either equal or different.

(Mirror)

A mirror may be provided in the optical waveguide 1 if required.

A mirror may be formed partway along the core portions 14 of the optical waveguide 1.

(Support Film)

If required, a support film 2 such as that illustrated in FIG. 2 may be laminated to the lower surface of the optical waveguide 1.

The support film 2 may be selected as appropriate, and supports, protects and reinforces the lower surface of the optical waveguide 1. This can enhance the reliability and improve the mechanical properties of the optical waveguide 1.

<<Second Embodiment>>

Next is a description of a second embodiment of the optical waveguide of the present invention.

Figure 9:
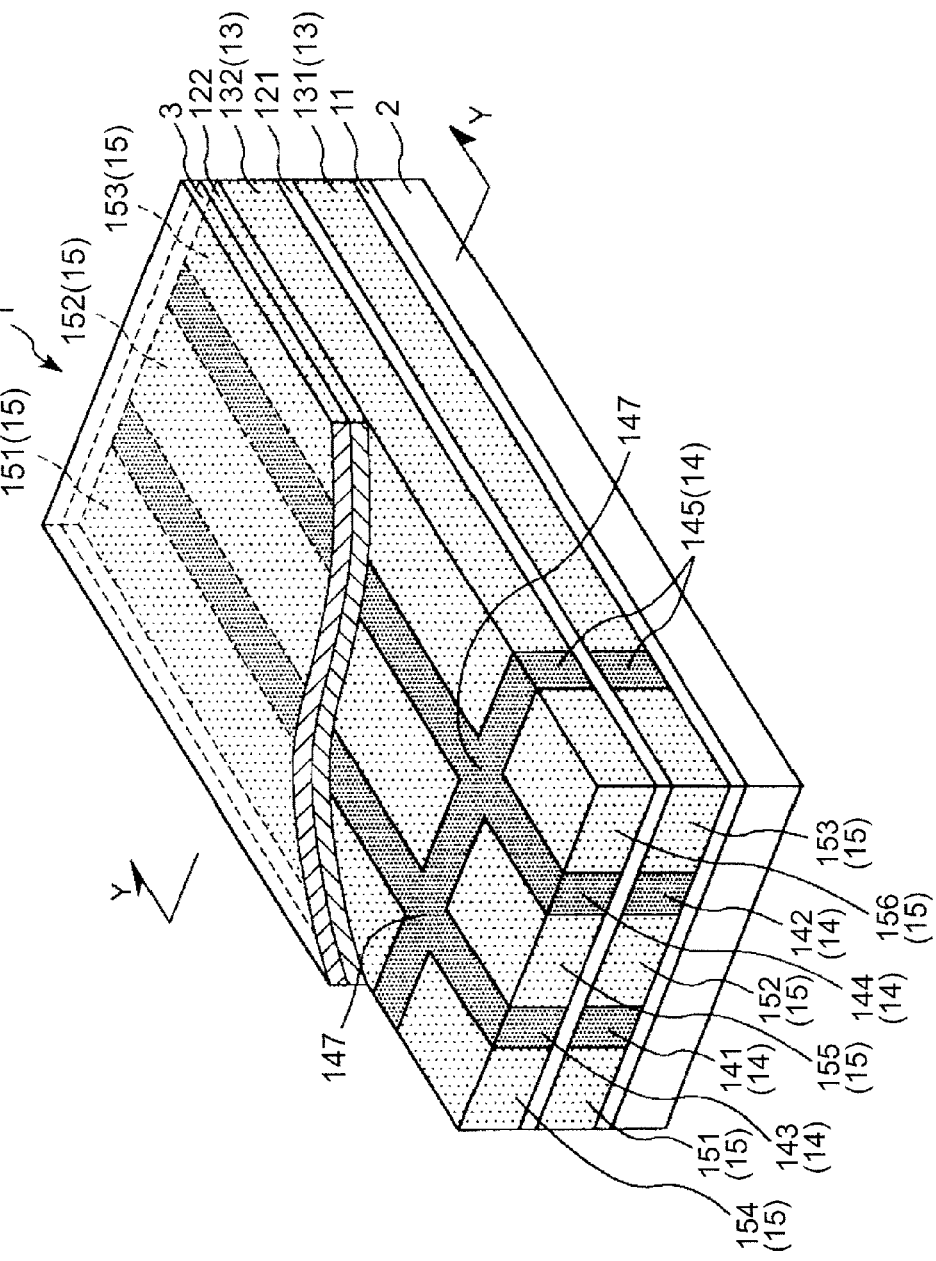
FIG. 9 is a perspective view illustrating a second embodiment of an optical waveguide of the present invention.

FIG. 9 is a perspective view (with a portion cut away, and illustrated as partially transparent) illustrating the second embodiment of the optical waveguide of the present invention. In the following description, the upper side in FIG. 9 is referred to using the term "upper" and the lower side is referred to using the term "lower".

The second embodiment of the optical waveguide is described below, with the description focusing on the points of difference from the first embodiment. Descriptions are omitted for items that are the same as the first embodiment. In FIG. 9, those structural components that are the same as the first embodiment are labeled with the same numerals as in the preceding description, and detailed descriptions of those components are omitted.

With the exception of having two laminated core layers 13 with a cladding layer disposed therebetween, the second embodiment is the same as the first embodiment. In other words, the optical waveguide 1 illustrated in FIG. 9 is composed of five layers, specifically a cladding layer 11, a core layer 13, a cladding layer 121, a core layer 13 and a cladding layer 122, laminated in that sequence from the lower side.

Of these layers, the two core layers 13 are the same as the core layer 13 of the first embodiment, and are each formed from two core portions 14 (a first core portion and a third core portion) arranged in parallel in the width direction, a single core portion 14 (a second core portion) which intersects these two core portions 14, and side cladding portions 15 which adjoin these core portions 14.

More specifically, of the two core layers 13 illustrated in FIG. 9, the lower core layer 131 is formed from two parallel core portions 141 (a first core portion) and 142 (a third core portion), a single core portion 145 (a second core portion) which intersects each of these core portions 141 and 142, and side cladding portions 151, 152 and 153 which adjoin these core portions 141, 142 and 145.

On the other hand, the upper core layer 132 is formed from two parallel core portions 143 (a first core portion) and 144 (a third core portion), a single core portion 145 (the second core portion) which intersects each of these core portions 143 and 144, and side cladding portions 154, 155 and 156 which adjoin these core portions 143, 144 and 145.

Further, as illustrated in FIG. 9, in each of the core layers 131 and 132, the core portions 14 (141, 142, 143, 144 and 145) are provided in prescribed positions and combinations so as to be superimposed when viewed in plan view.

In the optical waveguide 1 illustrated in FIG. 9, a refractive index distribution T is formed in which the refractive index varies in the thickness direction. This refractive index distribution T has regions of relatively high refractive index and regions of relatively low refractive index, and therefore incident light can be transmitted with the light confined to the regions of high refractive index.

One example of this refractive index distribution T is described below.

Figure 10:
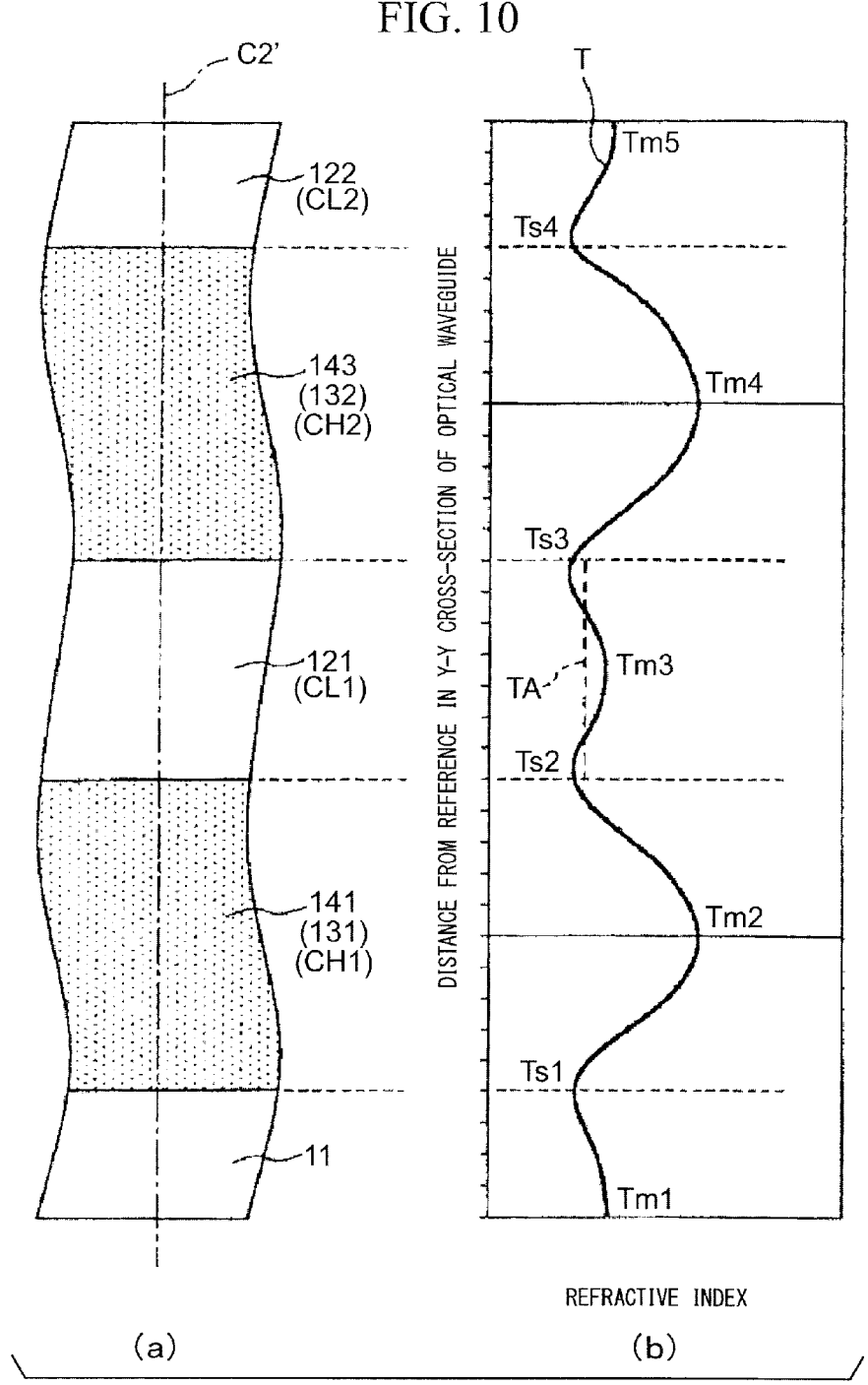
FIG. 10 is a diagram illustrating a portion of the cross-section along the line Y-Y shown in FIG. 9, and also schematically illustrating one example of a refractive index distribution T (W type) in the thickness direction of that portion.

FIG. 10(a) is a diagram illustrating a portion of the cross-section along the line Y-Y shown in FIG. 9, and illustrates a cut through the two core portions sandwiched between the cladding layers. FIG. 10(b) schematically illustrates one example of the refractive index distribution T along a center-line C2' which penetrates along the center of the width of the core portions in this cross-sectional view along the line Y-Y. FIG. 10(b) schematically illustrates an example of the refractive index distribution in the thickness direction when the refractive index is shown along the horizontal axis, and the position (distance) along the thickness direction of the core portions in the transverse cross-section is shown along the vertical axis. A position farther right on the horizontal axis indicates a larger refractive index.

The optical waveguide 1 has a refractive index distribution T such as that illustrated in FIG. 10(b), having four local minimum values Ts1, Ts2, Ts3 and Ts4, and five local maximum values Tm1, Tm2, Tm3, Tm4 and Tm5. Further, the five local maximum values include local maximum values of relatively large refractive index (first local maximum values) Tm2 and Tm4, and local maximum values of relatively small refractive index (second local maximum values) Tm1, Tm3 and Tm5.

Among these, the local maximum values Tm2 and Tm4 of relatively large refractive index exist between the local minimum value Ts1 and the local minimum value Ts2, and the local minimum value Ts3 and the local minimum value Ts4 respectively. The remaining local maximum values Tm1, Tm3 and Tm5 are local maximum values of relatively small refractive index.

The local minimum value Ts1 is positioned on the boundary line between the cladding layer 11 and the core portion 141, the local minimum value Ts2 is positioned on the boundary line between the core portion 141 and the cladding layer 121, the local minimum value Ts3 is positioned on the boundary line between the cladding layer 121 and the core portion 143, and the local minimum value Ts4 is positioned on the boundary line between the core portion 143 and the cladding layer 122.

Further, the local maximum values Tm2 and Tm4 (the first local maximum values) are preferably positioned in the central portions of the core portions 141 and 143 respectively. On the other hand, the local maximum values Tm1, Tm3 and Tm5 (the second local maximum values) are preferably positioned in the central portions of the cladding layers 11, 121 and 122 respectively.

In other words, the refractive index distribution T has at least a region in which a second local maximum value, a local minimum value, a first local maximum value, a local minimum value, and a second local maximum value are arranged in sequence. This region can be provided repeatedly in accordance with the number of core layers. When there are two laminated core layers 13, as in the present embodiment, the refractive index distribution T has a region in which local maximum values and local minimum values are arranged alternately, and among the local maximum values, the first local maximum values and the second local maximum values are arranged alternately, such as a region in which a second local maximum value, a local minimum value, a first local maximum value, a local minimum value, a second local maximum value, a local minimum value, a first local maximum value, a local minimum value, and a second local maximum value are arranged in sequence.

The four local minimum values Ts1, Ts2, Ts3 and Ts4 are less than the average refractive index TA in the adjoining cladding layers 11, 121 and 122. This ensures that a region having an even smaller refractive index than the average refractive index TA of each of the cladding layers 11, 121 and 122 exists between each of the core portions 14 and each of the cladding layers 11, 121 and 122. Consequently, a more steeply sloped refractive index gradient is formed in the vicinity of each of the local minimum values Ts1, Ts2, Ts3 and Ts4. As a result, light leakage from each core portion 14 is better suppressed, and an optical waveguide 1 with minimal transmission loss and good suppression of crosstalk in the thickness direction can be obtained.

Further, in the refractive index distribution T, the refractive index varies continuously across the entire distribution. As a result, the light confinement effect within the core portions 14 is enhanced compared with an optical waveguide having a step index type refractive index distribution. This enables a further reduction in transmission loss and a greater suppression of crosstalk to be achieved.

On the other hand, within the refractive index distribution T, as illustrated in FIG. 10(b), the local maximum values Tm1, Tm3 and Tm5 (the second local maximum values) are positioned within the cladding layers 11, 121 and 122 respectively. These local maximum values are preferably positioned away from positions near the edges of the cladding layers 11, 121 and 122 (positions near the interfaces with the core portions 141 and 143). As a result, the local maximum values Tm2 and Tm4 (the first local maximum values) within the core portions 141 and 143, and the local maximum values Tm1, Tm3 and Tm5 (the second local maximum values) within the cladding layers 11, 121 and 122 can be satisfactorily separated from each other. Consequently, the probability that transmitted light within the core portions 141 and 143 will leak into the cladding layers 11, 121 and 122 can be satisfactorily reduced. As a result, transmission loss within the core portions 141 and 143 can be reduced, and crosstalk can be better suppressed.

The expression "near the edges of the cladding layers 11, 121 and 122" describes regions that extend inward into each cladding layer a distance of 5% of the thickness of each cladding layer 11, 121 and 122 from the aforementioned edge.

Furthermore, the local maximum values Tm1, Tm3 and Tm5 (the second local maximum values) are preferably positioned in the central regions of the thickness of the cladding layers 11, 121 and 122 respectively, and the refractive index preferably decreases continuously from these local maximum values Tm1, Tm3 and Tm5 toward the adjacent local minimum values Ts1, Ts2, Ts3 and Ts4. As a result, the separation distances between the local maximum values Tm2 and Tm4 (the first local maximum values) within the core portions 141 and 143, and the local maximum values Tm1, Tm3 and Tm5 (the second local maximum values) within the cladding layers 11, 121 and 122 is maximized, and light can be reliably confined in the vicinity of the local maximum values Tm1, Tm3 and Tm5. Consequently, leakage of transmitted light from the core portions 141 and 143 can be more reliably suppressed.

The central portion of the thickness of the cladding layer 121 describes the region from the midpoint between the local minimum value Ts2 and the local minimum value Ts3 to a distance 30% of the thickness of the cladding layer 121 on both sides of the midpoint.

Moreover, the local maximum values Tm1, Tm3 and Tm5 are local maximum values having a lower refractive index than that of the local maximum values Tm2 and Tm4 (the first local maximum values) positioned in the core portions 141 and 143. Accordingly, despite not having the superior light transmission properties of the core portions 141 and 143, because the refractive index is higher than that of the surrounding regions, some slight light transmission properties still exist. As a result, the cladding layers 11, 121 and 122 can confine any transmitted light that leaks from the core portions 141 and 143, thereby preventing propagation of the light into other core portions. In other words, the existence of the local maximum values Tm1, Tm3 and Tm5 can more reliably suppress crosstalk.

As mentioned above, each of the local minimum values Ts1, Ts2, Ts3 and Ts4 has a refractive index that is less than the average refractive index TA of each of the cladding layers 11, 121 and 122, and the refractive index difference preferably falls within a prescribed range. Specifically, the difference between the local minimum values Ts1, Ts2, Ts3 and Ts4, and the average refractive index TA of each of the cladding layers 11, 121 and 122 is preferably about 3 to 80%, more preferably about 5 to 50%, and still more preferably about 7 to 30%, of the difference between the local minimum values Ts1, Ts2, Ts3 and Ts4, and the local maximum values Tm2 and Tm4 (the first local maximum values) in the core portions 141 and 143. As a result, each of the cladding layers 11, 121 and 122 has the necessary light transmission properties for satisfactorily suppressing crosstalk. If the difference between the local minimum values Ts1, Ts2, Ts3 and Ts4, and the average refractive index TA of each of the cladding layers 11, 121 and 122 is less than the lower limit of the above range, then there is a possibility that the light transmission properties in each of the cladding layers 11, 121 and 122 may become too low, making it difficult to satisfactorily suppress crosstalk. On the other hand, if the difference exceeds the upper limit of the above range, there is a possibility that the light transmission properties in each of the cladding layers 11, 121 and 122 may become too great, which can have an adverse effect on the light transmission properties of the core portions 141 and 143.

Further, the difference between the local minimum values Ts1, Ts2, Ts3 and Ts4, and the local maximum values Tm1, Tm3 and Tm5 (the second local maximum values) is preferably about 6 to 90%, more preferably about 10 to 70%, and still more preferably about 14 to 40% of the difference between the local minimum values Ts1, Ts2, Ts3 and Ts4, and the local maximum values Tm2 and Tm4 (the first local maximum values). As a result, an optimal balance is achieved between the height of the refractive index in the cladding layers and the height of the refractive index in the core portions, and therefore the optical waveguide 1 has particularly superior light transmission properties and can more reliably suppress crosstalk.

Furthermore, in the refractive index distribution T illustrated in FIG. 10(b), when the average refractive index in each of the cladding layers 11, 121 and 122 is denoted TA, the width of the portions in the vicinity of the local maximum values Tm2 and Tm4 (the first local maximum values) where the refractive index is continuously equal to or greater than the average refractive index TA is denoted a [μm], and the width of the portions in the vicinity of the local minimum values Ts1, Ts2, Ts3 and Ts4 where the refractive index is continuously less than the average refractive index TA is denoted b [μm] (wherein a and b are set in the same manner as described for FIG. 4). Then, b is preferably about 0.01a to 1.2a, more preferably about 0.03a to 1a, and still more preferably about 0.1a to 0.8a. As a result, the effective width of the local minimum values Ts1, Ts2, Ts3 and Ts4 is sufficient to satisfactorily achieve the actions and effects described above. In other words, if b is less than the above lower limit, then the effective width of the local minimum values Ts1, Ts2, Ts3 and Ts4 becomes too narrow, and there is a possibility that the action of the core portions 141 and 143 in confining the light may deteriorate. In contrast, if b exceeds the upper limit of the above range, then the effective width of the local minimum values Ts1, Ts2, Ts3 and Ts4 becomes too broad, resulting in corresponding limits on the thickness and pitch of the core portions 141 and 143, and there are possibilities that the transmission efficiency may deteriorate, and that multichannel and high-density configurations may become less feasible.

The average refractive index TA in the cladding layer 11 can be approximated as the midpoint between the local maximum value Tm1 and the local minimum value Ts1.

Further, in the present embodiment, crosstalk between the core portions 141 and 143 that are arranged in the thickness direction of the optical waveguide 1 can also be suppressed.

Specifically, among the plurality of core portions 141, 142, 143 and 144 of the optical waveguide 1 illustrated in FIG. 9, if light is input into one end of a single selected core portion, and the intensity distribution P2 of the output light is acquired at the other end of the core portions, then the intensity distribution displays a characteristic distribution which is ideal for suppressing crosstalk.

Figure 11:
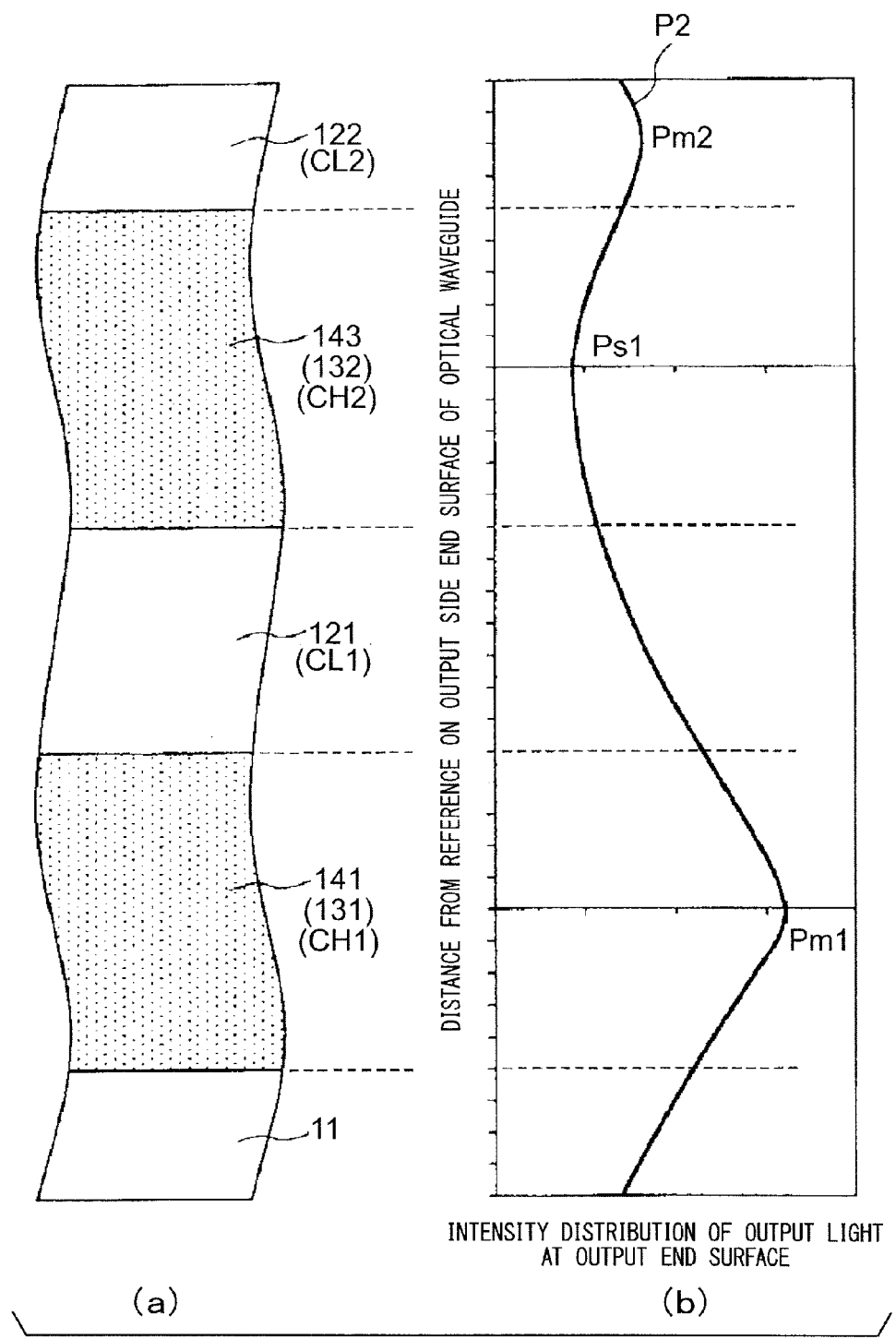
FIG. 11 is a diagram illustrating one example of the intensity distribution of the output light at the output end surface when light is incident upon one of the two core portions of the optical waveguide illustrated in FIG. 9.

FIG. 11 is a diagram illustrating the intensity distribution P2 of the output light in a portion of the output end surface when light is input into only a single core portion 141 of the optical waveguide 1 illustrated in FIG. 9. Specifically, the diagram illustrates one example of the intensity distribution, wherein the intensity of the output light is shown along the horizontal axis, and the position on the output end surface (the distance in the thickness direction) is shown along the vertical axis.

When light is incident on the core portion 141 (CH1), the intensity of the output light is greatest in the central portion of the output end of the core portion 141. The intensity of the output light decreases with increasing separation from the central portion of the core portion 141, and adopts a local minimum value in the core portion 143 (CH2) adjacent to the core portion 141 in the thickness direction. In other words, the intensity distribution P2 of the output light in this case adopts a local maximum value Pml in the central portion of the output end of the core portion 141 (CH1), and adopts a local minimum value Psi in the core portion 143 (CH2). In an optical waveguide 1 in which the output light has this type of intensity distribution, although leakage of the light transmitted through the core portion 141 cannot be completely prevented, concentration of the leaked light in the core portion 143 is suppressed. Accordingly, "crosstalk" where the leaked light causes interference in the core portion 143 can be reliably suppressed. As a result, the optical waveguide 1 can reliably prevent crosstalk, even for configurations having multiple channels and increased density not only in the width direction, but also in the thickness direction.

In the present embodiment, in a similar manner to that described above, the refractive index distribution T may also be a so-called step index type distribution or a graded index type distribution.

(Connectors)

The connectors 101 are provided at the ends of the optical waveguide 1, and can optically connect the core groups 140 with other optical components. These connectors 101 may conform to any of various connector standards. Examples of connectors which conform to connector standards include Mini MT connectors, MT connectors prescribed in JIS C 5981, 16MT connectors, two dimensional array MT connectors, MPO connectors, and MPX connectors.

When the connectors 101 are installed on the optical waveguide 1, the ends of the core groups 140 are exposed at the end surfaces of the connectors 101. By connecting other connectors to these connectors 101, optical components such as other optical waveguides or optical fibers can be connected optically to the core groups 140. Examples of optical components that may be connected include not only optical waveguides and optical fibers, but also wavelength conversion elements, filters, diffraction gratings, polarizers, prisms and lenses.

Further, examples of the constituent material for the connectors 101 include resin materials, metal materials and ceramic materials.

Furthermore, there are no particular limitations on the installation structure of the connectors 101, and structures in which the connectors 101 protrude from the end surfaces of the optical waveguide 1 may also be used. In such cases, notches or the like need not be provided in the optical waveguide 1.

The pattern of the core groups 140 in the optical waveguide 1 is not limited to that illustrated in FIG. 1, and any pattern may be used.

Figure 12:
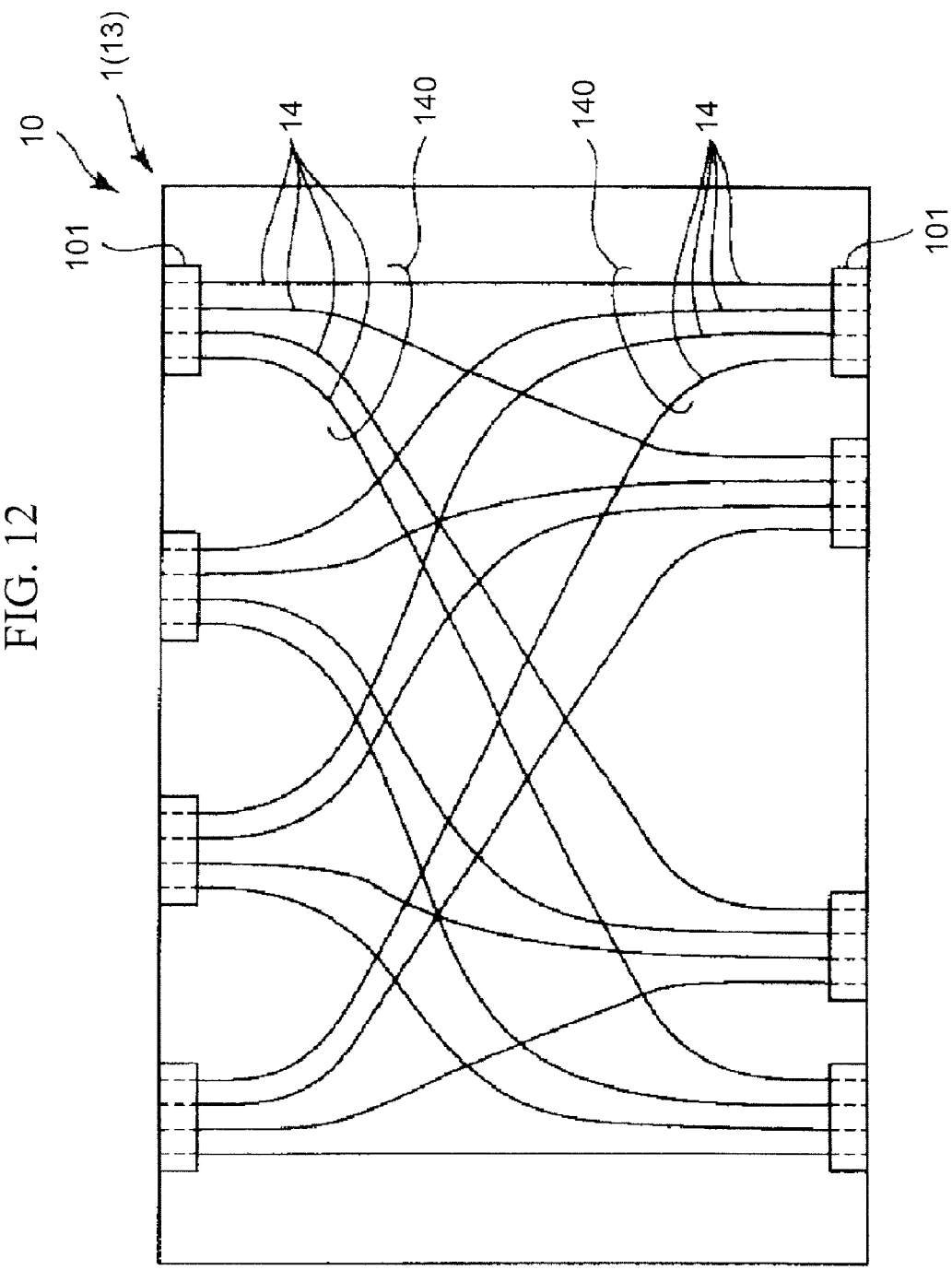
FIG. 12 is a plan view illustrating another example of an optical wiring component of the present invention.

FIG. 12 is a plan view (shown through the cladding layer) illustrating an example of another configuration for the first embodiment of the optical wiring component of the present invention.

The optical waveguide 1 in FIG. 12 is the same as the optical waveguide 1 illustrated in FIG. 1, with the exception that within the core groups 140, each of which is an assembly of four core portions 14 initially aligned in parallel, each core portion 14 is configured so as to split off into a different direction partway along the portion, with each core portion 14 being connected to a different connector 101. In an optical wiring component 10 containing an optical waveguide 1 with this type of pattern, the same effects as those described above can be obtained. In other words, complex and high-density signal paths such as those which mutually intersect within the same plane can be constructed without an accompanying increase in the thickness of the waveguide, and therefore an optical wiring component 10 can be obtained which can be easily bent, and which enables wiring operations to be performed with relative ease, even in confined wiring spaces.

<Method of Producing Optical Waveguide>

Next is a description of one example of a method of producing the optical waveguide of the present invention.

The optical waveguide 1 may be produced by sequential film formation using a composition for forming the cladding layer 11, a composition for forming the core layer 13, and a composition for forming the cladding layer 12, but can also be produced by simultaneous extrusion molding of a plurality of compositions into a plurality of layers, such as the simultaneous extrusion molding of three compositions into three layers. The latter method is described below.

Figure 13:
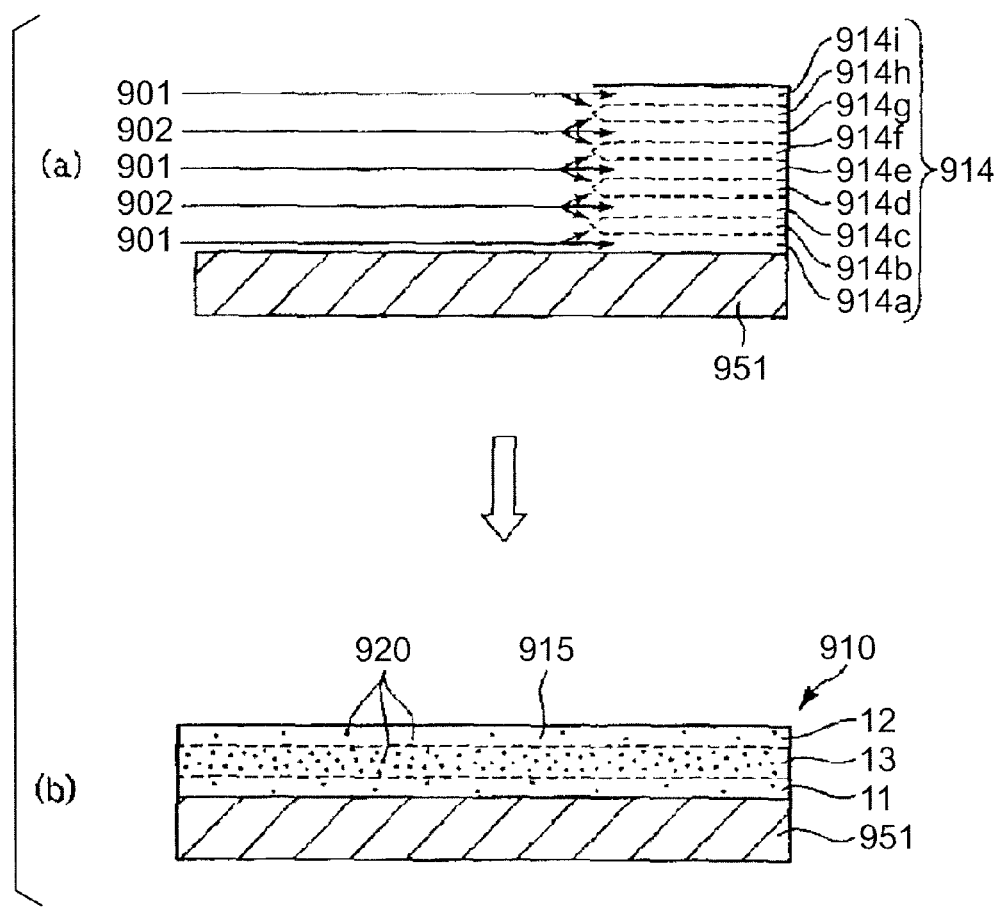
FIG. 13 is a diagram describing an example of a method of producing the optical waveguide illustrated in FIG. 2.
Figure 14:
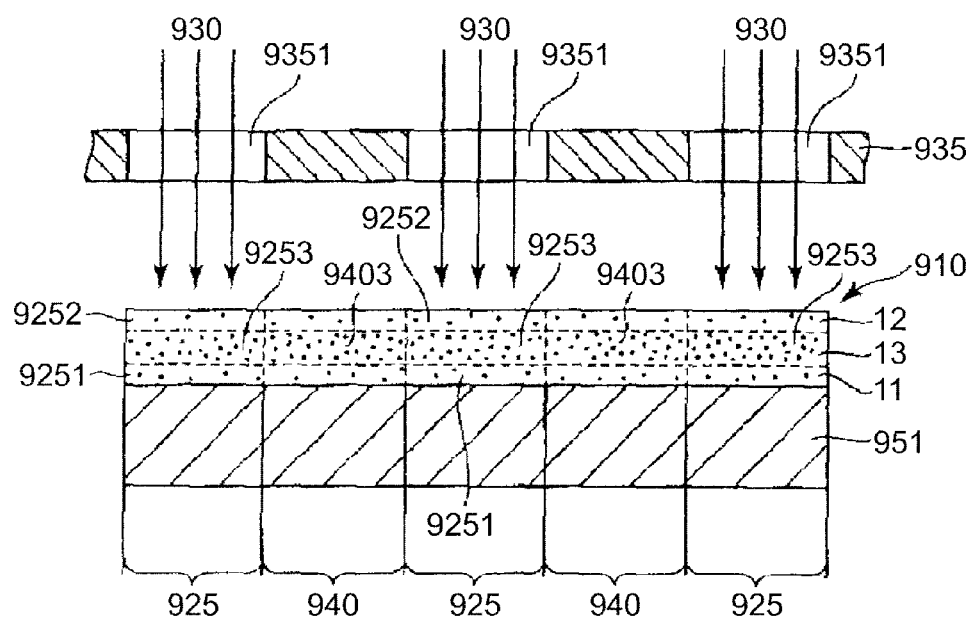
FIG. 14 is a diagram describing an example of a method of producing the optical waveguide illustrated in FIG. 2.
Figure 15:
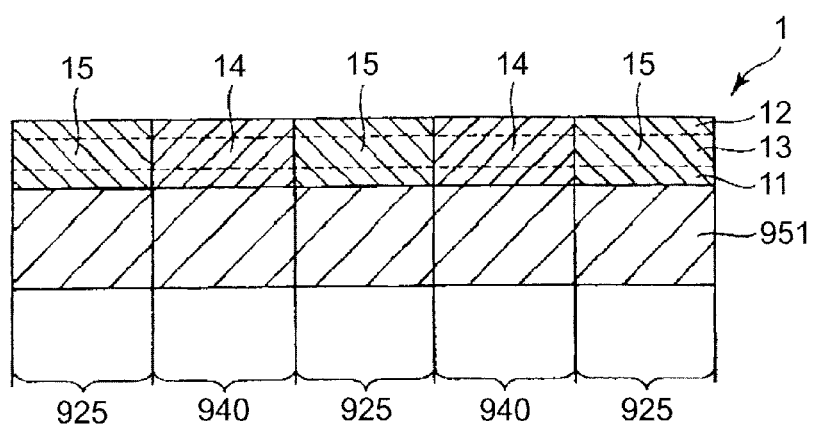
FIG. 15 is a diagram describing an example of a method of producing the optical waveguide illustrated in FIG. 2.

FIG. 13 to FIG. 15 are diagrams for describing a method of producing the optical waveguide illustrated in FIG. 2. In the following description, the upper side in FIG. 13 to FIG. 15 is referred to using the term "upper" and the lower side is referred to using the term "lower".

The method of producing the optical waveguide 1 may include, for example, the steps described below.

[1] First, a desired number of layers of two types of optical waveguide-forming compositions 901 and 902 (a first composition and a second composition) are layered alternately on a support substrate 951, preferably by extrusion molding, thereby obtaining a layer 910.

[2] Next, a portion of the layer 910 is irradiated with active radiation to generate a refractive index difference, thus obtaining the optical waveguide 1.

Each of these steps is described below in sequence.

Step [1]

First, the optical waveguide-forming compositions 901 and 902 are prepared.

The optical waveguide-forming compositions 901 and 902 each contain a polymer 915 and an additive 920 (which includes at least a monomer in the present embodiment). However, the compositions are different from each other.

Among the two compositions, the optical waveguide-forming composition 901 is a material used mainly for forming the core layer 13. Specifically, the optical waveguide-forming composition 901 is a material in which irradiation with active radiation causes an active reaction of at least the monomer in the polymer 915, resulting in an accompanying change in the refractive index distribution. In other words, the optical waveguide-forming composition 901 is a material in which a change in the refractive index distribution is generated due to variation in the content ratio between the polymer 915 and the monomer, thereby enabling the formation of the core portions 14 and the side cladding portions 15 within the core layer 13.

On the other hand, the optical waveguide-forming composition 902 is a material used mainly for forming the cladding layers 11 and 12, and is composed of a material having a lower refractive index than that of the material of the optical waveguide-forming composition 901.

The difference in refractive index between the optical waveguide-forming composition 901 and the optical waveguide-forming composition 902 can be adjusted as appropriate by setting the composition of the polymers 915 and the composition of the monomers contained in each composition, and setting the content ratio between the polymer 915 and the monomer.

For example, when the refractive index of the monomer is lower than that of the polymer 915, the monomer content within the compositions is preferably higher for the optical waveguide-forming composition 902 than for the optical waveguide-forming composition 901. On the other hand, when the refractive index of the monomer is higher than that of the polymer 915, the monomer content within the compositions is preferably higher for the optical waveguide-forming composition 901 than for the optical waveguide-forming composition 902. In other words, the polymers 915 and the additives 920 (including the monomer) in the optical waveguide-forming compositions 901 and 902 are selected appropriately in accordance with the refractive indices of each of the polymers 915 and monomers.

Further, the compositions of the optical waveguide-forming composition 901 and the optical waveguide-forming composition 902 are preferably set such that the monomer content is substantially equal within each composition. This enables the difference in monomer content between the optical waveguide-forming composition 901 and the optical waveguide-forming composition 902 to be reduced. As a result, diffusion and migration of the monomers due to the difference in monomer content can be suppressed. As mentioned above, diffusion and migration of the monomers is sometimes useful in forming a refractive index difference, but if the difference in the content values is large, then migration of the monomers in an undesirable direction is sometimes unavoidable. In a multilayer (multicolor) extrusion molding method described below, a refractive index distribution in the thickness direction of the layer 910 can be freely formed. Accordingly, there is no problem with suppressing diffusion and migration of the monomers at least within the thickness direction, and it is actually preferable that unintended diffusion and migration of the monomers in the thickness direction is suppressed. By suppressing such unintended diffusion and migration of the monomers, an optical waveguide 1 having a refractive index distribution T of the targeted shape can be produced more reliably.

When the monomer content values are substantially equal, it is preferable that the polymer 915 or the monomer conditions is different between the optical waveguide-forming composition 901 and the optical waveguide-forming composition 902. Specifically, the compositions of the polymers 915 that are used may be different between the optical waveguide-forming composition 901 and the optical waveguide-forming composition 902, or even if the compositions of the polymers 915 are the same, the polymer molecular weights or the polymerization degrees may be different. Further, the compositions of the monomers, and therefore the refractive indices thereof, may be different. By so doing, a refractive index difference can be formed between the optical waveguide-forming composition 901 and the optical waveguide-forming composition 902, even though the monomer content values are substantially equal, thereby suppressing diffusion and migration of the monomers.

Next is a description of the method used for molding the optical waveguide-forming compositions 901 and 902 in layers on top of the support substrate 951 using a multilayer extrusion molding method.

In the multilayer extrusion molding method, for example, by extruding three layers of the optical waveguide-forming composition 901, and also extruding a layer of the optical waveguide-forming composition 902 between each pair of these layers of the optical waveguide-forming composition 901, a multilayer compact 914 composed of five layer is formed in a single operation.

Specifically, in the multilayer compact 914, the optical waveguide-forming composition 901, the optical waveguide-forming composition 902, the optical waveguide-forming composition 901, the optical waveguide-forming composition 902, and the optical waveguide-forming composition 901 are extruded simultaneously in this sequence from the lower side. Consequently, at the boundaries between the compositions, slight mixing of the optical waveguide-forming composition 901 and the optical waveguide-forming composition 902 occurs. Accordingly, in the vicinity of the boundaries between the compositions, a portion of the optical waveguide-forming composition 901 and a portion of the optical waveguide-forming composition 902 are mixed together, forming a region in which the mixing ratio varies continuously along the thickness direction.

As a result, the multilayer compact 914 has a structure in which a first molded layer 914a formed mainly from the optical waveguide-forming composition 901, a second molded layer 914b formed from a mixture of the optical waveguide-forming composition 901 and the optical waveguide-forming composition 902, a third molded layer 914c formed mainly from the optical waveguide-forming composition 902, a fourth molded layer 914d formed from a mixture of the optical waveguide-forming composition 901 and the optical waveguide-forming composition 902, a fifth molded layer 914e formed mainly from the optical waveguide-forming composition 901, a sixth molded layer 914f formed from a mixture of the optical waveguide-forming composition 901 and the optical waveguide-forming composition 902, a seventh molded layer 914g formed mainly from the optical waveguide-forming composition 902, an eighth molded layer 914h formed from a mixture of the optical waveguide-forming composition 901 and the optical waveguide-forming composition 902, and a ninth molded layer 914i formed mainly from the optical waveguide-forming composition 901 are laminated together in this sequence from the lower side, as shown in the layers of FIG. 13(a).

Then, the solvent within the obtained multilayer compact 914 is evaporated (desolvation) to obtain the layer 910. (see FIG. 13(b)).

The obtained layer 910 is formed as a laminate containing, in sequence from the lower side in FIG. 13(b), the cladding layer 11 which is composed of the layers below the central portion of the third molded layer 914c, the core layer 13 which is composed of the layers above the central region of the third molded layer 914c and below the central portion of the seventh molded layer 914g, and the cladding layer 12 which is composed of the layers above the central portion of the seventh molded layer 914g. The core layer 13 has a higher refractive index than that of the cladding layers 11 and 12.

In the obtained layer 910, the polymer (matrix) 915 exists in an essentially uniform and random manner in the width direction. Further, the additive 920 is dispersed essentially uniformly and randomly within the polymer 915. As a result, the additive 920 is dispersed essentially uniformly and randomly within the layer 910.

There are no particular limitations on the average thickness of the layer 910, and the thickness may be set appropriately in accordance with the thickness of the optical waveguide 1 that is to be formed. However, the average thickness of the layer 910 is preferably about 10 to 500 µm, and more preferably about 20 to 300 µm.

The support substrate 951 can be selected as appropriate, and for example, a silicon substrate, silicon dioxide substrate, glass substrate, or a polyethylene terephthalate (PET) film or the like can be used.

However, the multilayer compact 914 used in obtaining the above type of layer 910 is produced using a die coater (multilayer extrusion molding apparatus) or the like, which can be selected as appropriate.

If it is desirable to adjust the distribution in the thickness direction, then, for example, by forming the first molded layer 914a and the ninth molded layer 914i significantly thinner than the other molded layers such as the fifth molded layer 914e, the refractive index of the lowermost layer portion and the lowermost layer portion can be prevented from becoming higher than the refractive index of the middle layers.

The multilayer compact 914 can also be formed on a transport film, and this transport film can be used, as is, as the aforementioned support substrate 951, and can also be used as the support film 2.

The multilayer extrusion molding method and the die coater mentioned above represent one example of the apparatus and method used for producing the multilayer compact 914. Various other methods and apparatus, such as an injection molding method (apparatus), a coating method (apparatus) or a printing method (apparatus) can also be used, provided they enable mixing of the compositions at the interfaces between the layers.

Next is a description of the polymer 915 and the additive 920.

(Polymer)

The polymer 915 is the material that constitutes the base polymer of the optical waveguide 1.

It is preferable to use a polymer 915 having a satisfactorily high level of transparency (which is transparent and colorless) and having compatibility with the monomer described below. In addition, it is also preferable to use a polymer 915 in which the monomer described below can react (via a polymerization reaction or crosslinking reaction), and which retains satisfactory transparency even after polymerization of the monomer.

Here, the expression "having compatibility" means that the monomer can be at least blended with the polymer 915 such that no phase separation with the polymer 915 occurs within the optical waveguide-forming compositions 901 and 902 or within the layer 910.

This type of polymer can be selected as required, and examples include acrylic-based resins (polymers), methacrylic-based resins, cyclic ether-based resins such as epoxy-based resins and oxetane-based resins, and polyolefin-based resins such as norbornene-based resins. One such resin may be used alone, or a combination (such as a polymer alloy, polymer blend (mixture), or copolymer) of two or more resins may be used.

By using these types of resins as the polymer 915, an optical waveguide 1 having excellent optical transmission properties can be obtained.

(Acrylic-based Polymer)

The acrylic-based polymer can be selected as required. For example, the use of methyl (meth)acrylate, benzyl (meth) acrylate and/or cyclohexyl (meth)acrylate is preferable.

Further, examples of preferred raw material monomers for the acrylic-based polymer include MMA monomer (manufactured by Kuraray Co., Ltd., or Mitsubishi Rayon Co., Ltd.).

The refractive index of each portion of the core layer 13 is determined by the relative magnitude relationship between the refractive index of the (meth)acrylic-based polymer and the refractive index of the monomer and the content ratio between the polymer and the monomer in each portion. Accordingly, by appropriate selection of the type of monomer used and the type of (meth)acrylic-based polymer used, the refractive index of each portion within the core layer 13 can be adjusted.

(Epoxy-based Polymer)

The epoxy-based polymer can be selected as required.

Epoxy-based polymers have particularly high levels of transparency and superior optical transmission properties, and also exhibit excellent heat resistance and adhesion, and can therefore be used favorably as the polymer in the present invention. It is preferable to use an epoxy-based polymer having compatibility with the monomer described below, in which the monomer can react (via a polymerization reaction or crosslinking reaction) in the manner described below, and which retains satisfactory transparency even after reaction of the monomer.

The expression "having compatibility" means that the monomer can be at least blended with the epoxy-based polymer such that no phase separation with the epoxy-based polymer occurs within the optical waveguide-forming compositions 901 and 902 or within the layer 910.

Moreover, an example of an alicyclic epoxy monomer is the compound represented by formula (4) below.

The compound represented by formula (4) is 3,4-epoxycyclohexenylmethyl-3',4'-epoxycyclohexene carboxylate, and is available, for example, from Daicel Corporation as the product Celloxide 2021P.

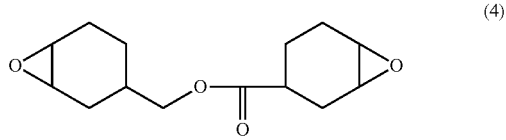 [SMILES: O=C(OCC1CCC2OC2C1)C1CCC2OC2C1]

(4)

Further, in addition to the compound described above, the YP series of phenoxy resins such as YP-50S or the product Ogsol EG (manufactured by Osaka Gas Chemicals Co., Ltd.) may also be used as the epoxy-based polymer or the raw material monomer.

The refractive index of each portion of the core layer 13 is determined by the relative magnitude relationship between the refractive index of the epoxy-based polymer and the refractive index of the monomer, and the content ratio between the polymer and the monomer in each portion. Accordingly, by appropriate selection of the type of monomer used and the type of epoxy-based polymer used, the refractive index of each portion within the core layer 13 can be adjusted.

(Silicone-based Polymer)

Silicone-based polymers have particularly high levels of transparency and superior optical transmission properties, and also exhibit excellent heat resistance, light stability and electrical insulation properties, and can therefore be used favorably as the polymer in the present invention. It is preferable to use a silicone-based polymer having compatibility with the monomer described below, and further preferable that the silicone-based polymer can react (via a polymerization reaction or crosslinking reaction) with the monomer in the manner described below, and can retain satisfactory transparency even after reaction of the monomer.

Here, the expression "having compatibility" means that the monomer can be at least blended with the silicone-based polymer such that no phase separation with the silicone-based polymer occurs within the optical waveguide-forming compositions 901 and 902 or within the layer 910.

Moreover, a silicone-based polymer describes a polymer obtained by polymerizing (via hydrolysis-condensation or condensation) a raw material monomer composed of an organoalkoxysilane or a derivative thereof Specific examples of the organoalkoxysilane include isopropyltrimethoxysilane, neopentyltrimethoxysilane and allyltrimethoxysilane.

(Polyimide-based Polymer)

Polyimide-based polymers have particularly high levels of transparency and superior optical transmission properties, and also exhibit excellent heat resistance, light stability, mechanical properties, adhesion and electrical insulation properties. Accordingly, a polyimide-based polymer can be used favorably as the polymer in the present invention. It is preferable to use a polyimide-based polymer having compatibility with the monomer described below, and further preferable that the polyimide-based polymer can react (via a polymerization reaction or crosslinking reaction) with the monomer in the manner described below, and retains satisfactory transparency even after reaction of the monomer.

Here, the expression "having compatibility" means that when the monomer is blended with the polyimide-based polymer, no phase separation with the polyimide-based polymer occurs within the optical waveguide-forming compositions 901 and 902 or within the layer 910.

A polyimide-based polymer describes a polymer containing a polyimide (oligomer) prepared by heating and curing (imidizing) a polyamic acid obtained by reacting a tetracarboxylic anhydride with a diamine.

(Fluoropolymer)

Fluoropolymers have particularly high levels of transparency and superior optical transmission properties, and also exhibit excellent mechanical properties and moisture resistance. Accordingly, a fluoropolymer can be used favorably as the polymer in the present invention. It is preferable to use a fluoropolymer having compatibility with the monomer described below, and further preferable that the fluoropolymer can react (via a polymerization reaction or crosslinking reaction) with the monomer in the manner described below, and which retains satisfactory transparency even after reaction of the monomer.

A fluoropolymer is a polymer containing fluorine atoms within the molecular structure. In the present invention, the fluoropolymer is preferably a polymer having at least one type of ring structure selected from among aliphatic ring structures, imide ring structures, triazine ring structures, benzoxazole structures and aromatic ring structures, wherein the structure includes one or more fluorine atoms. Among such polymers, a polymer containing an aliphatic ring structure within the main chain is particularly desirable. This enables the layer 910 obtained from the optical waveguide-forming compositions 901 and 902 to exhibit particularly uniform film thickness.

Examples of fluorine-containing aliphatic ring structure polymers that can be used favorably in the present invention include polymers containing structural units (repeating units) such as those shown below in formulas (12) to (16) within the main chain.

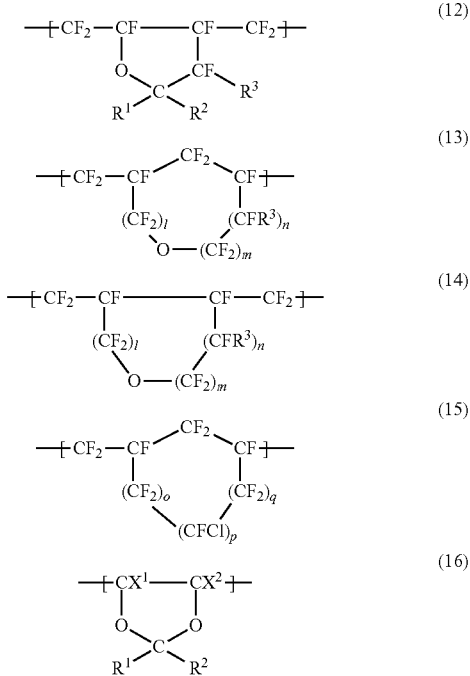

In the above formulas, l is an integer of 0 to 5, m is an integer of 0 to 4, and n is 0 or 1, provided that l+m+n is an integer of 1 to 6, each of o, p and q independently represents an integer of 0 to 5, provided that o+p+q is an integer of 1 to 6, each of $R^1$, $R^2$ and $R^3$ independently represents F, Cl, $CF_3$, $C_2F_5$, $C_3F_7$ or $OCF_3$, and each of $X^1$ and $X^2$ independently represents F or Cl.

(Polyolefin-based Polymer)

The polyolefin-based polymer can be selected as required.

The polyolefin-based polymer may also be a cyclic olefin-based polymer such as a norbornene-based polymer or a benzocyclobutene-based polymer. For example, the polymers disclosed in Japanese Unexamined Patent Application, First Publication No. 2000-090328 can be used as the cyclic olefin-based polymer.

(Additive)

In the present embodiment, in both the optical waveguide-forming composition 901 and the optical waveguide-forming composition 902, the additive 920 includes a monomer. Further, in the present embodiment, the additive 920 within the optical waveguide-forming composition 901 may also include a polymerization initiator, whereas on the other hand, the additive 920 within the optical waveguide-forming composition 902 need not include a polymerization initiator.

(Monomer)

The monomer (photopolymerizable monomer) is a compound which, upon irradiation with the active radiation described below, reacts within the irradiated region to form a reaction product, wherein the resulting diffusion and migration of the monomer is able to generate a refractive index difference in the layer 910 between the irradiated region and the non-irradiated region.

The reaction product of the monomer includes at least one of a polymer formed by polymerization of the monomer within the polymer 915, a crosslinked structure produced by crosslinking of molecules of the polymer 915 via the monomer, and a branched structure produced by polymerization of the monomer onto the polymer 915 to form a branch portion on the polymer 915.

The refractive index difference generated between the irradiated region and the non-irradiated region occurs on the basis of the difference between the refractive index of the polymer 915 and the refractive index of the monomer. Accordingly, the monomer contained within the additive 920 is selected with due consideration of the magnitude relationship of the refractive index with that of the polymer 915.

Specifically, when it is desirable that the refractive index of the irradiated region increases in the layer 910, a combination of a polymer 915 having a comparatively low refractive index and a monomer having a high refractive index compared with this polymer 915 is used. On the other hand, when it is desirable that the refractive index of the irradiated region decreases, a combination of a polymer 915 having a comparatively high refractive index and a monomer having a low refractive index compared with this polymer 915 is used.

The terms "high" and "low" used in relation to the refractive index do not refer to the absolute values of the refractive index, but rather indicate the relative relationship of the refractive indices between certain materials.

When the refractive index of the irradiated region in the layer 910 decreases as a result of the reaction of monomer (generation of the reaction product), the irradiated region corresponds with the low refractive index region WL of the refractive index distribution W. When the refractive index of the irradiated region increases, the irradiated region corresponds with the high refractive index region WH of the refractive index distribution W.

A monomer having good compatibility with the polymer 915 and having a difference in refractive index compared with the polymer 915 of at least 0.01 can be used favorably as the monomer.

This type of monomer may be any compound having a polymerizable site within the molecular structure. The types of monomer mentioned above as the raw material for the polymer 915 can be used, but there are no particular limitations. Examples of the monomer include acrylic acid (methacrylic acid)-based monomers, epoxy-based monomers, oxetane-based monomers, norbornene-based monomers, vinyl ether-based monomers, styrene-based monomers and photodimerizable monomers. These monomers may be used alone, or a combination of two or more monomers may be used.

Among these monomers, by using a monomer of a similar type to the polymer 915, the monomer can be dispersed more uniformly within the polymer 915. As a result, the properties of the optical waveguide-forming compositions 901 and 902 can be kept more uniform.

The molecular weight of the monomer may be selected as required. For example, the molecular weight is preferably from 50 to 500, more preferably from 80 to 400, still more preferably from 100 to 400, and particularly preferably from 100 to 350.

Furthermore, it is particularly preferable that the polymerizable site of the monomer is an unsaturated hydrocarbon. Compounds containing an unsaturated hydrocarbon readily undergo polymerization reactions by radical polymerization and cationic polymerization, and are ideal as the monomer used in the present invention.

Examples of acrylic acid (methacrylic acid)-based monomers and epoxy-based monomers that can be used as the monomer include the same monomers as those mentioned above as the raw material for the polymer 915.

Further, in the case of monomers or oligomers having a cyclic ether group such as an oxetanyl group or epoxy group, because ring-opening of the cyclic ether group occurs readily, the monomer can react rapidly. Accordingly, by using such a monomer, the time required for formation of the core layer 13 can be shortened, enabling the production time for the optical waveguide 1 to also be shortened.

The molecular weight of the monomer having a cyclic ether group or the molecular weight (weight-average molecular weight) of the oligomer may be selected as required. For example, the molecular weight is preferably from 50 to 500, more preferably from 80 to 400, still more preferably from 100 to 400, and particularly preferably from 100 to 350.

There are no particular limitations on the combination of these types of monomers with the polymer 915, and any combination may be used.

An example of a monomer having an oxetanyl group that can be used is the product Aron Oxetane (manufactured by Toagosei Co., Ltd.).

Further, as mentioned above, at least a portion of the monomer may be oligomerized.

Examples of these monomers and oligomers having an oxetanyl group, and monomers and oligomers having an epoxy group include compounds disclosed in Japanese Unexamined Patent Application, First Publication No. 2010-090328.

The amount added of the monomer can be selected as required. The amount of the monomer is preferably at least 1 part by mass but not more than 50 parts by mass, more preferably at least 2 parts by mass but not more than 40 parts by mass, and still more preferably at least 15 parts by mass but not more than 40 parts by mass, per 100 parts by mass of the polymer 915. This enables the variation in refractive index between the core portions 14 and the side cladding portions 15 to be generated more reliably. Further, when forming the optical waveguide, the degree of migration of the monomer may also be adjusted by appropriate selection of the method used. The degree of migration may also be controlled to create a preferred W type or GI type distribution in the transverse width direction.

The monomers included in the optical waveguide-forming composition 901 and the optical waveguide-forming composition 902 may have the same composition or different compositions.

Further, the optical waveguide-forming composition 901 may be configured so as to contain a monomer, while the optical waveguide-forming composition 902 is configured without a monomer. In this case, monomer diffusion and migration does not occur in each of the cladding layers 11 and 12, and therefore a uniform refractive index can be achieved within each of the cladding layers 11 and 12.

The photopolymerizable monomer described above is one type of so-called refractive index modifier. The refractive index modifier added as the additive 920 may be a polymer or a monomer other than a photopolymerizable monomer, provided the component has a different refractive index from that of the polymer 915. Examples of such refractive index modifiers include 2-bromotetrafluorobenzotrifluoride, chloropentafluorobenzene, decafluorobenzophenone, perfluoroacetophenone, perfluorobiphenyl and bromoheptafluoronaphthalene. Any one or more of these compounds may be used, or a mixture with other compounds may also be used.

When a refractive index modifier is used, the type of refractive index distribution described above can be formed by generating a concentration gradient for the refractive index modifier. In order to form such a concentration gradient, the refractive index modifier may be added to the layer formed from the polymer 915 with appropriate variation in the amount added in accordance with the refractive index distribution that is to be formed.

(Polymerization Initiator)

A polymerization initiator may be optionally included in the composition. The polymerization initiator is a material which acts upon the monomer upon irradiation with the active radiation, thereby promoting the reaction of the monomer.

The polymerization initiator used is selected in accordance with the type of polymerization reaction or crosslinking reaction of the monomer. For example, in the case of an acrylic acid (methacrylic acid)-based monomer or styrene-based monomer, a radical polymerization initiator can be used favorably. In the case of an epoxy-based monomer, oxetane-based monomer or vinyl ether-based monomer, a cationic polymerization initiator can be used favorably.

Examples of the radical polymerization initiator include benzophenones and acetophenones. Specific examples include Irgacure 651 and Irgacure 184 (both manufactured by BASF Japan Ltd.).

On the other hand, examples of the cationic polymerization initiator include Lewis acid generators such as diazonium salts, and Bronsted acid generators such as iodonium salts and sulfonium salts. Specific examples include Adeka Optomer SP-170 (manufactured by Adeka Corporation), Sanaid SI-100L (manufactured by Sanshin Chemical Industry Co., Ltd.), and Rhodorsil 2074 (manufactured by Rhodia Japan Inc.).

The layer 910 containing the polymer 915 and the additive 920 described above has a prescribed refractive index due to the uniform dispersion of the additive 920 within the polymer 915.

Step [2]

Following the step [1], a mask (masking) 935 having openings (windows) 9351 formed therein is prepared for the layer 910 formed in the manner illustrated in FIG. 13(b), and the layer 910 is then irradiated with active radiation 930 through this mask 935 (see FIG. 14).

Below is a description of one example in which a compound having a lower refractive index than that of the polymer 915 is used as the monomer. Further, in this regard, the composition of the polymer 915 is such that the optical waveguide-forming compositions 901 and 902 used in forming the layer 910 are prepared so as to satisfy the relationship (refractive index of the optical waveguide-forming composition 901)>(refractive index of the optical waveguide-forming composition 902). As a result of these conditions, a refractive index distribution is formed in the layer 910 in which the central portion in the thickness direction has the highest refractive index, local minimum values exist between the central portion and the upper surface and rear surface respectively of the layer 910, and the refractive index changes in a continuous manner.

Furthermore, in the example illustrated here, the irradiated region 925 that is irradiated with the active radiation 930 mainly becomes the side cladding portions 15.

Accordingly, in the example illustrated here, openings (windows) 9351 equivalent to, namely having the same shape as or a substantially similar shape to, the pattern of the side cladding portions 15 that are to be formed are formed in the mask 935. These openings 9351 have transmission portions through which the irradiated active radiation 930 travels. The pattern within the core portions 14 and the side cladding portions 15 is determined on the basis of the refractive index distribution W formed in accordance with the irradiation of the active radiation 930. As a result, the pattern of the openings 9351 and the pattern of the side cladding portions 15 are not necessarily exactly the same, and some minor differences may occur between the patterns.

The mask 935 may be formed in advance (in a separate preparation) (such as a plate-like mask), or may be formed on the layer 910 by a vapor deposition method or coating method or the like.

Preferred examples of the mask 935 include photomasks made of quartz glass or a PET base material or the like, stencil masks, and metal thin films formed using a vapor phase deposition method (such as a vapor deposition method or sputtering method or the like). Among these possibilities, the use of a photomask or stencil mask is particularly desirable. This is because such masks enable a fine pattern to be formed with high precision, and also provide ready handling, which is advantageous in improving productivity.

Further, in FIG. 14, the openings (windows) 9351 of the mask 935 are formed by partially removing the mask in accordance with the pattern of the irradiated region 925 of the active radiation 930. When a photomask made of quart glass or a PET base material is used, the mask can also be obtained by providing, in the appropriate locations on the photomask, shielding portions for the active radiation 930 formed from a shielding material composed of metal such as chromium. In such a mask, those portions on which the shielding portions are not formed act as the windows (transmission portions).

The active radiation 930 used may be any radiation capable of causing a photochemical reaction (change) in the polymerization initiator. For example, visible light, ultraviolet light, infrared light, laser light, or an electron beam or X-rays can be used.

There are no particular limitations on the active radiation 930, which may be selected appropriately in accordance with the polymerization initiator and the like. Active radiation having a peak wavelength in the wavelength range from 200 to 450 nm is preferable. This enables the polymerization initiator to be activated comparatively easily.

When the active radiation 930 is irradiated through the mask 935 and onto the layer 910, the monomer polymerizes in an irradiated region 9253 in the core layer 13, which represents a portion of the irradiated region 925. As a result of the monomer polymerization, the amount of the monomer in the irradiated region 9253 decreases. Consequently, the monomer within a non-irradiated region 9403 in the core layer, which represents a portion of the non-irradiated region 940, diffuses and migrates into the irradiated region 9253. As described above, the polymer 915 and the monomer are selected appropriately so as to exhibit a difference in refractive index. Accordingly, the diffusion and migration of the monomer is accompanied by the generation of a refractive index difference between the irradiated region 9253 and the non-irradiated region 9403 of the core layer 13. On the other hand, in irradiated regions 9251 and 9252 within the cladding layers 11 and 12, by employing conditions wherein the optical waveguide-forming composition 902 does not contain a monomer, the polymerization reaction of the monomer is suppressed.

In the cladding layers 11 and 12, the method used for suppressing the monomer polymerization reaction within the irradiated regions 9251 and 9252 can be selected as appropriate. For example, a method may be employed in which the type of monomer is changed, or alternatively, the polymerization initiator may be added to the additive 920 in the optical waveguide-forming composition 901, but either excluded from, or only included in a small amount within the additive 920 of the optical waveguide-forming composition 902. In this case, in the core layer 13, the irradiation means that the monomer is able to benefit from the action of the polymerization initiator, and therefore undergoes satisfactory polymerization and migration. In contrast, in the cladding layers, because the polymerization initiator is either absent or present in only a small amount, the monomer undergoes little or no polymerization, and migration of the monomer is also minimal or non-existent.

Figure 16:
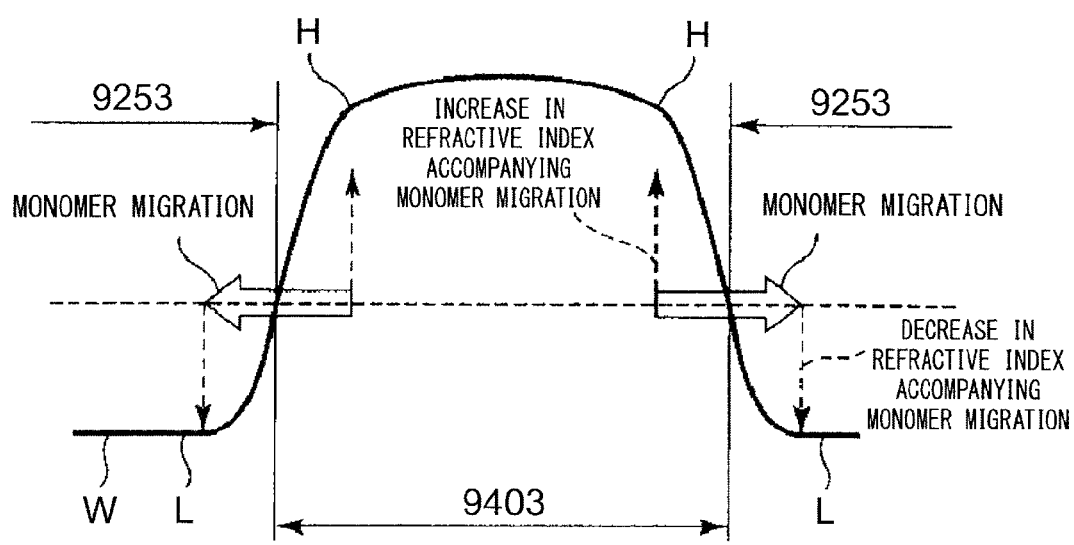
FIG. 16 is a diagram describing the generation of a refractive index difference between an irradiated region and a non-irradiated region in the laminated structure illustrated in FIG. 14.

FIG. 16 is a schematic diagram describing the generation of a refractive index difference between the irradiated region 9253 and the non-irradiated region 9403 of the core layer 13 illustrated in FIG. 14. The diagram illustrates the change in the refractive index distribution due to the irradiation, with the position in the width direction of the transverse cross-section shown along the horizontal axis, and the refractive index of the transverse cross-section shown along the vertical axis.

In the present embodiment, a monomer having a lower refractive index than that of the polymer 915 is used. As a result, the dispersion and migration of the monomer is accompanied by an increase in the refractive index of the non-irradiated region 9403, and a decrease in the refractive index of the irradiated region 9253 (see FIG. 16). It is thought that because the width of the irradiated portion and the width of the non-irradiated portion are narrow, the monomer is able to migrate adequately.

It is thought that the diffusion and migration of the monomer occurs as a result of the monomer concentration gradient that is formed due to the consumption of the monomer in the irradiated region 9253. Accordingly, the monomer within the entire non-irradiated region 9403 does not migrate simultaneously toward the irradiated region 9253, but rather the migration begins gradually from the monomer located close to the irradiated region 9253, and migration of the monomer from the central region of the non-irradiated region 9403 toward the outside of the region then occurs in order to replenish the monomer concentration. As a result, as illustrated in FIG. 16, a high refractive index portion H and low refractive index portions L are formed on either side of the boundaries between the irradiated regions 9253 and the non-irradiated region 9403, with the high refractive index portion H positioned on the side of the non-irradiated region 9403 and the low refractive index portions L positioned on the sides of the irradiated regions 9253. This high refractive index portion H and these low refractive index portions L are formed due to the diffusion and migration of the monomer. As a result, they necessarily adopt smooth curves. Specifically, the high refractive index portion H adopts, for example, a substantially convex inverted U-shape, and the low refractive index portions L adopt a substantially concave U-shape.

The refractive index of the polymer formed when the type of monomer described above polymerizes is substantially the same as the refractive index of the monomer prior to polymerization (with a difference in the refractive index of about 0 to 0.001). Consequently, in the irradiated region 9253, as the polymerization of the monomer proceeds, the decrease in the refractive index proceeds in accordance with the amount of migrating monomer and the amount of monomer-derived material. Accordingly, by appropriate adjustment of the amount of the monomer relative to the polymer, and the amount of the polymerization initiator and the like, the shape of the refractive index distribution W can be controlled. For example, either the distribution illustrated in FIG. 3 or the distribution illustrated in FIG. 4 can be freely selected.

On the other hand, in the non-irradiated region 9403, because the polymerization initiator is not activated, polymerization of the monomer is not promoted.

By adjusting the irradiation dose of the active radiation 930, the refractive index difference that is formed and the shape of the refractive index distribution can be controlled. For example, by increasing the irradiation dose, the refractive index difference can be increased. Further, the layer 910 may be dried prior to the irradiation with the active radiation 930. In such a case, the shape of the refractive index distribution can also be controlled by adjusting the degree of drying. For example, by increasing the degree of drying, the diffusion and migration of the monomer can be suppressed. For example, either the distribution illustrated in FIG. 3 or the distribution illustrated in FIG. 4 can be freely selected.

Further, in the irradiated region 9253, diffusion and migration of the monomer may occur not only from the non-irradiated region 9403 in the core layer 13, but also from the irradiated region 9251 in the cladding layer 11 and the irradiated region 9252 in the cladding layer 12, which represent portions of the irradiated region 9253. If the refractive index of the monomer contained in the cladding layers is also low, then this diffusion and migration from the cladding layers will cause an even greater decrease in the refractive index in the irradiated region 9253. On the other hand, in the irradiated region 9251 and the irradiated region 9252, the diffusion and migration of the monomer is accompanied by an increase in the refractive index, but the composition and the like of the polymer 915 in these regions is set so that the refractive index is low. Accordingly, even if the refractive index increases, it does not impair the functions of the optical waveguide 1.

The optical waveguide 1 is obtained using the principles described above (see FIG. 15). This type of optical waveguide 1 has a refractive index distribution W, which exhibits variation in the refractive index within the layer 910 formed from an optical waveguide-forming composition prepared by dispersing a monomer in the polymer 915, the refractive index distribution W being formed by irradiating the active radiation 930 partially onto the layer 910, thereby causing diffusion and migration of the monomer, leading to uneven distribution of the monomer. Further, this type of optical waveguide 1 can be formed simply by the partial irradiation of the active radiation 930, and yields an optical waveguide having high transmission efficiency. Accordingly, even if the widths and pitch of the core portions 14 and the side cladding portions 15 are narrow, high quality optical communication can still be achieved. Further, even if a plurality of core portions 14 are intersected within the same plane, interference or deterioration in the transmission efficiency are unlikely. Accordingly, the optical waveguide 1 facilitates the production of multichannel and high-density configurations.

In the refractive index distribution W, the local minimum values Ws1, Ws2, Ws3 and Ws4 exist at positions where the low refractive index portion L inverts (see FIG. 3(b)), and the positions of these local minimum values correspond with the interfaces between the core portions 14 and the side cladding portions 15.

Further, when a compound having a higher refractive index than that of the polymer 915 is used as the monomer, then in the opposite manner to that described above, the diffusion and migration of the monomer is accompanied by an increase in the refractive index of the migration destination. Accordingly, the irradiated region 925 and the non-irradiated region 940 must be set in accordance with that behavior.

As described above, the refractive index distribution W is formed with a continuously changing refractive index, due to the migration and uneven distribution of the photopolymerizable monomer. Consequently, the core layer 13 does not have distinct structural interfaces between the core portions 14 and the side cladding portions 15. As a result, problems such as peeling and cracking are unlikely, and the optical waveguide 1 exhibits excellent reliability.

The Shore D hardness of the polymer 915 is preferably about 35 to 95, more preferably about 40 to 90, and still more preferably about 45 to 85. A polymer 915 having this level of hardness imparts the optical waveguide 1 with the necessary flexibility and rupture resistance, while also enabling reliable diffusion and migration of the monomer, thus contributing to the formation of a satisfactory refractive index difference. Accordingly, the obtained optical waveguide 1 is provided with the necessary flexibility and mechanical strength suitable for bending, and has excellent optical properties even in a bent state.

Similarly, the Rockwell hardness of the polymer 915 is preferably about 40 to 125 on the M scale, more preferably about 50 to 115, and still more preferably about 60 to 110.

Furthermore, the softening point of the polymer 915 is preferably at least 90° but not more than 300° C., more preferably from 95 to 280° C., and particularly preferably from 100 to 260° C. This ensures that the refractive index distribution W can be formed reliably in the resulting optical waveguide 1, that the formed refractive index distribution W can be reliably maintained over long periods, and that the optical waveguide 1 has sufficient mechanical strength to prevent disconnection even when the optical waveguide is used in a bent state. Accordingly, the optical waveguide 1 becomes a highly reliable device with excellent optical properties. The softening point of the polymer 915 refers to the glass transition temperature or the melting point of the polymer 915, and if the polymer exhibits both values, refers to the lower of the two values.

In the intersection portion 147, the monomer diffuses and migrates in four directions, and the width of the refractive index variation increases. In this manner, the local maximum value of the refractive index at the intersection portion 147 can be increased to a higher value than the local maximum value in the core portion 14.

Figure 17A:
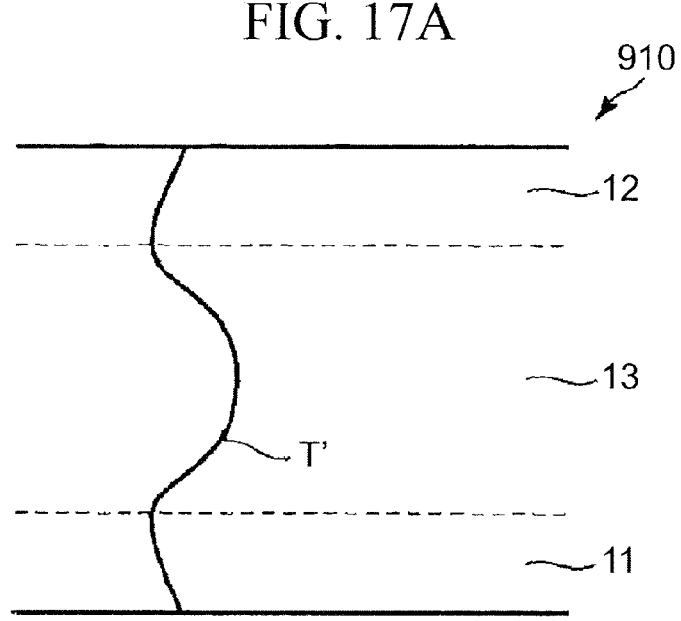
FIG. 17A is a diagram illustrating the refractive index distribution (W type) in the thickness direction of the laminated structure of the cladding layers and the core layer of FIG. 14, prior to irradiation with active radiation.

On the other hand, the layers 914a to 914i exist in the layer 910 prior to irradiation with the active radiation 930, and therefore as illustrated in FIG. 17A, a refractive index distribution T' is formed in the thickness direction of the layer 910. In other words, a refractive index distribution (W type) is formed with the refractive index along the horizontal axis and the position (distance) in the thickness direction of the transverse cross-section along the vertical axis.

This refractive index distribution T' is formed in the manner described above, by using the optical waveguide-forming composition 901 and the optical waveguide-forming composition 902 having mutually different refractive indices to form the layer 910 using a multilayer molding method. If two of these structures are superimposed, then the type of refractive index distribution illustrated in FIG. 10(b) can also be obtained.

When the layer 910 is irradiated with the active radiation 930 through the mask 935, in those cases where there is a difference in monomer content between the optical waveguide-forming composition 901 and the optical waveguide-forming composition 902, the monomer within the non-irradiated region 9403 diffuses and migrates into the irradiated region 9253, and therefore in the refractive index distribution T' in the thickness direction of the core portion 14, the refractive index of the region corresponding with the core portion 14 increases. On the other hand, in the cladding layers 11 and 12 positioned below and above the core portion 14, the refractive index either does not change or changes only minimally, and as a result, the refractive index difference between the core portion 14 and the lower and upper cladding layers 11 and 12 is magnified.

Figure 17B:
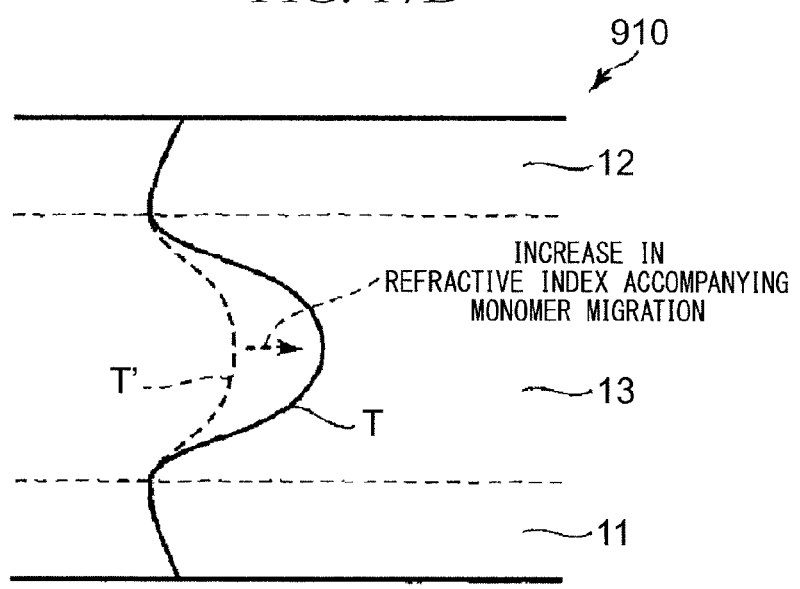
FIG. 17B is a diagram illustrating the change in the refractive index distribution in the thickness direction of the laminated structure of the cladding layers and the core layer of FIG. 14 following irradiation with active radiation.

Based on the above principles, an optical waveguide 1 having a refractive index distribution T with a large difference in refractive index between the local minimum values and the local maximum value can be obtained (see FIG. 17B). In those cases where the refractive index distribution T' already has a refractive index distribution shape sufficient to produce satisfactory effects, the above-described conversion from the refractive index distribution T' to the refractive index distribution T may be omitted.

Figure 17C:
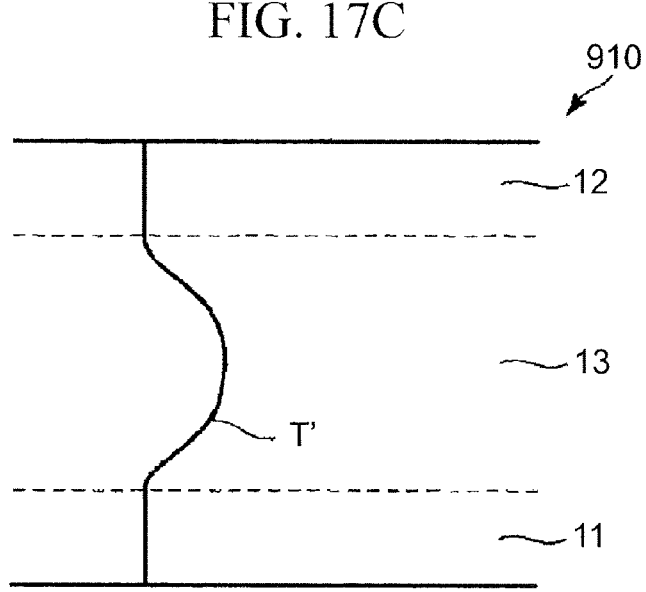
FIG. 17C is a diagram illustrating the refractive index distribution in the thickness direction in the optical waveguide of FIG. 13, prior to irradiation with active radiation, when the uppermost layer and the lowermost layer produced from an optical waveguide-forming composition 901 are not provided.

In FIG. 13(a), if the uppermost layer and the lowermost layer formed from the optical waveguide-forming composition 901 are not provided, then an optical waveguide having the type of thickness direction refractive index distribution illustrated in FIG. 17C can be obtained.

The refractive index distribution W has a fixed correlation with the concentration of monomer-derived structures within the core layer 13. Accordingly, by measuring the concentration of these monomer-derived structures or the concentration of the materials of those structures, the refractive index distribution W of the optical waveguide 1 can be identified indirectly.

Similarly, the refractive index distribution T has a fixed correlation with the concentration of monomer-derived structures, or the concentration of the materials of those structures, within the optical waveguide 1. Accordingly, by measuring the concentration of these monomer-derived structures, the refractive index distribution T of the optical waveguide 1 can be identified indirectly.

The expression "monomer-derived structures" refers to the unreacted monomer and structures formed as a result of reaction, and includes the monomer, oligomers formed by reaction of the monomer, and polymers formed by reaction of the monomer.

Measurement of the concentration of these structures can be conducted by linear analysis such as FT-IR or TOF-SIMS, or by area analysis or the like.

Moreover, the refractive index distribution W and the refractive index distribution T can also be determined indirectly by utilizing the fact that the intensity distribution of output light from the optical waveguide 1 has a fixed correlation with the refractive index distribution W or the refractive index distribution T. In other words, the intensity distribution of the output light may be used as the concentration measurement.

Furthermore, the refractive index distribution can be measured by (1) a method in which interference fringes, which are dependent on the refractive index, are measured using a dual-beam interference microscope, and the refractive index distribution is then calculated from these interference fringes, or (2) a method in which the distribution is measured directly using the refracted near field (RNF) method. Of these, the refracted near field method may employ, for example, the measurement conditions disclosed in Japanese Unexamined Patent Application, First Publication No. Hei 05-332880. On the other hand, the dual-beam interference microscope is preferred in terms of enabling relatively simple measurement of the refractive index distribution.

Figure 21:
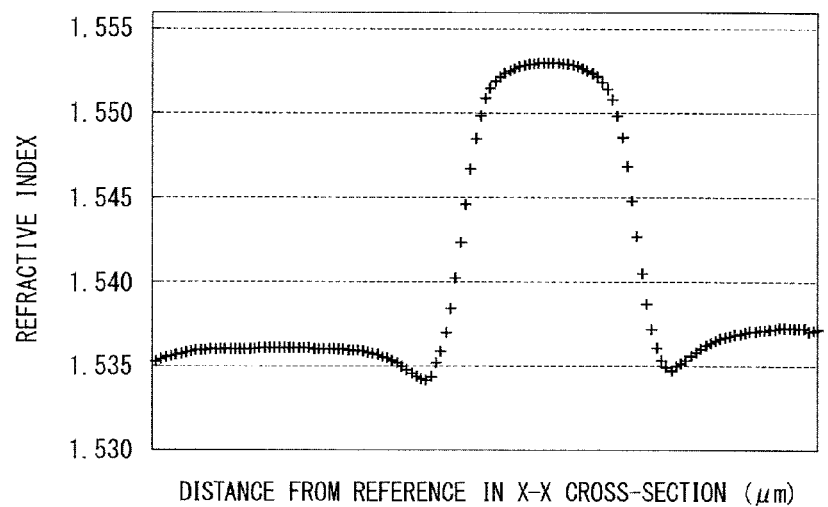
FIG. 21 is a graph illustrating the results of measuring the refractive index distribution for the core portion and the side cladding portions positioned on both sides thereof, in a transverse cross-section of an optical waveguide (transverse W type and longitudinal SI type) of the present invention.
Figure 22:
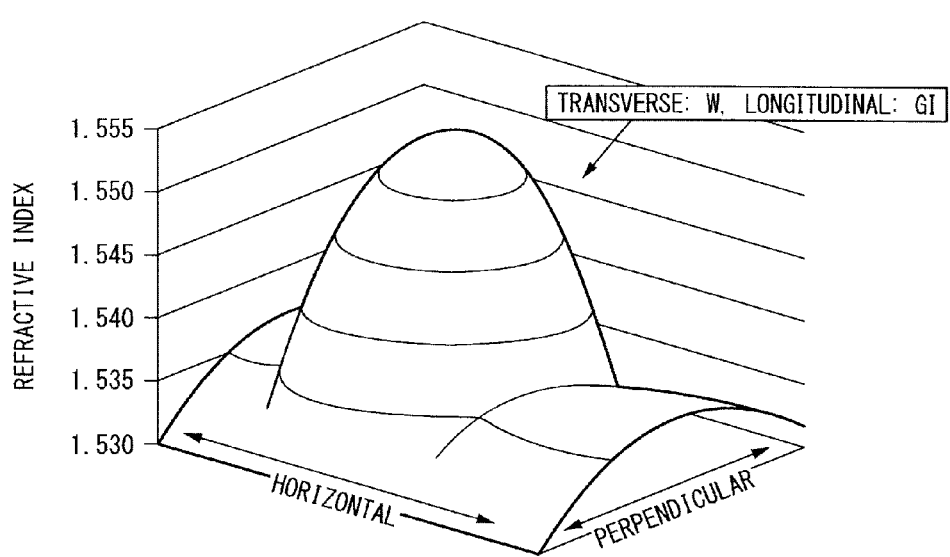
FIG. 22 is a three dimensional refractive index distribution illustrating the refractive index distributions in the width direction and the longitudinal direction of an optical waveguide (transverse W type and longitudinal GI type).
Figure 23:
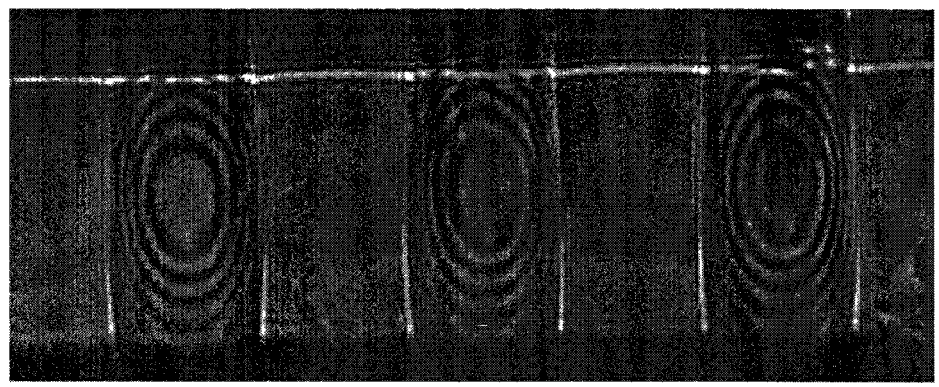
FIG. 23 is an interference fringe photograph, obtained using an interference microscope, of an optical waveguide fragment obtained from a width direction cross-section of an optical waveguide of the present invention (containing three core portions).

One example of the procedure for measuring the refractive index distribution using a dual-beam interference microscope is described below. First, the optical waveguide is sliced in the cross-sectional direction (width direction) to obtain an optical waveguide slice. For example, slicing is performed so as to obtain an optical waveguide length of 200 to 300 μm. Subsequently, a chamber is prepared by filling the space surrounded by two slide glass sheets with an oil having a refractive index of 1.536. Then, a measurement sample containing the optical waveguide slice sandwiched inside the internal space of the chamber, and a blank sample containing no optical waveguide slice are prepared. Next, using the dual-beam interference microscope, light split into two beams is irradiated onto the measurement sample and the blank sample respectively, and the transmitted light is combined to obtain an interference fringe photograph (see FIG. 23, an interference fringe photograph of an optical waveguide of the present invention, having a transverse W type distribution and a longitudinal GI type distribution). The interference fringes are generated in accordance with the refractive index distribution (phase distribution) of the optical waveguide slice. Accordingly, by performing image analysis of the obtained interference fringe photograph, the refractive index distribution W in the width direction of the optical waveguide can be obtained (see FIG. 21, a W type refractive index distribution in the width direction of an optical waveguide of the present invention, having a transverse W type and longitudinal SI type distribution). When acquiring the refractive index distribution W, performing image analysis of a plurality of interference fringe photographs can enhance the accuracy of the refractive index distribution W. In order to obtain a plurality of interference fringe photographs, the prism inside the dual-beam interference microscope may be moved, thereby altering the optical path length and obtaining photographs having mutually different intervals between the interference fringes or having different positions in which the interference fringes are formed. Further, when performing image analysis of the interference fringe photographs, analysis points may be set, for example, at an interval of 2.5 μm. By performing this image analysis, the refractive index distribution W in the width direction and the refractive index distribution T in the thickness direction can be obtained for the optical waveguide, and therefore a three dimensional refractive index distribution for the optical waveguide of the present invention, such as that illustrated in FIG. 22, can be obtained. The optical waveguide 1 is obtained in the manner described above.

Subsequently, if required, the optical waveguide 1 is detached from the support substrate 951, the support film 2 is laminated to the lower surface of the optical waveguide 1, and the cover film 3 is laminated to the upper surface.

The optical waveguide of the present invention preferably has a W type or GI type distribution shape in cross-section (transverse cross-section). Further, the optical waveguide of the present invention preferably has a W type, GI type or SI type distribution shape in cross-section (cross-section of the thickness direction).

Among the various possibilities, the optical waveguide 1 preferably has a W type distribution shape in the transverse cross-section and a GI type or SI type distribution shape in the cross-section of the thickness direction. An optical waveguide having a W type distribution shape in the transverse cross-section and a GI type distribution shape in the cross-section of the thickness direction is particularly desirable.

Figure 18:
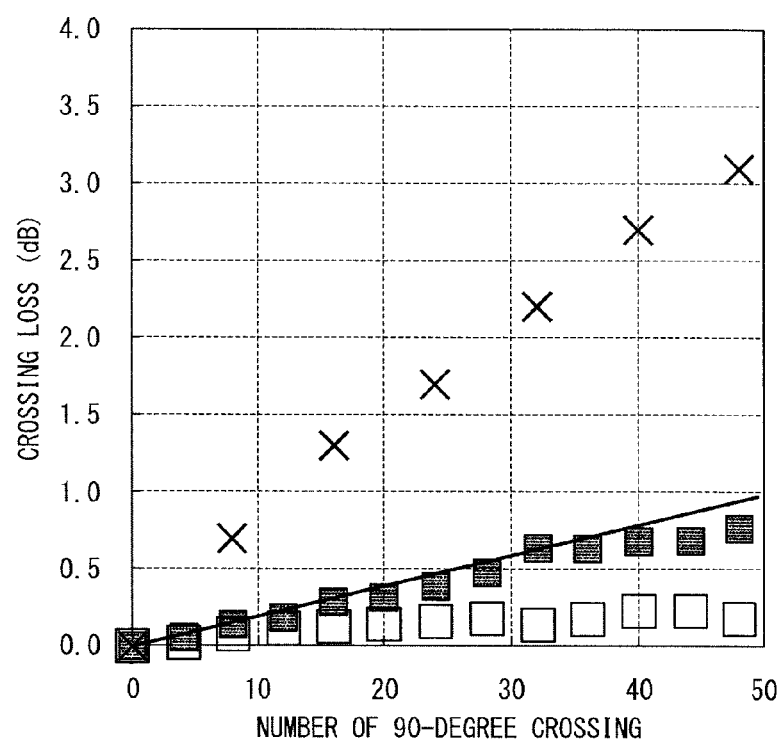
FIG. 18 is a graph illustrating the relationship between the number of intersections and the relative loss for optical waveguides of the present invention and the conventional technology, at a core layer crossing angle of 90°.
Figure 19:
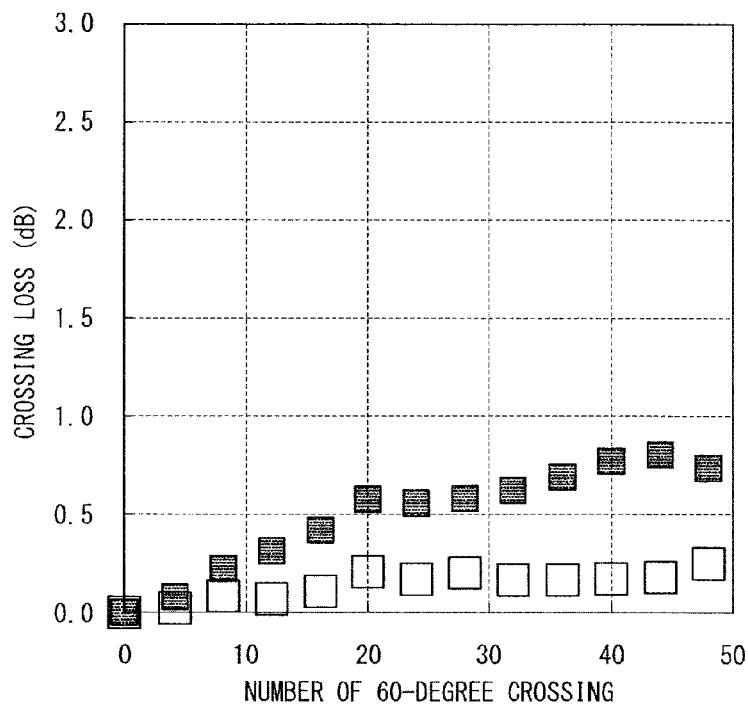
FIG. 19 is a graph illustrating the relationship between the number of intersections and the relative loss for optical waveguides of the present invention, at a core layer crossing angle of 60°.
Figure 20:
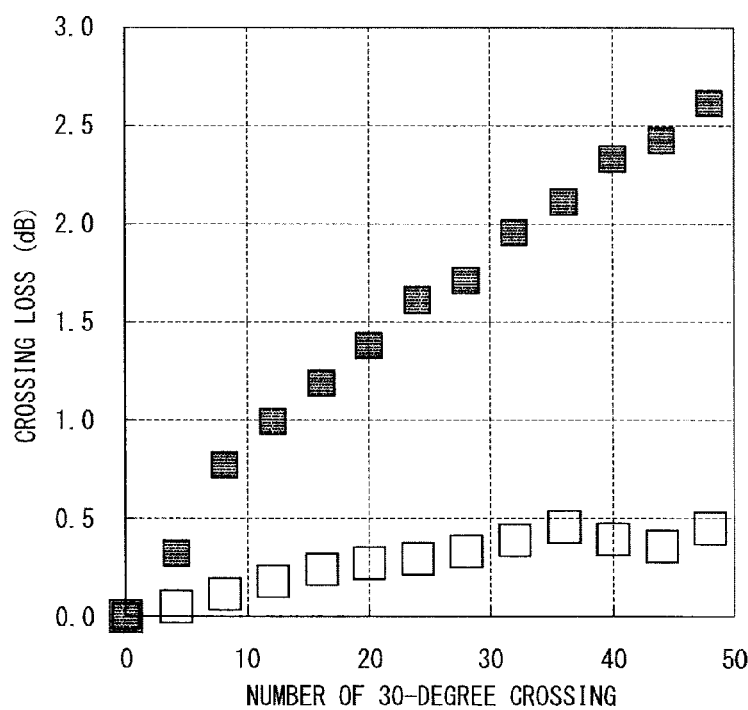
FIG. 20 is a graph illustrating the relationship between the number of intersections and the relative loss for optical waveguides of the present invention, at a core layer crossing angle of 30°.

The graphs of FIG. 18 to FIG. 20 illustrate the transmission loss at an intersection portion between two core portions. Specifically, the horizontal axis represents the number of intersections or crossings, and the vertical axis represents the relative loss compared with the case in which there are no intersections. The intersection portions of the core portions were formed by a method using a photomask in which the intersection portions were formed as a pattern. The crossing angle of the core portions in the figures is 90°, 60° and 30° respectively.

These graphs illustrate the results for two waveguides formed under substantially the same conditions, specifically (1) an optical waveguide having a W type distribution shape in the transverse cross-section and an SI type distribution shape in the cross-section of the thickness direction (shown as black squares), and (2) an optical waveguide having a W type distribution shape in the transverse cross-section and a GI type distribution shape in the cross-section of the thickness direction (shown as white squares). The straight line shown in FIG. 18 is a line calculated by assuming a loss of 0.02 dB per intersection.

Further, the data shown as crosses (x) represents data for an optical waveguide formed using conventional technology, and is plotted for the purpose of reference. The production conditions differ, and therefore the data is graphed merely to provide a point of reference. The data for the conventional technology is reproduced, as is, from the document "Optical interconnection using VCSELs and polymeric waveguide circuits", T. Sakamoto, H. Tsuda, M. Hikita, T. Kagawa, K. Tateno, and C. Amano, J. Lightwave Technol. 11, 1487 to 1492 (2000).

As illustrated in FIG. 18 to FIG. 20, the optical waveguide of the present invention having a combination of a W type distribution and an SI type distribution, and the optical waveguide having a combination of a W type distribution and a GI type distribution both exhibit excellent low levels of transmission loss. In particular, the optical waveguide having a combination of a W type distribution and a GI type distribution is able to achieve extremely low levels of transmission loss at all of the evaluated crossing angles.

Furthermore, when the layer 910 is formed so as to include a plurality of core layers 13, and the active radiation 930 is irradiated onto this layer 910, a single irradiation enables the simultaneous formation of the core portions 14 and the side cladding portions 15 in this plurality of core layers 13. As a result, an optical waveguide 1 having a plurality of core layers 13 can be produced via a minimal number of steps. Further, in this case, almost no positional deviation of the core portions 14 occurs between the plurality of core layers 13. Accordingly, an optical waveguide 1 having extremely high dimensional precision can be obtained. This type of optical waveguide 1 exhibits particularly superior optical coupling efficiency when optically coupled with light receiving and emitting elements.

Furthermore, the optical waveguide of the present invention exhibits little transmission loss or pulse signal rounding, and if a multichannel or high density configuration is produced, crosstalk or interference at the intersection portions is unlikely. As a result, even at high density and within a small surface area, an optical waveguide of high reliability can be obtained, and by installing this type of optical waveguide, electronic devices of improved reliability and better miniaturization can be obtained.

An optical waveguide, optical wiring component, optical waveguide module and electronic device of the present invention have been described above, but the present invention is not limited to the configurations described above, and for example, optional structures may be added to the optical waveguide.

Further, the method used for producing the optical waveguide of the present invention is not limited to the method described above. For example, other methods may also be used, including a method in which the irradiation of active radiation is used to break molecular bonds, thus altering the refractive index (photo-bleaching method), and a method in which a photo-crosslinkable polymer having an unsaturated bond that can undergo photoisomerization or photodimerization is added to the composition used in forming the core layer, and irradiation of active radiation is used to change the molecular structure and thereby alter the refractive index (photoisomerization or photodimerization method).

With these methods, the amount of change in the refractive index can be adjusted in accordance with the irradiation dose of the active radiation. Accordingly, by altering the dose of active radiation irradiated onto each portion of the layer in accordance with the targeted shape of the refractive index distribution W, a core layer having the desired refractive index distribution W can be formed.

EXAMPLES

Next is a description of examples of the present invention. However, the present invention is not limited to only these examples. Modifications, additions or substitutions or the like of positions, numbers, amounts and varieties and the like may be made, provided they result in no particular problems.
1. Production of Optical Waveguide Having Refractive Index Distribution Shown in FIG. 3

First, optical waveguides having linear core portions with the refractive index distribution illustrated in FIG. 3 were produced under various conditions (Examples 1 to 18), and for the purposes of comparison, optical waveguides of Comparative Example 1 and Reference Examples 1 to 4 were also produced. These optical waveguides were evaluated as described in Section 3 below.

Example 1

(1) Production of Cladding Layer-forming Resin Composition

Twenty grams of an alicyclic epoxy resin Celloxide 2081 manufactured by Daicel Corporation, 0.6 g of a cationic polymerization initiator Adeka Optomer SP-170 manufactured by Adeka Corporation, and 80 g of methyl isobutyl ketone were mixed under stirring to prepare a solution.

Subsequently, the thus obtained solution was filtered through a PTFE filter with a pore size of 0.2 μm, thus obtaining a clean, colorless and transparent cladding layer-forming resin composition E1.
(2) Production of Photosensitive Resin Composition Twenty grams of a phenoxy resin YP-50S manufactured by Nippon Steel and Chemical Co., Ltd. as an epoxy-based polymer, 5 g of Celloxide 2021P manufactured by Daicel Corporation as a monomer, and 0.2 g of Adeka Optomer SP170 manufactured by Adeka Corporation as a polymerization initiator were added to 80 g of methyl isobutyl ketone and dissolved under stirring to prepare a solution.

Subsequently, the thus obtained solution was filtered through a PTFE filter with a pore size of 0.2 μm, thus obtaining a clean, colorless and transparent photosensitive resin composition F1.
(3) Preparation of Lower Cladding Layer The cladding layer-forming resin composition E1 was applied uniformly to a polyimide film of thickness 25 μm using a doctor blade. The resulting structure was then placed in a dryer at 50° C. for 10 minutes. Following complete removal of the solvent, the entire surface of the structure was irradiated with ultraviolet radiation using a UV exposure apparatus, thereby curing the applied resin composition E1. As a result, a colorless and transparent lower cladding layer having a thickness of 10 μm was obtained. The accumulated dose of ultraviolet radiation was 500 mJ/cm$^2$.
(4) Preparation of Core Layer The photosensitive resin composition F1 was applied uniformly to the prepared lower cladding layer using a doctor blade. The resulting structure was then placed in a dryer at 40° C. for 5 minutes. Following complete removal of the solvent and formation of a film, a photomask having a linear pattern of lines and spaces over the entire surface was pressed onto the obtained film. The film was then irradiated with ultraviolet radiation from above the photomask using a parallel exposure apparatus. The accumulated dose of ultraviolet radiation was 1,000 mJ/cm².

Subsequently, the photomask was removed, and the structure was placed in an oven at 150° C. for 30 minutes. Upon removal from the oven, the appearance of a clear waveguide pattern in the film was confirmed. The average width WCO of the core portions and the average width WCL of the side cladding portions are shown in Table 1. The obtained core layer had a thickness of 50 μm, and included 8 core portions.

(5) Preparation of Upper Cladding Layer

In a similar manner to (3) above, the cladding layer-forming resin composition E1 was applied to the prepared core layer to obtain a colorless and transparent upper cladding layer with a thickness of 10 μm. In this manner, an optical waveguide was obtained.

(6) Evaluation of Refractive Index Distribution

Using a dual-beam interference microscope, a refractive index distribution W in the width direction was acquired for a transverse cross-section of the core layer of the obtained optical waveguide. The results revealed that the refractive index distribution W had a plurality of low refractive index regions and high refractive index regions, with the refractive index changing in a continuous manner.

Examples 2 to 8

With the exceptions of setting the polymer composition, the monomer composition and content, and the accumulated dose of ultraviolet radiation as shown in Table 1, and preparing the photomask pattern so that the average width WCO of the core portions and the average width WCL of the side cladding portions exhibited the values shown in Table 1, optical waveguides of Examples 2 to 8 were obtained in the same manner as Example 1.

Example 9

(1) Synthesis of (Meth)acrylic-based Polymer

A separable flask was charged with 20.0 g of methyl methacrylate (MMA), 30.0 g of benzyl methacrylate (BzMA) and 450 g of methyl isobutyl ketone. These components were stirred and mixed, and the flask was flushed with nitrogen, thus obtaining a monomer solution.

On the other hand, 0.25 g of azobisisobutyronitrile as a polymerization initiator was dissolved in 10 g of methyl isobutyl ketone, and the flask was flushed with nitrogen to obtain an initiator solution.

The aforementioned monomer solution was stirred under heating at 80° C., and a syringe was used to add the above initiator solution to the monomer solution. The mixture was stirred at 80° C. for one hour, and then cooled to complete preparation of a polymer solution. Subsequently, 5 L of isopropanol was placed in a beaker, and with the isopropanol undergoing constant stirring with a stirrer at normal temperature, the polymer solution was added dropwise to the beaker. Following completion of the dropwise addition, stirring was continued for a further 30 minutes, and the precipitated polymer was then collected and dried in a vacuum dryer under reduced pressure at 60° C. for 8 hours. This yielded an acrylic-based polymer A1.

(2) Production of Cladding Layer-forming Resin Composition

Twenty grams of a water-based acrylate resin solution RD-180 manufactured by Goo Chemical Co. Ltd., 20 g of isopropanol, and 0.4 g of Carbodilite V-02-L2 manufactured by Nisshinbo Chemical Inc. as a polymerization initiator were mixed under stirring to prepare a solution.

Subsequently, the thus obtained solution was filtered through a PTFE filter having a pore size of 0.2 μm, thus obtaining a clean, colorless and transparent cladding layer-forming resin composition B1.

(3) Production of Photosensitive Resin Composition

Twenty grams of the synthesized acrylic-based polymer A1, 5 g of cyclohexyl methacrylate as a monomer, and 0.2 g of Irgacure 651 manufactured by BASF Japan Ltd. as a polymerization initiator were added to 80 g of methyl isobutyl ketone and dissolved under stirring to prepare a solution.

Subsequently, the thus obtained solution was filtered through a PTFE filter having a pore size of 0.2 μm, thus obtaining a clean, colorless and transparent photosensitive resin composition C1.

(4) Preparation of Lower Cladding Layer

The cladding layer-forming resin composition B1 was applied uniformly to a polyimide film of thickness 25 μm using a doctor blade. The resulting structure was then placed in a dryer at 80° C. for 10 minutes. Following complete removal of the solvent, the structure was placed in an oven at 150° C. for 10 minutes to cure the composition, thus obtaining a colorless and transparent lower cladding layer having a thickness of 10 μm.

(5) Preparation of Core Layer

The photosensitive resin composition C1 was applied uniformly to the prepared lower cladding layer using a doctor blade. The resulting structure was then placed in a dryer at 40° C. for 5 minutes. Following complete removal of the solvent and formation of a film, a photomask having a linear pattern of lines and spaces over the entire surface was pressed onto the obtained film. The film was then irradiated with ultraviolet radiation from above the photomask using a parallel exposure apparatus. The accumulated dose of ultraviolet radiation was 800 mJ/cm².

Subsequently, the photomask was removed, and the structure was placed in an oven at 150° C. for 30 minutes. Upon removal from the oven, the appearance in the film of a distinct waveguide pattern with a rectangular cross-section was confirmed. The average width WCO of the core portions and the average width WCL of the side cladding portions are shown in Table 2. The obtained core layer had a thickness of 50 μm, and included 8 core portions.

(6) Preparation of Upper Cladding Layer

In a similar manner to (4) above, the cladding layer-forming resin composition B1 was applied to the prepared core layer to obtain a colorless and transparent upper cladding layer with a thickness of 10 μm. In this manner, an optical waveguide was obtained.

(7) Evaluation of Refractive Index Distribution

Using a dual-beam interference microscope, a refractive index distribution W in the width direction was acquired for a transverse cross-section of the core layer of the obtained optical waveguide. The results revealed that the refractive index distribution W had a plurality of low refractive index regions and high refractive index regions, with the refractive index changing in a continuous manner.

Examples 10 to 12

With the exceptions of setting the monomer composition and content, and the accumulated dose of ultraviolet radiation as shown in Table 2, and preparing the photomask pattern so that the average width WCO of the core portions and the average width WCL of the side cladding portions exhibited the values shown in Table 2, optical waveguides of Examples 10 to 12 were obtained in the same manner as Example 9.

Example 13

(1) Synthesis of Polyolefin-based Resin

In a glove box filled with dry nitrogen, in which the moisture content and oxygen concentration were both suppressed to 1 ppm or lower, 7.2 g (40.1 mmol) of hexylnorbornene (HxNB) and 12.9 g (40.1 mmol) of diphenylmethyl norbornene methoxysilane were weighed into a 500 mL vial, and 60 g of dehydrated toluene and 11 g of ethyl acetate were then added to the vial. The glove box was tightly sealed at the top by a silicone sealer.

Next, 1.56 g (3.2 mmol) of a Ni catalyst and 10 mL of dehydrated toluene were weighed into a 100 mL vial. A stirrer chip was placed in the vial, the vial was then sealed, and the catalyst was completely dissolved by thorough stirring.

One mL of this Ni catalyst solution was measured accurately using a syringe and injected quantitatively into the vial containing the above two types of norbornene compounds, and the resulting mixture was stirred at room temperature for one hour. As a result, a marked increase in the viscosity was confirmed. At this point, the seal was removed and 60 g of tetrahydrofuran (THF) was added and stirred, thus obtaining a reaction solution.

A 100 mL beaker was charged with 9.5 g of acetic anhydride, 18 g of aqueous hydrogen peroxide (concentration: 30%), and 30 g of deionized water, and the mixture was stirred to prepare an aqueous peracetic acid solution in situ. Next, the entire volume of this aqueous solution was added to the above reaction solution and stirred for 12 hours to effect a Ni reduction treatment.

Next, following completion of the above treatment, the reaction solution was transferred to a separating funnel, and the lower aqueous layer was discarded. Subsequently, 100 mL of a 30% aqueous solution of isopropanol was added and shaken vigorously. The contents were left to stand to allow complete separation into two layers, and the aqueous layer was then discarded. This water washing process was repeated a total of three times. The oil layer was then added dropwise to a large excess of acetone to re-precipitate the produced polymer, and the polymer was separated from the filtrate by filtration. Subsequently, the polymer was dried by heating for 12 hours in a vacuum dryer set to 60° C., thus obtaining a polymer #1. Measurement of the molecular weight distribution of the polymer #1 by GPC revealed Mw=100,000 and Mn=40,000. The molar ratio between each of the structural units in the polymer #1 was determined by NMR, and the results revealed 50 mol % of hexylnorbornene structural units and 50 mol % of diphenylmethyl norbornene methoxysilane structural units.

(2) Production of Core Layer-forming Composition

Ten grams of the purified polymer #1 was weighed into a 100 mL glass container, and then 40 g of mesitylene, 0.01 g of an antioxidant Irganox 1076 (manufactured by Ciba Geigy Ltd.), 2 g of cyclohexyloxetane monomer (CHOX, manufactured by Toagosei Co. Ltd., CAS #483303-25-9, molecular weight: 186, boiling point: 125° C./1.33 kPa) and a polymerization initiator (photoacid generator) Rhodorsil Photoinitiator 2074 (manufactured by Rhodia Inc., CAS #178233-72-2) (0.0125 g in 0.1 mL of ethyl acetate) were added to the container and dissolved uniformly. Subsequently, the solution was filtered through a 0.2 μm PTFE filter to obtain a clean core layer-forming composition. In Table 1, the above polymerization initiator is shown as PI 2074.

(3) Production of Cladding Layer-forming Composition

With the exception of replacing the above polymer #1 with a polymer in which the molar ratio between each of the structural units in the purified polymer #1 had been altered to obtain a polymer containing 80 mol % of the hexylnorbornene structural units and 20 mol % of the diphenylmethyl norbornene methoxysilane structural units, a cladding layer-forming composition was obtained in the same manner as the core layer-forming composition.

(4) Preparation of Lower Cladding Layer

The cladding layer-forming composition was applied uniformly to a polyimide film of thickness 25 μm using a doctor blade. The resulting structure was then placed in a dryer at 50° C. for 10 minutes. Following complete removal of the solvent, the entire surface of the structure was irradiated with ultraviolet radiation using a UV exposure apparatus, thereby curing the applied resin composition. As a result, a colorless and transparent lower cladding layer having a thickness of 10 μm was obtained. The accumulated dose of ultraviolet radiation was 500 mJ/cm$^2$.

(5) Preparation of Core Layer

The core layer-forming composition was applied uniformly to the prepared lower cladding layer using a doctor blade. The resulting structure was then placed in a dryer at 40° C. for 5 minutes. Following complete removal of the solvent and formation of a film, a photomask having a linear pattern of lines and spaces over the entire surface was pressed onto the obtained film. The film was then irradiated with ultraviolet radiation from above the photomask using a parallel exposure apparatus. The accumulated dose of ultraviolet radiation was 1,300 mJ/cm$^2$.

Subsequently, the photomask was removed, and the structure was placed in an oven at 150° C. for 30 minutes. Upon removal from the oven, the appearance in the film of a distinct waveguide pattern with a rectangular cross-section was confirmed. The obtained core layer had a thickness of 50 μm. Further, the core layer included 8 core portions.

(6) Preparation of Upper Cladding Layer

In a similar manner to (3) above, the cladding layer-forming resin composition E1 was applied to the prepared core layer to obtain a colorless and transparent upper cladding layer with a thickness of 10 μm. In this manner, an optical waveguide was obtained.

(7) Evaluation of Refractive Index Distribution

Using a dual-beam interference microscope, a refractive index distribution W in the width direction was acquired for a transverse cross-section of the core layer of the obtained optical waveguide. The results revealed that the refractive index distribution W had a plurality of low refractive index regions and high refractive index regions, with the refractive index changing in a continuous manner.

Examples 14 and 15

With the exceptions of setting the monomer composition and content, and the accumulated dose of ultraviolet radiation as shown in Table 3, and preparing the photomask pattern so that the average width WCO of the core portions and the average width WCL of the side cladding portions exhibited the values shown in Table 3, optical waveguides were obtained in the same manner as Example 13.

Example 16

(1) Production of Optical Waveguide

Using the optical waveguide-forming compositions used in Example 13, a die coater was used to perform multilayer extrusion molding onto a polyethersulfone (PES) film. As a result, a multilayer compact was obtained by the extrusion of three layers, with the core layer-forming composition forming the center layer, and the cladding layer-forming composition forming the upper and lower layers. This multilayer compact was placed in a dryer at 55° C. for 10 minutes to completely remove the solvent. Subsequently, a photomask was pressed onto the multilayer compact, and selective irradiation was performed at 1,300 mJ/cm$^2$. The photomask was then removed, and the multilayer compact was heated in a dryer at 150° C. for 1.5 hours. Following heating, the appearance of a clear waveguide pattern and the formation of core portions and side cladding portions was confirmed. Subsequently, a sample having a length of 10 cm was cut from the obtained optical waveguide. The formed optical waveguide had eight core portions arranged in parallel. Further, the thickness of the entire optical waveguide was 100 μm.

(2) Evaluation of Refractive Index Distribution

Using a dual-beam interference microscope, a refractive index distribution W in the width direction was acquired for a transverse cross-section of the core layer of the obtained optical waveguide. The results revealed that the refractive index distribution W had a plurality of low refractive index regions and high refractive index regions, with the refractive index changing in a continuous manner.

On the other hand, for a transverse cross-section of the optical waveguide, the dual-beam interference microscope was also used to acquire a refractive index distribution T in the thickness direction along a centerline that penetrates vertically along the center of the width of a core portion. The results revealed that the refractive index distribution T had a region in the central portion in which the refractive index changed continuously, and regions on both sides of this central region in which the refractive index had a substantially constant value that was lower than the refractive index of the central region. In other words, the refractive index distribution T in the thickness direction of the obtained optical waveguide was a so-called graded index type distribution.

Examples 17 and 18

With the exceptions of setting the monomer composition and content, and the accumulated dose of ultraviolet radiation as shown in Table 3, and preparing the photomask pattern so that the average width WCO of the core portions and the average width WCL of the side cladding portions exhibited the values shown in Table 3, optical waveguides of Examples 17 and 18 were obtained in the same manner as Example 16.

Comparative Example 1

With the exceptions of not adding the CHOX to the core layer-forming composition and the cladding layer-forming composition, and altering the amount added of PI 2074 to 0.01 g, an optical waveguide of Comparative Example 1 was obtained in the same manner as Example 13.

In the thus obtained optical waveguide, the refractive index of the core portions was constant, and the refractive index of the side cladding portions was also constant, meaning the refractive index of the core portions and the cladding portions was discontinuous. In other words, the refractive index distribution of the core layer of the obtained optical waveguide was a so-called step index (SI) type distribution.

Reference Examples 1 and 2

With the exception of altering the photomask pattern so that the average width WCO of the core portions and the average width WCL of the side cladding portions exhibited the values shown in Table 1, optical waveguides of Reference Examples 1 and 2 were obtained in the same manner as Examples 1 and 2 respectively.

Reference Examples 3 and 4

With the exception altering the photomask pattern so that the average width WCO of the core portions and the average width WCL of the side cladding portions exhibited the values shown in Table 2, optical waveguides of Reference Examples 3 and 4 were obtained in the same manner as Examples 9 and 10 respectively.

The production conditions for the optical waveguides obtained in each of the above examples, and each of the above comparative examples and reference examples are shown below in Tables 1, 2 and 3.

TABLE 1

(Epoxy-based Polymers)

| | Core layer-forming composition | | | | | Exposure | Refractive index distribution | | Core layer dimensions | | |
|---|---|---|---|---|---|---|---|---|---|---|---|
| | Epoxy-based polymer | | | | | | | | Core portion average width | Cladding portion average width | |
| | Composition | Softening point (° C.) | Shore D hardness | Monomer (phr) | Polymerization initiator (phr) | dose (mJ/cm$^2$) | Width direction | Thickness direction | WCO (μm) | WCL (μm) | WCO/WCL |
| Example 1 | YP-50S | 100 | 55 | Celloxide 2021P (25) | SP-170 (1) | 1,000 | GI type | SI type | 45 | 20 | 2.25 |
| Example 2 | ↑ | ↑ | ↑ | ↑ | ↑ | ↑ | ↑ | ↑ | 35 | 200 | 0.18 |
| Example 3 | ↑ | ↑ | ↑ | ↑ | ↑ | ↑ | ↑ | ↑ | 50 | 75 | 0.67 |
| Example 4 | ↑ | ↑ | ↑ | Celloxide 2021P (35) | ↑ | ↑ | ↑ | ↑ | 40 | 25 | 1.60 |
| Example 5 | Ogsol EG | 115 | 70 | Celloxide 2021P (25) | ↑ | 500 | ↑ | ↑ | 45 | 20 | 2.25 |
| Example 6 | ↑ | ↑ | ↑ | ↑ | ↑ | ↑ | ↑ | ↑ | 35 | 200 | 0.18 |
| Example 7 | ↑ | ↑ | ↑ | ↑ | ↑ | ↑ | ↑ | ↑ | 50 | 75 | 0.67 |
| Example 8 | ↑ | ↑ | ↑ | Celloxide 2021P (35) | ↑ | ↑ | ↑ | ↑ | 35 | 30 | 1.17 |

TABLE 1-continued (Epoxy-based Polymers)

| | Core layer-forming composition | | | | | Refractive index distribution | | Core layer dimensions | | |
|---|---|---|---|---|---|---|---|---|---|---|
| | Epoxy-based polymer | | | | Exposure | | | Core portion average width | Cladding portion average width | |
| Composition | Softening point (° C.) | Shore D hardness | Monomer (phr) | Polymerization initiator (phr) | dose (mJ/cm²) | Width direction | Thickness direction | WCO (μm) | WCL (μm) | WCO/ WCL |
| Reference Example 1 | YP-50S | 100 | 55 | Celloxide 2021P (25) | SP-170 (1) | 1,000 | GI type | ↑ | 20 | 300 | 0.07 |
| Reference Example 2 | ↑ | ↑ | ↑ | ↑ | ↑ | ↑ | ↑ | ↑ | 50 | 4 | 12.50 |

* In the table, ↑ means the cell has the same content as the cell immediately above.

TABLE 2

(Acrylic-based Polymers)

| | Core layer-forming composition | | | | | Refractive index distribution | | Core layer dimensions | | |
|---|---|---|---|---|---|---|---|---|---|---|
| | Acrylic-based polymer | | | | Polymerization | Exposure | | | Core portion average width | Cladding portion average width | |
| Composition | Softening point (° C.) | Shore D hardness | Monomer (phr) | initiator (phr) | dose (mJ/cm²) | Width direction | Thickness direction | WCO (μm) | WCL (μm) | WCO/ WCL |
| Example 9 | MMA + BzMA | 95 | 60 | Cyclohexyl methacrylate (25) | Irgacure 651 (1) | 800 | GI type | SI type | 50 | 15 | 3.33 |
| Example 10 | ↑ | ↑ | ↑ | ↑ | ↑ | ↑ | ↑ | ↑ | 40 | 85 | 0.47 |
| Example 11 | ↑ | ↑ | ↑ | ↑ | ↑ | ↑ | ↑ | ↑ | 45 | 205 | 0.22 |
| Example 12 | ↑ | ↑ | ↑ | Cyclohexyl methacrylate (40) | ↑ | 1,000 | ↑ | ↑ | 40 | 25 | 1.60 |
| Reference Example 3 | MMA + BzMA | 95 | 60 | Cyclohexyl methacrylate (25) | Irgacure 651 (1) | 800 | ↑ | ↑ | 20 | 300 | 0.07 |
| Reference Example 4 | ↑ | ↑ | ↑ | ↑ | ↑ | ↑ | ↑ | ↑ | 80 | 4 | 20.00 |

* In the table, ↑ means the cell has the same content as the cell immediately above.

TABLE 3

(Polyolefin-based Polymers)

| | Core layer-forming composition | | | | | Refractive index distribution | | Core layer dimensions | | |
|---|---|---|---|---|---|---|---|---|---|---|
| | Polyolefin-based polymer | | | | Exposure | | | Core portion average width | Cladding portion average width | |
| Composition | Softening point (° C.) | Shore D hardness | Monomer (phr) | Polymerization initiator (phr) | dose (mJ/cm²) | Width direction | Thickness direction | WCO (μm) | WCL (μm) | WCO/ WCL |
| Example 13 | Polymer #1 | 235 | 45 | CHOX (20) | PI 2074 (0.125) | 1,300 | GI type | SI type | 40 | 20 | 2.00 |
| Example 14 | ↑ | ↑ | ↑ | ↑ | ↑ | ↑ | ↑ | ↑ | 40 | 200 | 0.20 |
| Example 15 | ↑ | ↑ | ↑ | ↑ | ↑ | ↑ | ↑ | ↑ | 50 | 75 | 0.67 |
| Example 16 | ↑ | ↑ | ↑ | ↑ | ↑ | 1,300 | ↑ | GI type | 50 | 75 | 0.67 |
| Example 17 | ↑ | ↑ | ↑ | ↑ | ↑ | 1,500 | ↑ | ↑ | 50 | 75 | 0.67 |

TABLE 3-continued (Polyolefin-based Polymers)

| | Core layer-forming composition | | | | | Refractive index distribution | | Core layer dimensions | | |
|---|---|---|---|---|---|---|---|---|---|---|
| | Polyolefin-based polymer | | | | Exposure | | | Core portion average width | Cladding portion average width | |
| | Composition | Softening point (° C.) | Shore D hardness | Monomer (phr) | Polymerization initiator (phr) | dose (mJ/cm²) | Width direction | Thickness direction | WCO (μm) | WCL (μm) | WCO/WCL |
| Example 18 | ↑ | ↑ | ↑ | ↑ | ↑ | 500 | ↑ | ↑ | 50 | 75 | 0.67 |
| Comparative Example 1 | ↑ | ↑ | ↑ | none | PI 2074 (0.1) | 1,300 | SI type | SI type | 45 | 80 | 0.56 |

* In the table, ↑ means the cell has the same content as the cell immediately above.

2. Production of Optical Waveguide Having Refractive Index Distribution Shown in FIG. 4

First, optical waveguides having linear core portions with the refractive index distribution illustrated in FIG. 4 were produced, and these optical waveguides were then evaluated as described in Section 3 below.

Examples 19 to 37, Comparative Example 2, and Reference Examples 5 to 10

With the exceptions of altering the production conditions as shown in Tables 4, 5 and 6, altering the drying conditions when forming the core layer to 50° C.×10 minutes in Examples 19 to 31 and Reference Examples 5 to 8, and altering the drying conditions when forming the core layer to 60° C.×15 minutes in Examples 32 to 37, Comparative Example 2 and Reference Examples 9 and 19, optical waveguides were obtained in the same manner as that described for Example 1. In Examples 35 to 37, the optical waveguides were produced using the same method as Example 16.

TABLE 4

(Epoxy-based Polymers)

| | Core layer-forming composition | | | | | Refractive index distribution | | Core layer dimensions | | |
|---|---|---|---|---|---|---|---|---|---|---|
| | Epoxy-based polymer | | | | Exposure | | | Core portion average width | Cladding portion average width | |
| | Composition | Softening point (° C.) | Shore D hardness | Monomer (phr) | Polymerization initiator (phr) | dose (mJ/cm²) | Width direction | Thickness direction | WCO (μm) | WCL (μm) | WCO/WCL |
| Example 19 | YP-50S | 100 | 55 | Celloxide 2021P (25) | SP-170 (2) | 800 | W type | SI type | 45 | 20 | 2.25 |
| Example 20 | ↑ | ↑ | ↑ | ↑ | ↑ | ↑ | ↑ | ↑ | 40 | 200 | 0.20 |
| Example 21 | ↑ | ↑ | ↑ | ↑ | ↑ | ↑ | ↑ | ↑ | 50 | 75 | 0.67 |
| Example 22 | ↑ | ↑ | ↑ | ↑ | ↑ | 1,200 | ↑ | ↑ | 30 | 12 | 2.50 |
| Example 23 | ↑ | ↑ | ↑ | Celloxide 2021P (35) | ↑ | 1,000 | ↑ | ↑ | 35 | 15 | 2.33 |
| Example 24 | Ogsol EG | 115 | 70 | Celloxide 2021P (25) | ↑ | 600 | ↑ | ↑ | 50 | 30 | 1.67 |
| Example 25 | ↑ | ↑ | ↑ | ↑ | ↑ | ↑ | ↑ | ↑ | 40 | 210 | 0.19 |
| Example 26 | ↑ | ↑ | ↑ | ↑ | ↑ | ↑ | ↑ | ↑ | 50 | 12 | 4.17 |
| Example 27 | ↑ | ↑ | ↑ | Celloxide 2081 (25) | ↑ | ↑ | ↑ | ↑ | 40 | 85 | 0.47 |
| Reference Example 5 | YP-50S | 100 | 55 | Celloxide 2021P (25) | SP-170 (2) | 500 | ↑ | ↑ | 12 | 150 | 0.08 |
| Reference Example 6 | ↑ | ↑ | ↑ | ↑ | ↑ | 1,500 | ↑ | ↑ | 50 | 4 | 12.50 |

* The "W type" refractive index distribution describes a refractive index distribution containing a region in which a second local maximum value, a local minimum value, a first local maximum value, a local minimum value, and a second local maximum value are arranged in sequence.
* In the table, ↑ means the cell has the same content as the cell immediately above.

TABLE 5

(Acrylic-based Polymers)

| | Core layer-forming composition | | | | | Exposure dose (mJ/cm²) | Refractive index distribution | | Core layer dimensions | | |
|---|---|---|---|---|---|---|---|---|---|---|---|
| | Acrylic-based polymer | | | Monomer (phr) | Polymer-ization initiator (phr) | | | | Core portion average width WCO (μm) | Cladding portion average width WCL (μm) | WCO/WCL |
| | Composition | Softening point (°C.) | Shore D hardness | | | | Width direction | Thickness direction | | | |
| Example 28 | MMA + BzMA | 95 | 60 | Cyclohexyl methacrylate (25) | Irgacure 651 (2) | 700 | W type | SI type | 50 | 15 | 3.33 |
| Example 29 | ↑ | ↑ | ↑ | ↑ | ↑ | ↑ | ↑ | ↑ | 40 | 85 | 0.47 |
| Example 30 | ↑ | ↑ | ↑ | ↑ | ↑ | ↑ | ↑ | ↑ | 40 | 210 | 0.19 |
| Example 31 | ↑ | ↑ | ↑ | Cyclohexyl methacrylate (40) | ↑ | 1,200 | ↑ | ↑ | 40 | 25 | 1.60 |
| Reference Example 7 | MMA + BzMA | 95 | 60 | Cyclohexyl methacrylate (25) | Irgacure 651 (2) | 700 | ↑ | ↑ | 12 | 150 | 0.08 |
| Reference Example 8 | ↑ | ↑ | ↑ | ↑ | ↑ | ↑ | ↑ | ↑ | 120 | 10 | 12.00 |

\* The "W type" refractive index distribution describes a refractive index distribution containing a region in which a second local maximum value, a local minimum value, a first local maximum value, a local minimum value, and a second local maximum value are arranged in sequence.
\* In the table, ↑ means the cell has the same content as the cell immediately above.

TABLE 6

(Polyolefin-based Polymers)

| | Core layer-forming composition | | | | | Exposure dose (mJ/cm²) | Refractive index distribution | | Core layer dimensions | | |
|---|---|---|---|---|---|---|---|---|---|---|---|
| | Polyolefin-based polymer | | | Monomer (phr) | Polymerization initiator (phr) | | | | Core portion average width WCO (μm) | Cladding portion average width WCL (μm) | WCO/WCL |
| | Composition | Softening point (°C.) | Shore D hardness | | | | Width direction | Thickness direction | | | |
| Example 32 | Polymer #1 | 235 | 45 | CHOX (20) | PI 2074 (0.25) | 1,300 | W type | SI type | 40 | 20 | 2.00 |
| Example 33 | ↑ | ↑ | ↑ | ↑ | ↑ | ↑ | ↑ | ↑ | 40 | 200 | 0.20 |
| Example 34 | ↑ | ↑ | ↑ | ↑ | ↑ | ↑ | ↑ | ↑ | 50 | 75 | 0.67 |
| Example 35 | ↑ | ↑ | ↑ | ↑ | ↑ | 1,500 | ↑ | GI type | 50 | 75 | 0.67 |
| Example 36 | ↑ | 1 | ↑ | ↑ | ↑ | 1,800 | ↑ | ↑ | 50 | 75 | 0.67 |
| Example 37 | ↑ | ↑ | ↑ | ↑ | ↑ | 700 | ↑ | ↑ | 50 | 75 | 0.67 |
| Comparative Example 2 | ↑ | ↑ | ↑ | none | PI 2074 (0.1) | 1,300 | SI type | SI type | 40 | 20 | 2.00 |
| Reference Example 9 | ↑ | ↑ | ↑ | ↑ | ↑ | graded exposure | GI type | ↑ | 40 | 20 | 2.00 |
| Reference Example 10 | ↑ | ↑ | ↑ | ↑ | ↑ | ↑ | W type | ↑ | 40 | 20 | 2.00 |

\* The "W type" refractive index distribution describes a refractive index distribution containing a region in which a second local maximum value, a local minimum value, a first local maximum value, a local minimum value, and a second local maximum value are arranged in sequence.
\* In the table, ↑ means the cell has the same content as the cell immediately above.

3. Evaluation of Optical Waveguides
3.1 Refractive Index Distribution of Optical Waveguide For each optical waveguide, the refractive index distribution along the centerline in the thickness direction of a transverse cross-section of the core layer was measured using a dual-beam interference microscope, thus obtaining a refractive index distribution in the width direction of the transverse cross-section of the core layer. In the obtained refractive index distribution, because the same refractive index distribution pattern repeated for each core portion, a portion of the obtained refractive index distribution was cut out and used as the refractive index distribution W. The refractive index distribution T was obtained in a similar manner.

Among the various types of the refractive index distribution W, the shape of those distributions recorded as "GI type" in Tables 1, 2 and 3 was similar to that illustrated in FIG. 3, including high refractive index regions WH containing a local maximum value Wm and low refractive index regions WL arranged alternately.

Further, among the various types of the refractive index distribution W, the shape of those distributions recorded as "W type" in Tables 4, 5 and 6 was similar to that illustrated in FIG. 4, including four local minimum values and five local maximum values arranged alternately. From this W type refractive index distribution W, each of the local minimum values Ws1, Ws2, Ws3 and Ws4, and each of the local maximum values Wm1, Wm2, Wm3, Wm4 and Wm5 were determined, and the average refractive index WA in the cladding portions was also determined. In the refractive index distribution W in the width direction of the optical waveguide obtained in each of the examples and each of the reference examples, the refractive index changed continuously across the entire distribution.

Further, in this W type refractive index distribution W, the width a [μm] of the portions in the vicinity of the local maximum values Wm2 and Wm4 in which the refractive index has a value equal to or greater than the average refractive index WA, and the width b [μm] of the portions in the vicinity of the local minimum values Ws1, Ws2, Ws3 and Ws4 in which the refractive index has a value less than the average refractive index WA were also measured.

Furthermore, in each of the optical waveguides, the maximum variation in the refractive index in the tailing portions was within a range from 0.008 to 0.025. Moreover, the maximum value for the refractive index in each of the intersection portions was higher than the local maximum value Wm, with the difference being within a range from 0.003 to 0.015.

The above measurement results are shown in Tables 7 to 13.

TABLE 7

Table 7 (Epoxy-based polymers)

| | Refractive index distribution W | | |
|---|---|---|---|
| | WL | Wm | Wm − WL |
| Example 1 | 1.535 | 1.548 | 0.013 |
| Example 2 | 1.540 | 1.549 | 0.009 |
| Example 3 | 1.538 | 1.548 | 0.010 |
| Example 4 | 1.530 | 1.547 | 0.017 |
| Example 5 | 1.580 | 1.601 | 0.021 |
| Example 6 | 1.585 | 1.602 | 0.017 |
| Example 7 | 1.582 | 1.600 | 0.018 |
| Example 8 | 1.575 | 1.602 | 0.027 |
| Reference Example 1 | 1.542 | 1.550 | 0.008 |
| Reference Example 2 | 1.545 | 1.549 | 0.004 |

TABLE 8

Table 8 (Acrylic-based polymers)

| | Refractive index distribution W | | |
|---|---|---|---|
| | WL | Wm | Wm − WL |
| Example 9 | 1.502 | 1.513 | 0.011 |
| Example 10 | 1.503 | 1.515 | 0.012 |
| Example 11 | 1.506 | 1.514 | 0.008 |
| Example 12 | 1.498 | 1.513 | 0.015 |
| Reference Example 3 | 1.505 | 1.512 | 0.007 |
| Reference Example 4 | 1.508 | 1.512 | 0.004 |

TABLE 9

Table 9 (Polyolefin-based polymers)

| | Refractive index distribution W | | |
|---|---|---|---|
| | WL | Wm | Wm − WL |
| Example 13 | 1.543 | 1.557 | 0.014 |
| Example 14 | 1.546 | 1.556 | 0.010 |
| Example 15 | 1.544 | 1.556 | 0.012 |
| Example 16 | 1.547 | 1.557 | 0.010 |
| Example 17 | 1.544 | 1.557 | 0.013 |
| Example 18 | 1.549 | 1.557 | 0.008 |
| Comparative Example 1 | | Step index type | |

TABLE 10

Table 10 (Polyolefin-based polymers)

| | Refractive index distribution T | | |
|---|---|---|---|
| | TA | Tm | Tm − TA |
| Example 16 | 1.537 | 1.557 | 0.020 |
| Example 17 | 1.537 | 1.557 | 0.020 |
| Example 18 | 1.537 | 1.557 | 0.020 |

TABLE 11

(Epoxy-based polymers)

Parameters of refractive index distribution W in width direction

| | Wm1 | Ws1 | Wm2 | Ws2 | Wm3 | Ws3 | Wm4 | Ws4 | Wm5 | Average refractive index WA | (WA − Ws1)/(Wm2 − Ws1) × 100 | (Wm1 − Ws1)/(Wm2 − Ws1) × 100 | Wm2 − Ws1 | a [μm] | b |
|---|---|---|---|---|---|---|---|---|---|---|---|---|---|---|---|
| Example 19 | 1.538 | 1.534 | 1.550 | 1.534 | 1.538 | 1.534 | 1.550 | 1.534 | 1.538 | 1.5360 | 12.5 | 25.0 | 0.016 | 38 | 0.30a |
| Example 20 | 1.540 | 1.538 | 1.551 | 1.538 | 1.540 | 1.538 | 1.551 | 1.538 | 1.540 | 1.5390 | 7.7 | 15.4 | 0.013 | 30 | 0.92a |
| Example 21 | 1.540 | 1.536 | 1.551 | 1.536 | 1.540 | 1.536 | 1.551 | 1.536 | 1.540 | 1.5380 | 13.3 | 26.7 | 0.015 | 42 | 0.55a |
| Example 22 | 1.537 | 1.534 | 1.549 | 1.534 | 1.537 | 1.534 | 1.549 | 1.534 | 1.537 | 1.5355 | 10.0 | 20.0 | 0.015 | 25 | 0.28a |
| Example 23 | 1.533 | 1.525 | 1.549 | 1.525 | 1.533 | 1.525 | 1.549 | 1.525 | 1.533 | 1.5290 | 16.7 | 33.3 | 0.024 | 28 | 0.42a |
| Example 24 | 1.583 | 1.574 | 1.600 | 1.574 | 1.583 | 1.574 | 1.600 | 1.574 | 1.583 | 1.5785 | 17.3 | 34.6 | 0.026 | 43 | 0.44a |
| Example 25 | 1.584 | 1.578 | 1.602 | 1.578 | 1.584 | 1.578 | 1.602 | 1.578 | 1.584 | 1.5810 | 12.5 | 25.0 | 0.024 | 35 | 1.1a |
| Example 26 | 1.586 | 1.575 | 1.601 | 1.575 | 1.586 | 1.575 | 1.601 | 1.575 | 1.586 | 1.5805 | 21.2 | 42.3 | 0.026 | 42 | 0.28a |

TABLE 11-continued (Epoxy-based polymers)

| | Parameters of refractive index distribution W in width direction | | | | | | | | | | | | | | |
|---|---|---|---|---|---|---|---|---|---|---|---|---|---|---|---|
| | Wm1 | Ws1 | Wm2 | Ws2 | Wm3 | Ws3 | Wm4 | Ws4 | Wm5 | Average refractive index WA | $(WA - Ws1)/(Wm2 - Ws1) \times 100$ | $(Wm1 - Ws1)/(Wm2 - Ws1) \times 100$ | Wm2 − Ws1 | a [μm] | b |
| Example 27 | 1.583 | 1.580 | 1.598 | 1.580 | 1.583 | 1.580 | 1.598 | 1.580 | 1.583 | 1.5815 | 8.3 | 16.7 | 0.018 | 37 | 0.79a |
| Reference Example 5 | 1.541 | 1.540 | 1.545 | 1.540 | 1.541 | 1.540 | 1.545 | 1.540 | 1.541 | 1.5405 | 10.0 | 20.0 | 0.005 | 9 | 1.5a |
| Reference Example 6 | 1.546 | 1.545 | 1.549 | 1.545 | 1.546 | 1.545 | 1.549 | 1.545 | 1.546 | 1.5455 | 12.5 | 25.0 | 0.004 | 48 | 0.05a |

TABLE 12

(Acrylic-based polymers)

| | Parameters of refractive index distribution W in width direction | | | | | | | | | | | | | | |
|---|---|---|---|---|---|---|---|---|---|---|---|---|---|---|---|
| | Wm1 | Ws1 | Wm2 | Ws2 | Wm3 | Ws3 | Wm4 | Ws4 | Wm5 | Average refractive index WA | $(WA - Ws1)/(Wm2 - Ws1) \times 100$ | $(Wm1 - Ws1)/(Wm2 - Ws1) \times 100$ | Wm2 − Ws1 | a [μm] | b |
| Example 28 | 1.503 | 1.498 | 1.514 | 1.498 | 1.503 | 1.498 | 1.514 | 1.498 | 1.503 | 1.5005 | 15.6 | 31.2 | 0.016 | 44 | 0.25a |
| Example 29 | 1.502 | 1.500 | 1.515 | 1.500 | 1.502 | 1.500 | 1.515 | 1.500 | 1.502 | 1.5010 | 6.7 | 13.3 | 0.015 | 36 | 0.62a |
| Example 30 | 1.502 | 1.501 | 1.514 | 1.501 | 1.502 | 1.501 | 1.514 | 1.501 | 1.502 | 1.5015 | 3.8 | 7.7 | 0.013 | 35 | 0.85a |
| Example 31 | 1.498 | 1.492 | 1.513 | 1.492 | 1.498 | 1.492 | 1.513 | 1.492 | 1.498 | 1.4950 | 14.3 | 28.6 | 0.021 | 35 | 0.45a |
| Reference Example 7 | 1.505 | 1.503 | 1.511 | 1.503 | 1.505 | 1.503 | 1.511 | 1.503 | 1.505 | 1.5040 | 12.5 | 25.0 | 0.008 | 11 | 1.5a |
| Reference Example 8 | 1.505 | 1.504 | 1.513 | 1.504 | 1.505 | 1.504 | 1.513 | 1.504 | 1.505 | 1.5045 | 5.6 | 11.1 | 0.009 | 75 | 0.08a |

TABLE 13

(Polyolefin-based polymers)

| | Parameters of refractive index distribution W in width direction | | | | | | | | | | | | | | |
|---|---|---|---|---|---|---|---|---|---|---|---|---|---|---|---|
| | Wm1 | Ws1 | Wm2 | Ws2 | Wm3 | Ws3 | Wm4 | Ws4 | Wm5 | Average refractive index WA | $(WA - Ws1)/(Wm2 - Ws1) \times 100$ | $(Wm1 - Ws1)/(Wm2 - Ws1) \times 100$ | Wm2 − Ws1 | a [μm] | b |
| Example 32 | 1.545 | 1.541 | 1.557 | 1.541 | 1.545 | 1.541 | 1.557 | 1.541 | 1.545 | 1.5430 | 12.5 | 25.0 | 0.016 | 35 | 0.15a |
| Example 33 | 1.548 | 1.544 | 1.556 | 1.544 | 1.548 | 1.544 | 1.556 | 1.544 | 1.548 | 1.5460 | 16.7 | 33.3 | 0.012 | 38 | 0.82a |
| Example 34 | 1.546 | 1.542 | 1.556 | 1.542 | 1.546 | 1.542 | 1.556 | 1.542 | 1.546 | 1.5440 | 14.3 | 28.6 | 0.014 | 45 | 0.3a |
| Example 35 | 1.546 | 1.543 | 1.557 | 1.543 | 1.546 | 1.543 | 1.557 | 1.543 | 1.546 | 1.5445 | 10.7 | 21.4 | 0.014 | 42 | 0.32a |
| Example 36 | 1.544 | 1.541 | 1.557 | 1.541 | 1.544 | 1.541 | 1.557 | 1.541 | 1.544 | 1.5425 | 9.4 | 18.8 | 0.016 | 38 | 0.45a |
| Example 37 | 1.549 | 1.546 | 1.557 | 1.546 | 1.549 | 1.546 | 1.557 | 1.546 | 1.549 | 1.5475 | 13.6 | 27.3 | 0.011 | 44 | 0.28a |
| Comparative Example 2 | The refractive index distribution W is a step index type distribution | | | | | | | | | | | | | | |

TABLE 13-continued (Polyolefin-based polymers)

Parameters of refractive index distribution W in width direction

| | Wm1 | Ws1 | Wm2 | Ws2 | Wm3 | Ws3 | Wm4 | Ws4 | Wm5 | Average refractive index WA | (WA − Ws1)/ (Wm2 − Ws1) × 100 | (Wm1 − Ws1)/ (Wm2 − Ws1) × 100 | Wm2 − Ws1 | a [μm] | b |
|---|---|---|---|---|---|---|---|---|---|---|---|---|---|---|---|
| Reference Example 9 | The refractive index distribution W is a graded index type distribution | | | | | | | | | | | | | | |
| Reference Example 10 | The refractive index distribution W is discontinuous | | | | | | | | | | | | | | |

The refractive index distribution W in the width direction of the optical waveguides obtained in Comparative examples 1 and 2 were step index type distributions.

3.2 Transmission Loss of Optical Waveguide

Light emitted from an 850 nm VCSEL (surface emitting laser) was introduced through an optical fiber of diameter 50 μm into the optical waveguide obtained in each example and each comparative example, the output light was received by an optical fiber of diameter 200 μm, and the intensity of the light was measured. Measurement of the transmission loss was performed using the cutback method. When the measured values were plotted with the longitudinal direction of the optical waveguide along the horizontal axis and the insertion loss along the vertical axis, the measured values fell along a straight line. The transmission loss was calculated from the slope of this straight line. The results are shown below in Tables 14 to 19.

3.3 Retention of Pulse Signal Waveform

For each of the obtained optical waveguides, a pulse signal having a pulse width of 1 ns was input into the optical waveguide from a laser pulse source, and the pulse width of the output light was measured.

For this measured pulse width of the output light, a relative value was calculated, either with the measured value for the optical waveguide obtained in Comparative Example 1 denoted as 1 in Tables 14 to 16, or with the measured value for the optical waveguide obtained in Comparative Example 2 denoted as 1 in Tables 17 to 19, and this relative value was evaluated against the evaluation criteria shown below. The results are shown below in Tables 14 to 19.

<Evaluation Criteria for Pulse Width>

A: relative value of the pulse width is less than 0.5

B: relative value of the pulse width is at least 0.5 but less than 0.8

C: relative value of the pulse width is at least 0.8 but less than 1

D: relative value of the pulse width is 1 or greater

The results of the above evaluations 3.2 and 3.3 are shown in Tables 14 to 19.

TABLE 14

(Epoxy-based polymers)

| | Evaluation results | | | Intersection portion loss [dB/cross] | | | Amount of interference light (relative value) |
|---|---|---|---|---|---|---|---|
| | Transmission loss [dB/cm] | Pulse width | | 30° | 60° | 90° | |
| Example 1 | 0.04 | A | Example A | 0.047 | 0.021 | 0.016 | 0.75 |
| Example 2 | 0.11 | C | Example B | 0.053 | 0.026 | 0.020 | 0.87 |
| Example 3 | 0.10 | B | Example C | 0.051 | 0.028 | 0.020 | 0.84 |
| Example 4 | 0.05 | B | Example D | 0.052 | 0.026 | 0.018 | 0.81 |
| Example 5 | 0.05 | A | Example E | 0.047 | 0.024 | 0.017 | 0.78 |
| Example 6 | 0.07 | B | Example F | 0.051 | 0.025 | 0.019 | 0.80 |
| Example 7 | 0.10 | B | Example G | 0.053 | 0.026 | 0.019 | 0.85 |
| Example 8 | 0.04 | A | Example H | 0.046 | 0.025 | 0.017 | 0.76 |
| Reference Example 1 | 0.15 | C | Reference Example A | 0.060 | 0.033 | 0.028 | 0.95 |
| Reference Example 2 | 0.35 | D | Reference Example B | 0.083 | 0.039 | 0.042 | 0.98 |

TABLE 15

(Acrylic-based polymers)

| | Evaluation results | | | Intersection portion loss [dB/cross] | | | Amount of interference light |
|---|---|---|---|---|---|---|---|
| | Transmission loss [dB/cm] | Pulse width | | 30° | 60° | 90° | (relative value) |
| Example 9 | 0.05 | A | Example I | 0.047 | 0.025 | 0.017 | 0.76 |
| Example 10 | 0.08 | B | Example J | 0.052 | 0.027 | 0.019 | 0.82 |
| Example 11 | 0.07 | C | Example K | 0.051 | 0.028 | 0.019 | 0.87 |
| Example 12 | 0.06 | A | Example L | 0.049 | 0.024 | 0.018 | 0.77 |
| Reference Example 3 | 0.17 | C | Reference Example C | 0.070 | 0.038 | 0.029 | 0.95 |
| Reference Example 4 | 0.55 | D | Reference Example D | 0.227 | 0.072 | 0.039 | 0.97 |

TABLE 16

(Polyolefin-based polymers)

| | Evaluation results | | | Intersection portion loss [dB/cross] | | | Amount of interference light |
|---|---|---|---|---|---|---|---|
| | Transmission loss [dB/cm] | Pulse width | | 30° | 60° | 90° | (relative value) |
| Example 13 | 0.05 | A | Example M | 0.051 | 0.023 | 0.017 | 0.72 |
| Example 14 | 0.08 | B | Example N | 0.053 | 0.026 | 0.018 | 0.83 |
| Example 15 | 0.07 | C | Example O | 0.062 | 0.027 | 0.019 | 0.88 |
| Example 16 | 0.04 | A | Example P | 0.013 | 0.009 | 0.006 | 0.70 |
| Example 17 | 0.03 | A | Example Q | 0.012 | 0.009 | 0.005 | 0.68 |
| Example 18 | 0.05 | A | Example R | 0.033 | 0.013 | 0.007 | 0.73 |
| Comparative Example 1 | 0.24 | — | Comparative Example A | 0.123 | 0.066 | 0.039 | 1 |

TABLE 17

(Epoxy-based polymers)

| | Evaluation results | | | Intersection portion loss [dB/cross] | | | Amount of interference light |
|---|---|---|---|---|---|---|---|
| | Transmission loss [dB/cm] | Pulse width | | 30° | 60° | 90° | (relative value) |
| Example 19 | 0.04 | A | Example S | 0.046 | 0.021 | 0.017 | 0.72 |
| Example 20 | 0.08 | C | Example T | 0.051 | 0.026 | 0.019 | 0.91 |
| Example 21 | 0.06 | B | Example U | 0.050 | 0.027 | 0.018 | 0.79 |
| Example 22 | 0.05 | A | Example V | 0.049 | 0.021 | 0.017 | 0.73 |
| Example 23 | 0.07 | B | Example W | 0.051 | 0.025 | 0.018 | 0.81 |
| Example 24 | 0.05 | A | Example X | 0.047 | 0.023 | 0.017 | 0.74 |
| Example 25 | 0.08 | C | Example Y | 0.051 | 0.024 | 0.019 | 0.87 |
| Example 26 | 0.06 | C | Example Z | 0.052 | 0.023 | 0.018 | 0.86 |
| Example 27 | 0.05 | B | Example a | 0.046 | 0.024 | 0.017 | 0.83 |
| Reference Example 5 | 0.23 | C | Reference Example E | 0.058 | 0.031 | 0.027 | 0.94 |
| Reference Example 6 | 0.30 | C | Reference Example F | 0.079 | 0.046 | 0.041 | 0.96 |

TABLE 18

(Acrylic-based polymers)

| | Evaluation results | | | Intersection portion loss [dB/cross] | | | Amount of interference light |
|---|---|---|---|---|---|---|---|
| | Transmission loss [dB/cm] | Pulse width | | 30° | 60° | 90° | (relative value) |
| Example 28 | 0.05 | A | Example b | 0.047 | 0.024 | 0.017 | 0.74 |
| Example 29 | 0.07 | B | Example c | 0.050 | 0.027 | 0.018 | 0.82 |
| Example 30 | 0.09 | C | Example d | 0.052 | 0.037 | 0.019 | 0.87 |
| Example 31 | 0.06 | A | Example e | 0.050 | 0.023 | 0.017 | 0.77 |
| Reference Example 7 | 0.23 | C | Reference Example G | 0.067 | 0.037 | 0.031 | 0.97 |
| Reference Example 8 | 0.33 | C | Reference Example H | 0.153 | 0.069 | 0.036 | 0.99 |

TABLE 19

(Polyolefin-based polymers)

| | Evaluation results | | | Intersection portion loss [dB/cross] | | | Amount of interference light |
|---|---|---|---|---|---|---|---|
| | Transmission loss [dB/cm] | Pulse width | | 30° | 60° | 90° | (relative value) |
| Example 33 | 0.04 | A | Example f | 0.049 | 0.023 | 0.016 | 0.71 |
| Example 34 | 0.06 | C | Example g | 0.052 | 0.028 | 0.019 | 0.84 |
| Example 35 | 0.04 | B | Example h | 0.053 | 0.026 | 0.018 | 0.79 |
| Example 36 | 0.03 | A | Example i | 0.012 | 0.009 | 0.005 | 0.67 |
| Example 37 | 0.03 | A | Example j | 0.011 | 0.009 | 0.005 | 0.66 |
| Comparative Example 2 | 0.05 | A | Example k | 0.029 | 0.011 | 0.006 | 0.69 |
| Comparative Reference Example 2 | 0.21 | — | Comparative Example B | 0.123 | 0.066 | 0.039 | 1 |
| Reference Example 9 | 0.12 | C | Reference Example I | 0.100 | 0.043 | 0.026 | 0.95 |
| Reference Example 10 | 0.10 | C | Reference Example J | 0.086 | 0.039 | 0.022 | 0.97 |

As is evident from Tables 14 to 19, in the optical waveguide obtained in each of the examples, transmission loss and rounding of the pulse signal were able to be suppressed compared with the optical waveguides obtained in each of the comparative examples.

In the case of the core layer-forming composition used in Comparative Example 1, for which the photo-bleaching phenomenon occurs, because the amount of change in the refractive index can be adjusted in accordance with the amount of irradiated light, a test was conducted utilizing this property, in which a refractive index distribution W was formed using a photomask that was set so that the accumulated irradiation dose gradually changed. When the refractive index distribution of the thus obtained optical waveguide was evaluated in the same manner as that described above, although high refractive index regions and low refractive index regions were confirmed, the change in refractive index was not as continuous as that observed in the examples. Further, the transmission loss in the obtained optical waveguide was larger than that observed in any of the examples, and retention of the pulse signal waveform was also poor.

4. Production of Optical Waveguides Having Intersection Portions

Subsequently, using the same conditions as each of the above examples, comparative examples and reference examples, optical waveguides having intersection portions were produced in the manner described below.

Example A

With the exception of using a photomask corresponding with the pattern of an optical waveguide having intersection portions as the photomask used during preparation of the core layer, an optical waveguide was produced in the same manner as that described for Example 1, thus producing an optical waveguide having intersection portions. In the production of the optical waveguide, three types of optical waveguides were produced in which the intersection angle at each intersection portion was 30°, 60° and 90° respectively.

Examples B to Z, and Examples a to k, Comparative Examples A and B, and Reference Examples A to J With the exception of using a photomask corresponding with the pattern of an optical waveguide having intersection portions as the photomask used during preparation of the core layer, optical waveguides were produced in the same manner as that described for Examples 2 to 37, Comparative Examples 1 and 2, and Reference Examples 1 to 10, thus producing optical waveguides having intersection portions. In the production of each optical waveguide, three types of optical waveguides were produced in which the intersection angle at each intersection portion was 30°, 60° and 90° respectively.

5. Evaluation of Optical Waveguide Having Intersection Portions

Subsequently, for each of the obtained optical waveguides having intersection portions, the insertion loss between the two end portions was measured. The results revealed that the value for the insertion loss exhibited the same tendency as the aforementioned transmission loss. In other words, whereas the insertion loss was satisfactorily small in the optical waveguides having intersection portions obtained in each of the examples, the insertion loss was comparatively large in the optical waveguides having intersection portions obtained in each of the comparative examples. Further, it was found that optical waveguides for which the transmission loss measured in Section 2 was small also exhibited small amounts of interference of the signal light.

Furthermore, when the transmission loss in the intersection portions was calculated, it was clear that the optical waveguides having intersection portions obtained in each of the examples exhibited less transmission loss than the optical waveguides having intersection portion obtained in each of the comparative examples. The calculated transmission loss per intersection portion is shown in Tables 14 to 19. When the angle of intersection was 90°, the transmission loss was 0.02 dB or less in all of the examples.

Further, the method used for calculating the transmission loss in the intersection portion involved preparing a plurality of samples having different numbers of intersection portions, and then calculating the transmission loss per intersection portion by comparing the insertion loss for these samples.

Furthermore, the amount of signal light interfering with the core portion intersecting the core portion that represents the measurement target (hereafter referred to as the "amount of interference light") was also measured. For each of these measured amounts of interference light, a relative value was calculated, either with the measured value for the optical waveguide obtained in Comparative Example 1 denoted as 1 in Tables 14 to 16, or with the measured value for the optical waveguide obtained in Comparative Example 2 denoted as 1 in Tables 17 to 19. These relative values are shown in Tables 14 to 19.

The results confirmed that by optimizing the refractive index distribution W, the amount of interfering signal light could be reduced.

Based on the above results, it was evident that in an optical waveguide having core portions in which the refractive index distribution is a continuous distribution that satisfies specific conditions, loss and interference could be suppressed.

INDUSTRIAL APPLICABILITY

The present invention provides an optical waveguide in which core portions can be intersected without an accompanying increase in thickness, and the core portions can be formed at high density, and also provides an optical wiring component and an optical waveguide module which include the optical waveguide and can simplify optical wiring and contribute to space saving, and an electronic device which can be readily miniaturized.

DESCRIPTION OF THE REFERENCE SIGNS

1: Optical waveguide
10: Optical wiring component
101: Connector
11, 12, 121, 122: Cladding layer
13, 131, 132: Core layer
14: Core portion
140: Core group
141, 142, 143, 144, 145, 146: Core portion
147, 148: Intersection portion
15: Side cladding portion
151, 152, 153, 154, 155, 156: Side cladding portion
2: Support film
3: Cover film
901: Optical waveguide-forming composition (first composition)
902: Optical waveguide-forming composition (second composition)
910: Layer
914: Multilayer compact
914a: First molded layer
914b: Second molded layer
914c: Third molded layer
914d: Fourth molded layer
914e: Fifth molded layer
914f: Sixth molded layer
914g: Seventh molded layer
914h: Eighth molded layer
914i: Ninth molded layer
915: Polymer
920: Additive
930: Active radiation
935: Mask (masking)
9351: Opening (window)
925: Irradiated region
9251, 9252, 9253: Irradiated region
940: Non-irradiated region
9403: Non-irradiated region
951: Support substrate
C1, C2, C2': Centerline
W: Refractive index distribution
P2: Intensity distribution
T, T': Refractive index distribution
H: High refractive index portion
L: Low refractive index portion

The invention claimed is:
1. An optical waveguide, comprising:
a core layer having a plurality of core portions and a plurality of side cladding portions adjoining the plurality of core portions such that the plurality of core portions comprises a plurality of core groups mutually intersecting on a same plane, each of the core groups including at least a pair of the core portions formed in parallel,
wherein the core layer has a transverse cross-section such that a refractive index distribution W in a width direction of the core layer has a region having first and second local minimum values, a local maximum value, and first and second local secondary maximum values smaller than the local maximum value, the first and second local minimum values, the local maximum value and the first and second local secondary maximum values are in an order of the first local secondary maximum value, the first local minimum value, the local maximum value, the second local minimum value and the second local secondary maximum value, a section in the region between the first and second local minimum values including the local maximum value corresponds to the core portion, sections in the region including each of the first and second local secondary maximum values correspond to the side cladding portions, each of the first and second local minimum values has a value smaller than an aver- age refractive index in the cladding portions, and the refractive index distribution W varies continuously in the width direction of the core layer.

2. The optical waveguide according to claim 1, wherein the core layer comprises a polymer and a refractive index modifier having a different refractive index from a refractive index of the polymer, and the refractive index distribution W is formed in correspondence with a concentration of the refractive index modifier.

3. The optical waveguide according to claim 2, wherein the core layer comprises the polymer and a photopolymerizable monomer having a different refractive index from the polymer and dispersed within the polymer, the refractive index distribution W is formed by a process comprising irradiating light partially onto the core layer such that the photopolymerizable monomer migrates and is unevenly distributed to generate a variation of refractive index within the polymer layer.

4. The optical waveguide according to claim 1, wherein, when two core portions mutually intersect at an angle of intersection of optical axes of 90°, a transmission loss in the intersection of the two core portions is not more than 0.02 dB.

5. The optical waveguide according to claim 1, wherein the core portions have a width of from 10 to 200 µm.

6. An optical wiring component, comprising:
the optical waveguide according to claim 1; and
a plurality of connectors positioned at ends of the core groups of the optical waveguide.

7. The optical wiring component according to claim 6, wherein the optical waveguide has an optical path conversion portion formed on each of the core portions or on an extended line of each of the core portions, and the optical path conversion portion converts the optical path of each of the core portions.

8. An optical waveguide module, comprising:
the optical waveguide according to claim 1; and
a plurality of light receiving and emitting elements,
wherein the light receiving and emitting elements are positioned on one surface of the optical waveguide and are optically connected to the core portions.

9. An electronic device, comprising:
the optical waveguide according to claim 1.

10. The optical waveguide according to claim 1, further comprising:
a plurality of cladding layers,
wherein the cladding layers are laminated on both surfaces of the core layer, respectively, the optical waveguide has a transverse cross-section such that a refractive index distribution T in a thickness direction is substantially constant in a region corresponding to the core portion and regions corresponding to the cladding layers, and the refractive index distribution T varies discontinuously at interfaces between the core portion and the cladding layers.

11. The optical waveguide according to claim 1, further comprising:
a plurality of cladding layers,
wherein the cladding layers are laminated on both surfaces of the core layer, respectively, the optical waveguide has a transverse cross-section such that a refractive index distribution T in a thickness direction comprises a region corresponding to the core portion and regions corresponding to the cladding layers, the refractive index distribution T varies continuously in the region corresponding to the core portion, the refractive index distribution T is substantially constant in the regions corresponding to the cladding layers, and the refractive index distribution T varies discontinuously at interfaces between the core portion and the cladding layers.

12. The optical waveguide according to claim 1, further comprising:
a plurality of cladding layers,
wherein the cladding layers are laminated on both surfaces of the core layer, respectively, the optical waveguide has a transverse cross-section such that a refractive index distribution T in a thickness direction has a local maximum value, first portions and second portions, the refractive index distribution T in the first portions decreases continuously from the local maximum value toward the cladding layers, the second portions are positioned on upper and lower surface sides of the first portions, a refractive index in the second portions is substantially constant, and a region including the local maximum value and the first portions corresponds to the core portion, and regions including each of the second portions correspond to the cladding layers.

13. The optical waveguide according to claim 1, further comprising:
a plurality of cladding layers,
wherein the cladding layers are laminated on both surfaces of the core layer, respectively, the optical waveguide has a transverse cross section such that a refractive index distribution T in a thickness direction has a region having first and second local minimum values, a local maximum value, and first and second local secondary maximum values smaller than the local maximum value, the first and second local minimum values, the local maximum value, and the first and second local secondary maximum values are arranged in an order of the first local secondary maximum value, the first local minimum value, the local maximum value, the second local minimum value and the second local secondary maximum value, a section in the region between the first and second local minimum values including the local maximum value corresponds to the core layer, sections in the region including each of the first and second local maximum values correspond to the cladding layers, each of the first and second local minimum values has a value smaller than an average refractive index in the cladding layers, and the entire refractive index distribution T varies continuously.

14. The optical waveguide according to claim 1,
wherein a thickness of the core layer is about 1 to 200 µm, an average width of the side cladding portions is within a range from 5 to 250 µm, a ratio of an average width of the core portions to an average width of the side cladding portions is within a range from 0.1 to 10, an average thickness of the cladding layers is from 0.01 to 7 times of an average thickness of the core layer, or in a transverse cross-section of the core layer, when a denotes a width of a portion of the core layer in which a refractive index is continuously equal to or greater than an average refractive index of the side cladding portions, and b denotes a width of a portion of the core layer in which a refractive index is continuously less than the average refractive index of the side cladding portions, b is within a range from 0.01a to 1.2a.

15. The optical waveguide according to Claim 1,
wherein, in the refractive index distribution W,
a difference between an average refractive index of the first and second local minimum values and an average refractive index of the side cladding portions is from 3 to 80% of a difference between the average refractive index of the first and second local minimum values and an average refractive index of the local maximum value,
a difference between the average refractive index of the first and second local minimum values and an average refractive index of the first and second local secondary maximum values is from 6 to 90% of a difference between the average refractive index of the first and second local minimum values and the average refractive index of the local maximum value, or
the difference between the average refractive index of the first and second local minimum values and the average refractive index of the local maximum value is from 0.005 to 0.07.

16. The optical waveguide according to claim 10, wherein, in the refractive index distribution T, when a denotes a width of a portion in which a refractive index is equal to or greater than an average refractive index of the cladding layers, and b denotes a width of a portion in which a refractive index is less than the average refractive index of the cladding layers, b is within a range from 0.01a to 1.2a.

17. The optical waveguide according to claim 11, wherein, in the refractive index distribution T, when a denotes a width of a portion in which a refractive index is equal to or greater than an average refractive index of the cladding layers, and b denotes a width of a portion in which a refractive index is less than the average refractive index of the cladding layers, b is within a range from 0.01a to 1.2a.

18. The optical waveguide according to claim 12, wherein, in the refractive index distribution T, when a denotes a width of a portion in which a refractive index is equal to or greater than an average refractive index of the cladding layers, and b denotes a width of a portion in which a refractive index is less than the average refractive index of the cladding layers, b is within a range from 0.01 a to 1.2a.

19. The optical waveguide according to claim 13, wherein, in the refractive index distribution T, when a denotes a width of a portion in which a refractive index is equal to or greater than an average refractive index of the cladding layers, and b denotes a width of a portion in which a refractive index is less than the average refractive index of the cladding layers, b is within a range from 0.01a to 1.2a, a difference between an average refractive index of the first and second local minimum values and an average refractive index of the cladding layers is from 3 to 80% of a difference between the average refractive index of the first and second local minimum values and the local maximum value within the core portion, or a difference between the average refractive index of the first and second local minimum values and the average refractive index of the local maximum value within the core portion is from 0.005 to 0.07.

* * * * *